ELECTRONIC SWITCHING APPARATUS FOR TELEPHONE SYSTEMS

Original Filed May 15, 1948 14 Sheets-Sheet 1

Inventor
ARNOLD LESTI

By Robert Harding Jr
Attorney

ELECTRONIC SWITCHING APPARATUS FOR TELEPHONE SYSTEMS

Original Filed May 15, 1948 14 Sheets-Sheet 2

Inventor
ARNOLD LESTI

By Robert Harding Jr.
Attorney

ELECTRONIC SWITCHING APPARATUS FOR TELEPHONE SYSTEMS

Original Filed May 15, 1948 14 Sheets-Sheet 3

INVENTOR
ARNOLD LESTI
BY Robert Harding Jr.
ATTORNEY

ELECTRONIC SWITCHING APPARATUS FOR TELEPHONE SYSTEMS

Original Filed May 15, 1948 14 Sheets-Sheet 4

Inventor
ARNOLD LESTI

By Robert Harding Jr.
Attorney

ELECTRONIC SWITCHING APPARATUS FOR TELEPHONE SYSTEMS

Original Filed May 15, 1948 14 Sheets-Sheet 5

Inventor
ARNOLD LESTI
By
Robert Harding Jr
Attorney

ELECTRONIC SWITCHING APPARATUS FOR TELEPHONE SYSTEMS

Original Filed May 15, 1948 14 Sheets-Sheet 6

INVENTOR
ARNOLD LESTI
BY Robert Fardey Jr.
ATTORNEY

ELECTRONIC SWITCHING APPARATUS FOR TELEPHONE SYSTEMS

Original Filed May 15, 1948 14 Sheets-Sheet 7

INVENTOR
ARNOLD LESTI
BY Robert Harding
ATTORNEY

ELECTRONIC SWITCHING APPARATUS FOR TELEPHONE SYSTEMS

Original Filed May 15, 1948 14 Sheets-Sheet 8

INVENTOR
ARNOLD LESTI
BY Robert Harding Jr.
ATTORNEY

ELECTRONIC SWITCHING APPARATUS FOR TELEPHONE SYSTEMS

Original Filed May 15. 1948 14 Sheets-Sheet 9

Inventor
ARNOLD LESTI
By Robert Harding Jr.
Attorney

ELECTRONIC SWITCHING APPARATUS FOR TELEPHONE SYSTEMS

Original Filed May 15, 1948 14 Sheets-Sheet 10

INVENTOR
ARNOLD LESTI
BY Robert Harding
ATTORNEY

ELECTRONIC SWITCHING APPARATUS FOR TELEPHONE SYSTEMS

Original Filed May 15, 1948 14 Sheets-Sheet 11

Inventor
ARNOLD LESTI
By Robert Harding Jr.
Attorney

ELECTRONIC SWITCHING APPARATUS FOR TELEPHONE SYSTEMS

Original Filed May 15, 1948 14 Sheets-Sheet 12

ELECTRONIC SWITCHING APPARATUS FOR TELEPHONE SYSTEMS

Original Filed May 15, 1948 14 Sheets-Sheet 13

INVENTOR
ARNOLD LESTI
BY Robert Harding Jr.
ATTORNEY

ELECTRONIC SWITCHING APPARATUS FOR TELEPHONE SYSTEMS

Original Filed May 15, 1948 14 Sheets-Sheet 14

INVENTOR
ARNOLD LESTI
BY Robert Harding Jr
ATTORNEY

United States Patent Office

Re. 24,987
Reissued May 16, 1961

24,987

ELECTRONIC SWITCHING APPARATUS FOR TELEPHONE SYSTEMS

Arnold Lesti, Brooklyn, N.Y., assignor to International Standard Electric Corporation, New York, N.Y., a corporation of Delaware Original No. 2,619,548, dated Nov. 25, 1952, Ser. No. 27,296, May 15, 1948. Application for reissue Oct. 25, 1960, Ser. No. 64,974

48 Claims. (Cl. 179—18)

Matter enclosed in heavy brackets [ ] appears in the original patent but forms no part of this reissue specification; matter printed in italics indicates the additions made by reissue.

This invention relates to an improved all-electronic switching system, particularly adapted for telecommunication exchanges.

It has been the practice in the prior art to establish a connection between a calling and a called station, over a system of mechanical, electromechanical or electronic switches which operate in successive stages of selection to establish a private conductive pathway between the stations, and to keep each of the selectors thus employed, or a suitable substitute switch for each selector, fully engaging during the entire conversation. Mechanical and electromechanical switches, particularly when made to operate at high speed and when arranged to do almost continuous service day in and day out are subject to rapid wear and require systematic replacement and servicing. In addition, such equipment is relatively bulky and heavy and occupies much space. While electronic switches are not subject to the same objections, their installation and maintenance are expensive in all their previously suggested embodiments. Furthermore, prior electronic switching systems required either electronic devices specially designed for the purpose, or standard electronic devices but in great profusion for each station served.

It is an object of the present invention to devise a switching method and arrangement in which mechanical and electromechanical selectors may be completely avoided, and in which only a relatively small number of standard electronic devices are employed.

It is a further object of the present invention to arrange for the switching of a large number (of the order of ten or fifteen thousand) stations. Each station has only inexpensive individual equipment at the exchange to connect it to a common medium, e.g. a common metallic network. A number of private time channels, each allottable to a different call is available over the network to provide for the probable traffic. Each time channel is afforded by a pulse series seized from a train of frames of pulses. The selection for any one call is achieved over the common network by a coded set of simultaneously occurring pulses which is repeated in the time channel allotted to that call. Individual pulses of the coded set occur only on predetermined conductors, or buses of the network so as to constitute a code representing only the called station. The individual equipment employed to connect each station to the common network is simple and inexpensive, e.g. standard gas tubes and rectifiers, and is adapted to accept from the network only a call which is carried on particular reiterated sets of pulses which represent only that station and to accept it only if the station is idle.

It is a further object of the invention to devise electronic selecting arrangements operable in conjunction with various existing facilities. If, for example, a telephone exchange is to serve the customary subscribers' stations, then the selecting arrangement is made controllable by the standard dialing equipment provided at each station.

It is a further object of this invention that it obviate the need for so-called intermediate selectors or selection stages, and that the first and only selector suffice for handling any call in one or more central exchanges, even though they serve a large number of stations, i.e. of the order of ten or fifteen thousand or multiples thereof.

The important functions performed by the communication, e.g. telephone system here disclosed, are as follows:

Each station is connected with the exchange by a line which, at the exchange, terminates in equipment and circuits individual to that particular line. Said line as well as all other lines and circuits to be discussed, may be either metallic or established through any other medium, e.g. the air. The exchange has equipment common to all the lines and permanently associated with a common network. When a call is initiated at one of the stations its line will become effectively connected with the common equipment or some part thereof. This effective connection is established by means including instrumentalities providing and reiterating the code designation of the calling line. The calling line code is produced by the individual equipment of the calling line in a time channel which is permanently assigned to it. During this time channel and by modulating pulses produced in it, the calling station will dial the designation of the called station to the common equipment. The common equipment will control the impressing on the common network, in a different time channel temporarily allotted to the call thereon for the duration of the call, of a reiterated set of pulses coded in accordance with the designation of the called station. The calling line code will also be impressed on the common network by the common equipment which at the same time transfers it to the temporarily allotted time channel from the time channel permanently assigned to the calling party. Each code, besides being useful for accomplishing a selection, serves as a carrier for speech signals. For selectively receiving calls each line is connected to an incoming circuit of the common network via individual equipment responsive only to the code which is assigned to that particular line. Therefore, the carrier pulses coded by the common equipment in response to dialing and applied by it to the common network will actuate only the individual equipment of the called line and signals will be transmitted on it only to the called line from the common network. These signals may be of any nature, for instance the pulses comprising the coded carrier may be amplitude modulated in accordance with the speech of the calling party.

The answering speech, or other answering signals are initially transmitted from the individual equipment of the called party as modulations of the coded carrier which it is receiving and these modulations are transferred under the control of means in the common equipment to the pulses coded in accordance with the designation of the calling station. The calling station's coded carrier is impressed on the common network from the output of said means. Thus, there is established a private two-way channel between the calling and the called stations via the common network.

Once it is effectively connected to a calling station and ready to receive dialing impulses, the common equipment sends dial tone to that station over its permanently assigned time channel, and in a case where the called station is already engaged, the common equipment modulates the coded carrier of the calling station with a busy signal tone whereby the calling station is informed of the busy condition of the called station.

System components will be described which fall into the following classes:

(1) Components individual to each station;

(2) Components common to groups of stations, but privately allotted to an individual station at the start of a call and so retained during the full period of conversation;

(3) Components common to groups of stations but privately allotted to an individual station at the start of a call to be engaged only transiently, for example during a period of time necessary to translate dialing impulses sent out by a calling party into a proper code for reaching the called party; and (4) Components common to a number of groups of stations, or to all the stations in the exchange, and which do not need to be allotted privately since they can serve a plurality of time channels.

To maximize common use of expensive circuits whenever possible, so-called line finders or any other time-channel seizing means are used for responding when a station is calling to connect it with a common component and for disengaging the component to make it available for use by another calling station at the completion of the call, or even sooner if the component is not needed for the full duration of the communication, e.g. conversation. One common component which thus becomes engaged and disengaged is a component which serves to translate dialing impulses into a called code. While this form of the invention may be preferred and has certain obvious advantages, it would also be possible to employ individual code generating equipment for each station.

The so-called line finder is an electronic device adapted to seize the pulse series, i.e. the time channel, which is permanently assigned to a given station and which becomes available for seizure whenever that station is calling. Each station must have a separate time channel available for seizure by a line finder for the purpose of establishing a private channel from the calling station to a common component for generating a called code in response to dialing. However, the total number of stations will greatly exceed the number of time channels which can be made available by pulse multiplexing. Therefore the stations are divided into groups limited to perhaps 200. Accordingly, each line finder is not common to all of the stations in the exchange but only to one group and the number of line finders commoned to that group must be adequate to carry the probable traffic afforded by it.

Thus, a given station in one group may have on a first common network the same time channel that is allotted to another station in a different group having a separate first common network. The speech and/or signals carried on either first common network will not disturb the privacy of those carried on the other even if they are in the same channel. After a station has dialed a number of sending impulses over its private channel on the first common network to actuate common code generating equipment for setting up a code on a second network common to a larger subdivision or even to the whole exchange, that code will be released in a free time channel on the second connection network which is not related to the time channel assigned to the calling station on the first common network. A called code set up on the second common network will be repeated at a supersonic rate in a free time channel that has been seized. The pulses which afford this time channel come from a common pulse generator providing enough channels for the probable peak traffic in the whole exchange via a pulse finder associated with the code generating equipment. Since the code is reiterated throughout the call, while the dialing of the called number is only a transient phenomenon, it is necessary not only that dialing be translated into a new form, i.e. coding, but that the resulting code be stored so that it will continue to be repeated until the end of the conversation. For this purpose, the code generating equipment employs for the called code a set of gas discharge tubes variably operated to set up and store the code which is transiently represented to it.

Modulation could be carried on separate accompanying pulses with either pulse-time, amplitude, or code modulation. In the embodiment shown herein, the modulation is carried simultaneously by the several series of synchronously recurring pulses which together comprise the reiterated coded pulse set. Before the modulation reaches the second common network, it leaves central exchange equipment individual to the calling station as amplitude modulation of the train of pulses (or "pulse series") affording the time channel permanently assigned to that station on the first common network. Since ordinarily the pulses in this train will be out of phase with the reiterations of the coded pulse set released onto the second common network, it would be difficult to effect a direct transfer of the modulation carried on the train of pulses to the reiterated coded set of pulses. Therefore, the modulation component is first detected, turning it back into a simple audio wave which is thereafter readily impressed on the reiterated coded pulse set without regard to its phase.

A number of basic components are disclosed in detail. These are combinable in the manner shown herein to form a complete exchange. A system for handling any number of subscribers may be produced simply by using appropriate numbers of each of the components and interrelating them in the manner shown.

THE DRAWINGS

These basic circuits are represented in the various figures of the drawing, in which.

Figure 6:
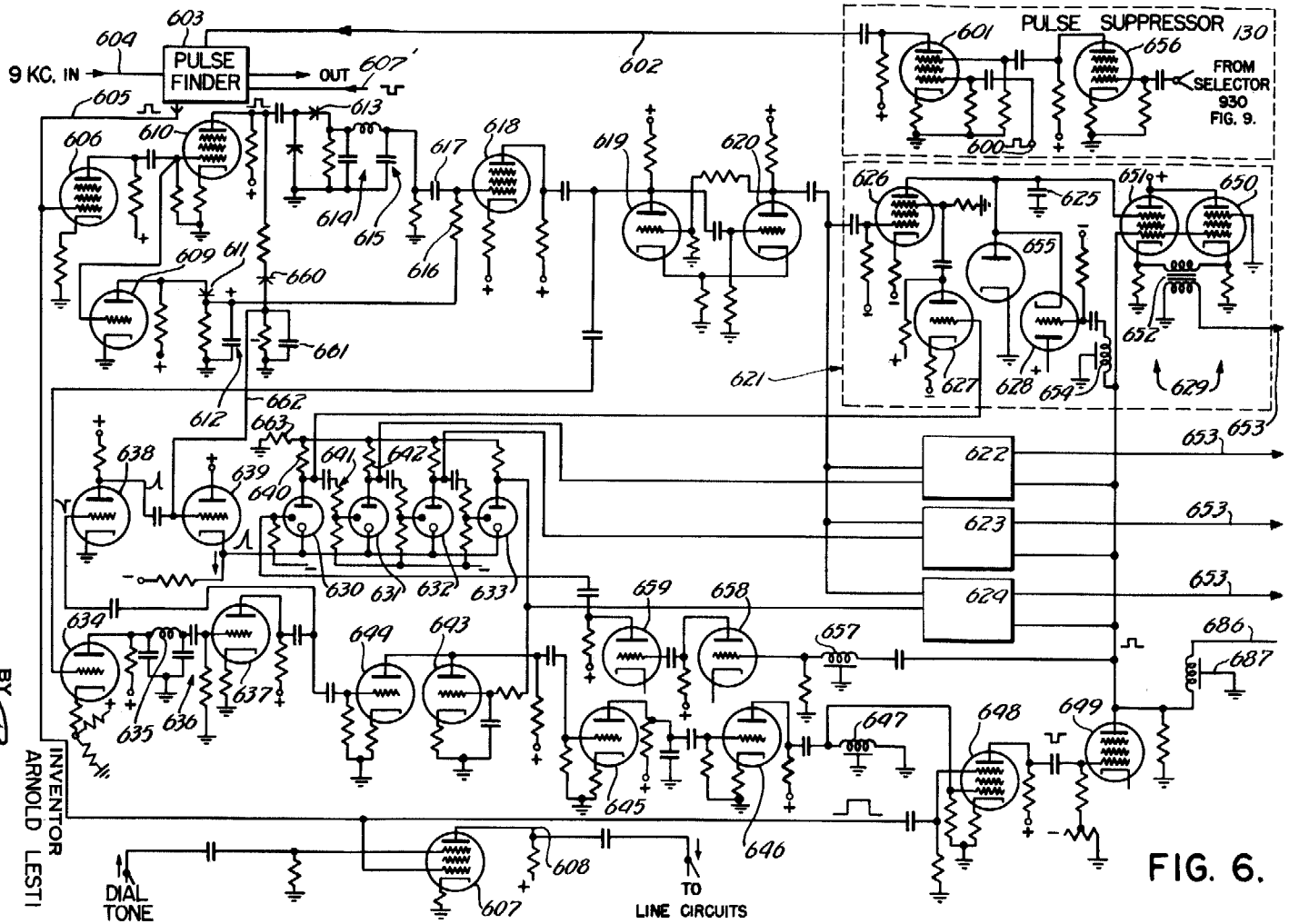
Figure 6A:
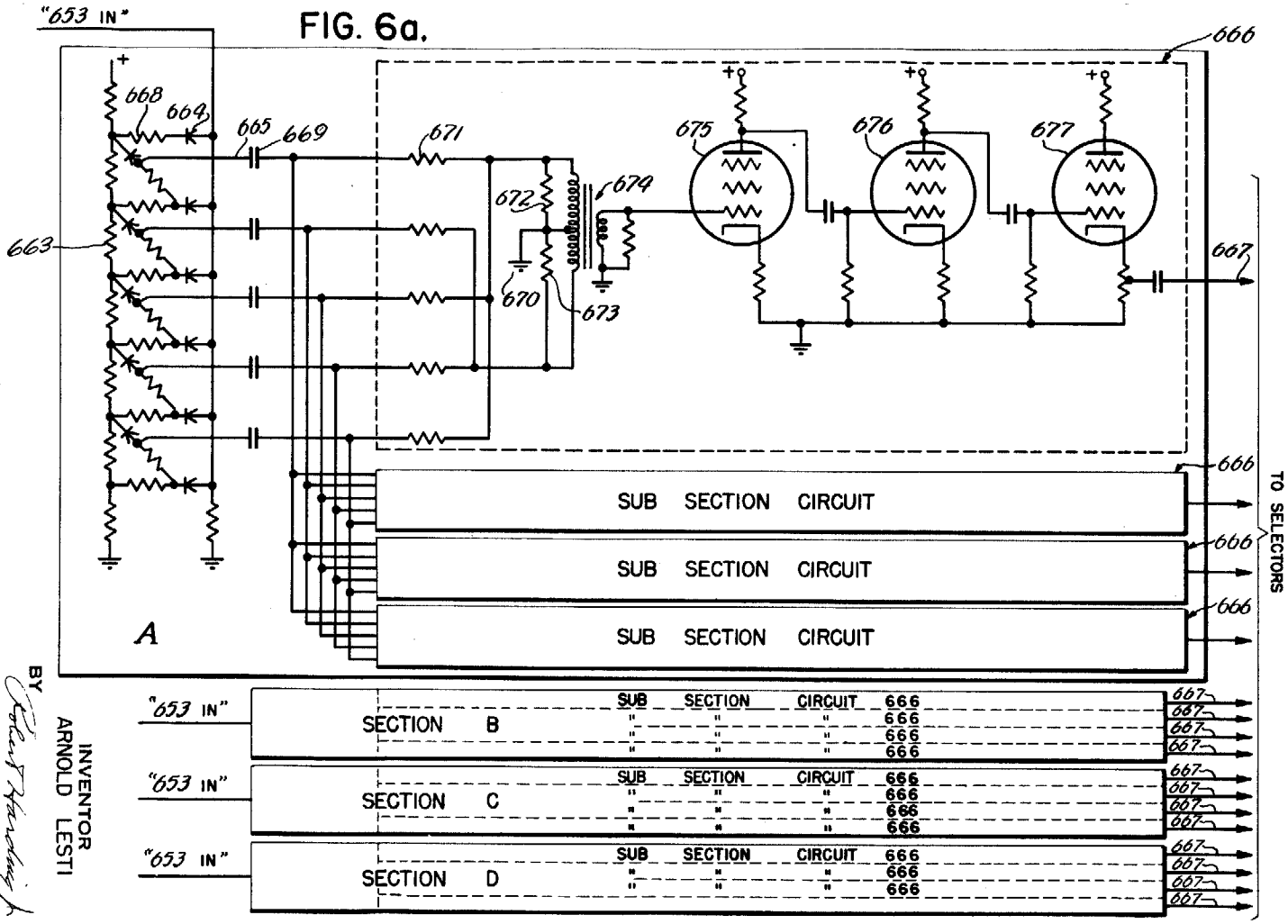
Figure 6B:
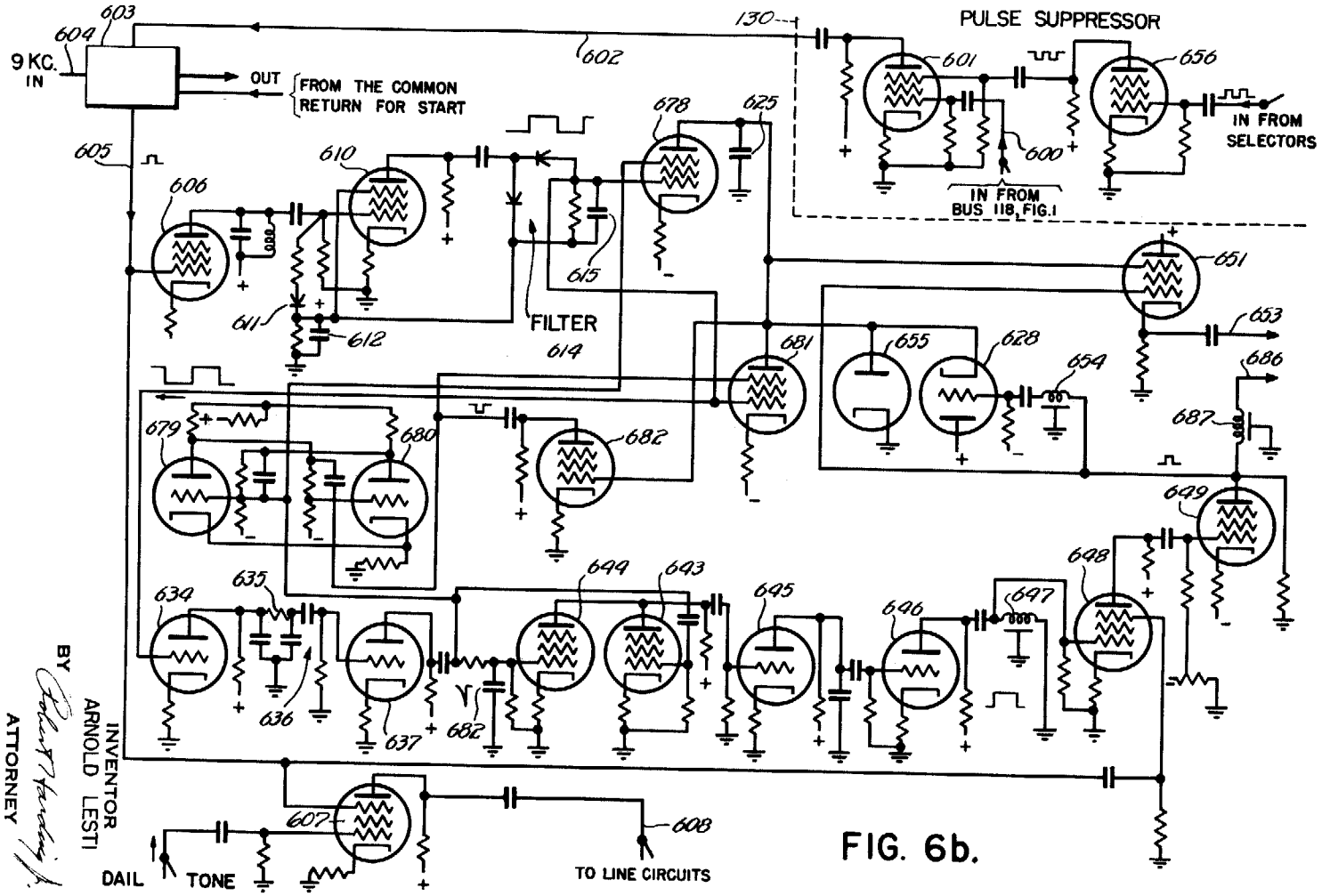
Figure 6C:
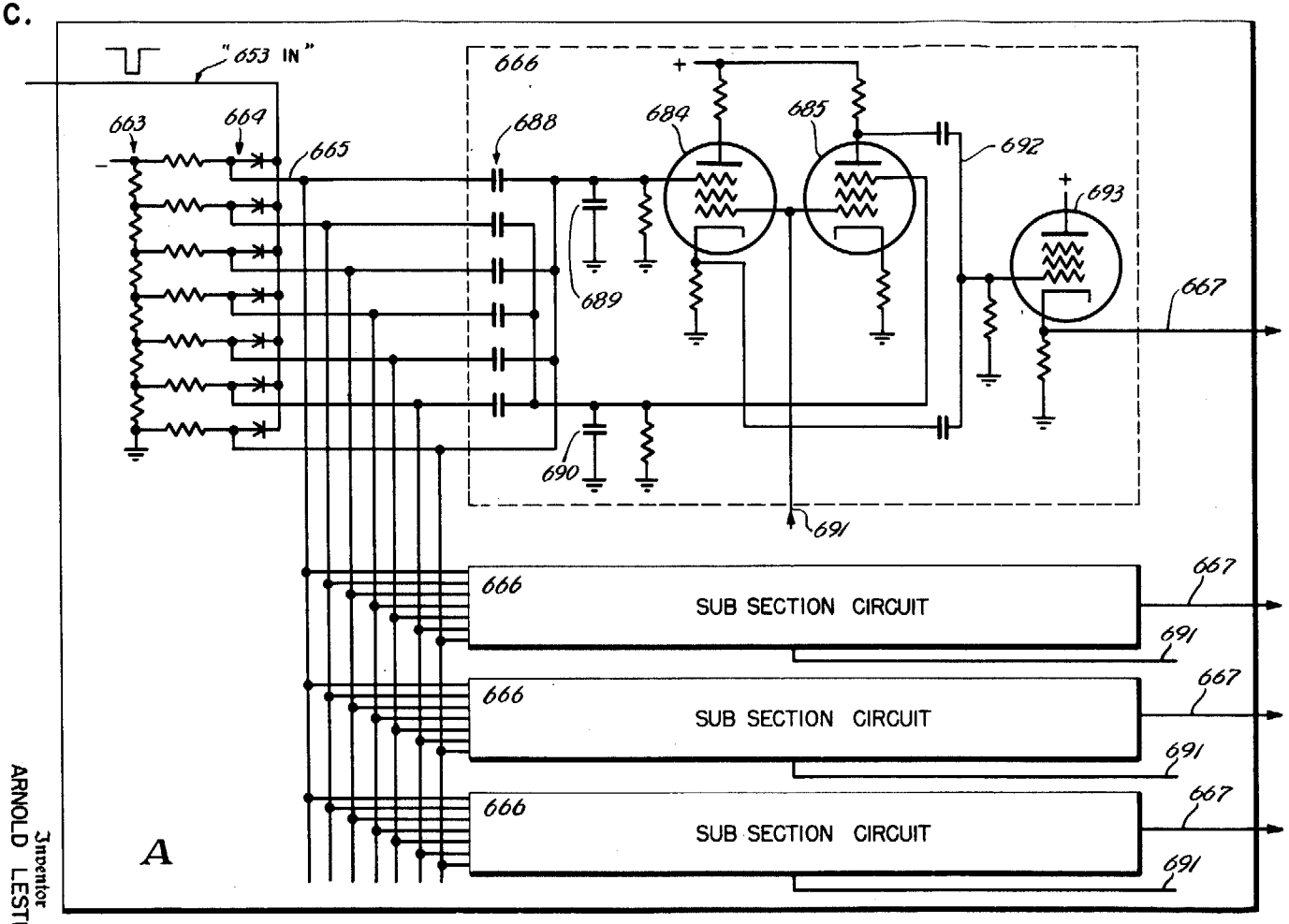
Figure 7:
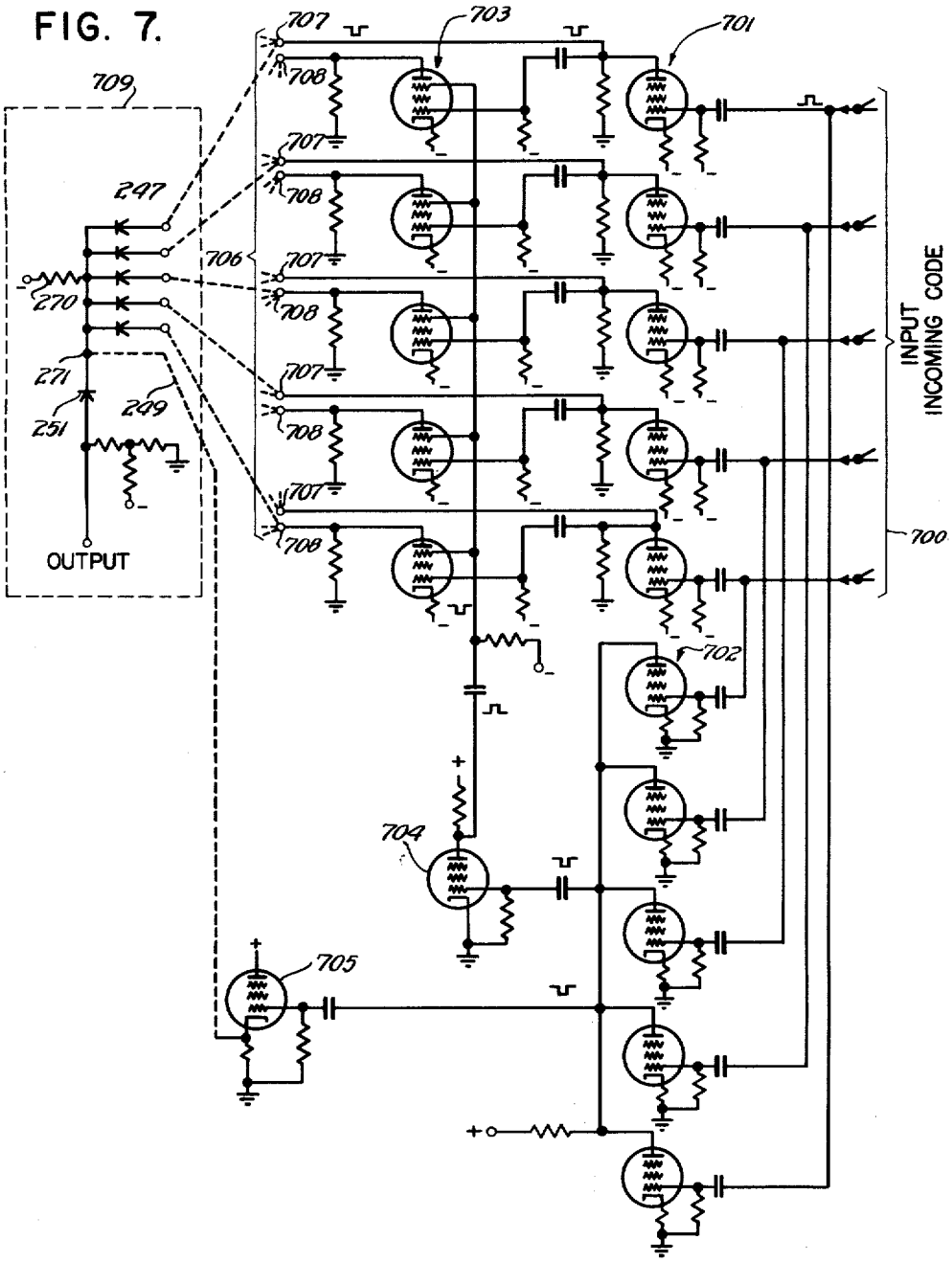
Figure 8:
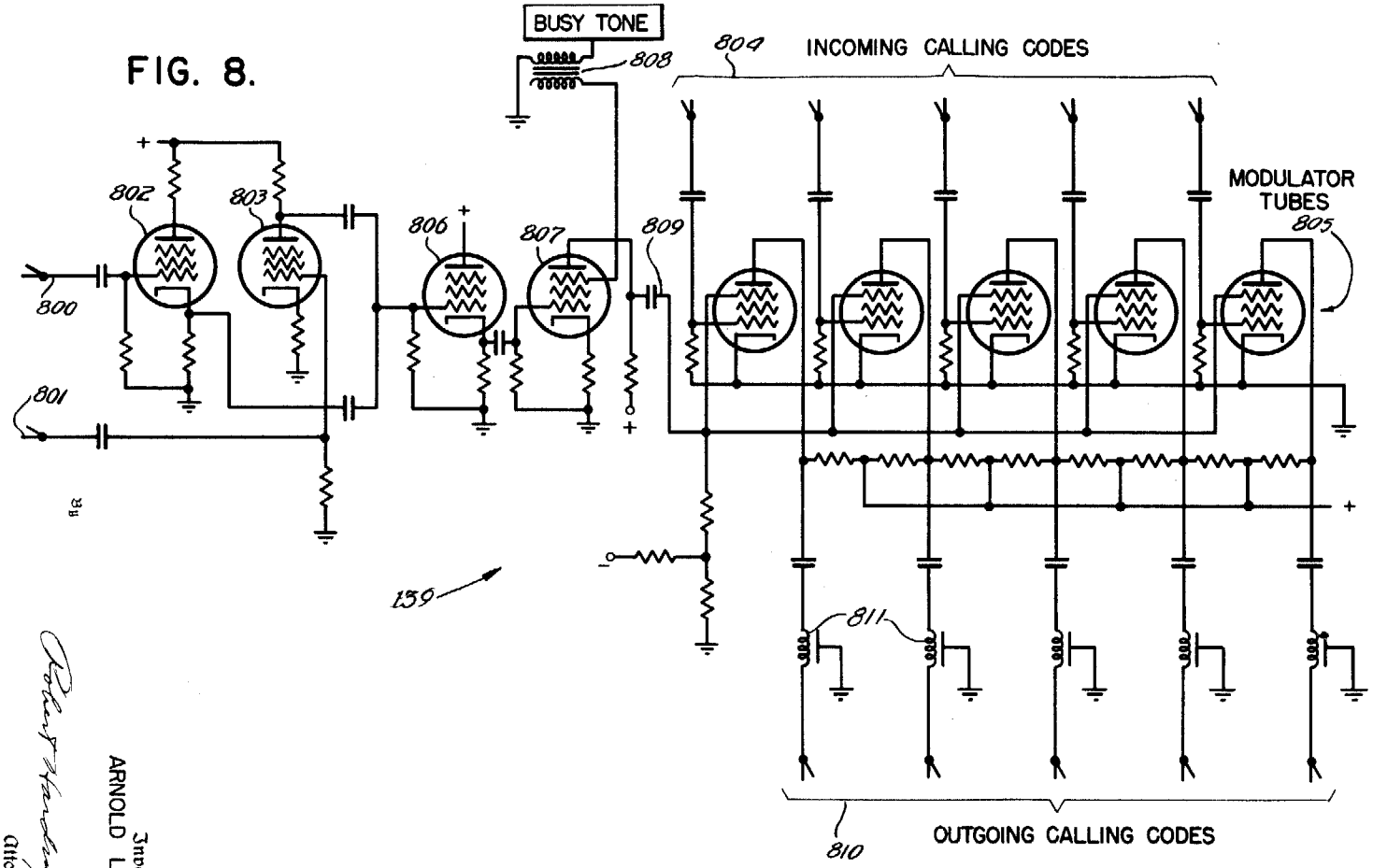
Figure 9:
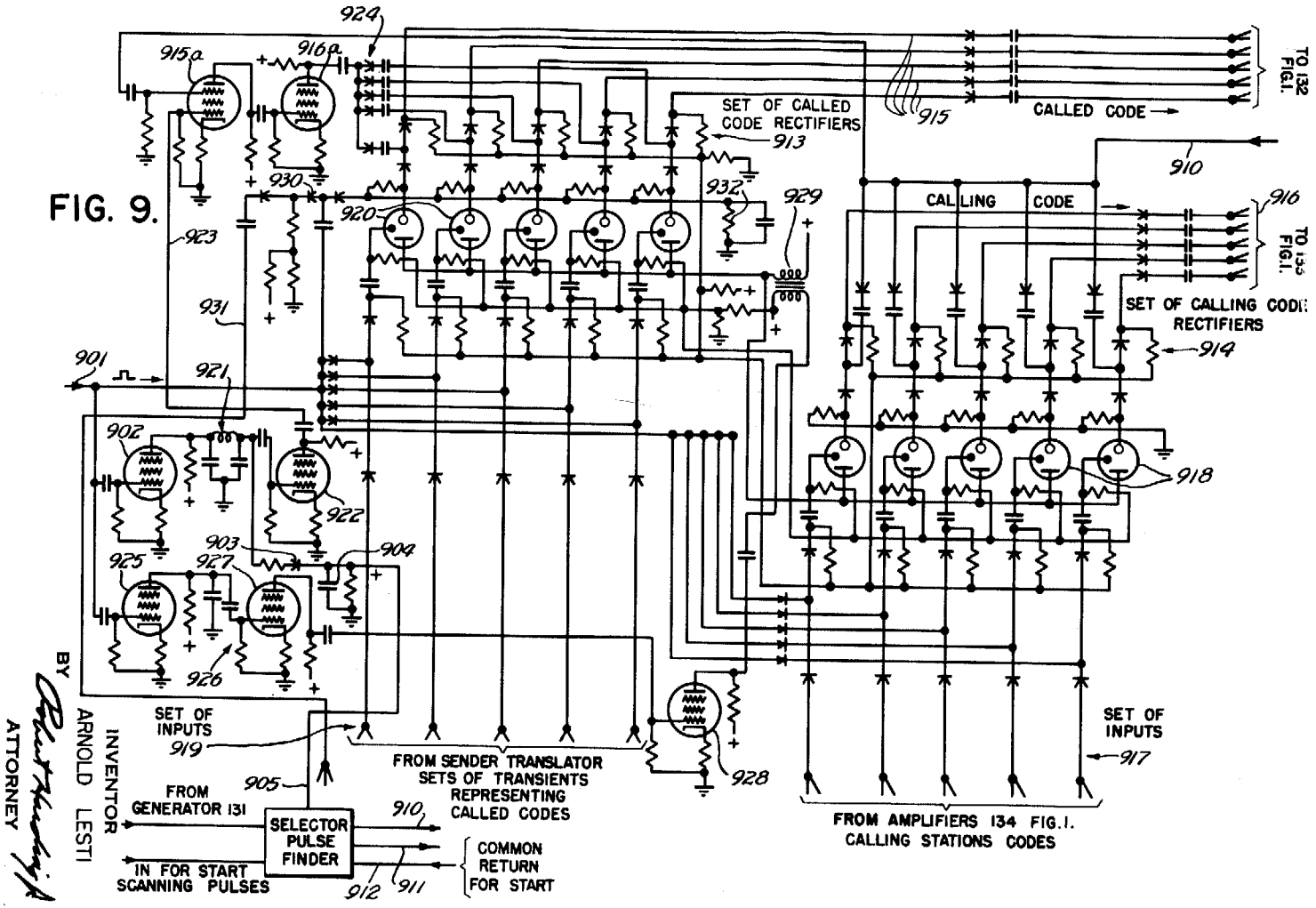

Fig. 6 is the circuit diagram of a sender register common to a group of subscribers' lines which is transiently engaged by a calling line during dialing. After being alloted to a particular calling station it translates the dialing impulses, carried as modulations on the pulse series of that station, into a set of direct potentials temporarily stored in a number of condensers in accordance with the called number, the potential stored in each condenser representing one or more of the digits in the called number;

Fig. 6a is a block diagram of the translator portion of the sender, and a schematic diagram illustrating the circuit details of a representative one of the sections of the translator. Each translator section receives on a single input an impulse whose amplitude is proportional to the potential stored in one of the condensers of the register portion of the sender, and in response thereto, it produces on a group of outputs a portion of the called code;

Fig. 6b is a circuit diagram of an alternate embodiment of a sender register in which each condenser receives a charge in accordance with two successively dialed digits rather than with only one;

Fig. 6c shows a modified circuit arrangement for a section of a translator;

Fig. 7 is a circuit diagram of a common component, the decoder driver which receives a coded set of pulses from a set of main bus bars of the second network and processes them for application to the decoders of all the line circuits in a number of groups of all of the line circuits in the entire exchange, to the end that the code will operate a particular decoder to gate itself into the line circuit of the station which it designates. The decoder driver has as many inputs as there are elements in the code and a pair of outputs for each input, it being adapted to produce a pulse on one of the outputs of each pair when the code element received on the corresponding input is a pulse and a pulse on the other when the code element received is the absence of a pulse;

Fig. 8 is a circuit diagram of a common component, the busy connector. When a subscriber raises his handset, his line circuit sends out over an outgoing circuit of the second common network a reiterated coded set of pulses designating his own station, i.e. a calling code. Normally this set of pulses serves as a coded carrier on which the called party may impress his answering speech signals, after he is first reached by his own called code, so that the answering speech may be selectively carried back to the calling party. However, a busy party is prevented from being reached by his own called code, and therefore he can not impress his answering called-to-calling speech signals on the calling code. In such a case the busy connector modulates the calling code with a busy signal tone which is thereby selectively carried back to the line circuit of the calling party to inform him of the busy condition of the called line;

Fig. 9 is a circuit diagram of a selector, a component common to a group of subscribers' lines but individually allotted to any calling line in the group for the duration of a call which it initiates. One selector is permanently connected to each line finder which is effective to keep it engaged for as long a time as that line finder continues to hold onto a seized pulse series, i.e. until the calling subscriber hangs up his handset. The code set up by the translator (Fig. 6a) is transferred to a set of gas tubes in the selector where it is represented in that some of the gas tubes are ignited and others are not. There is in the selector a second set of gas tubes for similarly representing the calling subscriber's code which it receives from his line circuit over an outgoing circuit of the first network. A component of the selector seizes an idle pulse series, representing a free time channel available in the second network and employs each pulse of this series to gate out to outgoing circuits of that network one pulse from each ignited gas tube of each set of tubes, thus producing simultaneous sets of pulses comprising, respectively, the called party's code and the calling party's code. At the output of the selector the called code appears for the first time in the form of a reiterated set of pulses and the selector directly produces it in the allotted free time channel. On the other hand the calling code which was already in the form of a reiterated set of pulses when it entered the selector is transferred from the assigned time channel of the calling party to the same alloted free time channel.

Figure 9A:
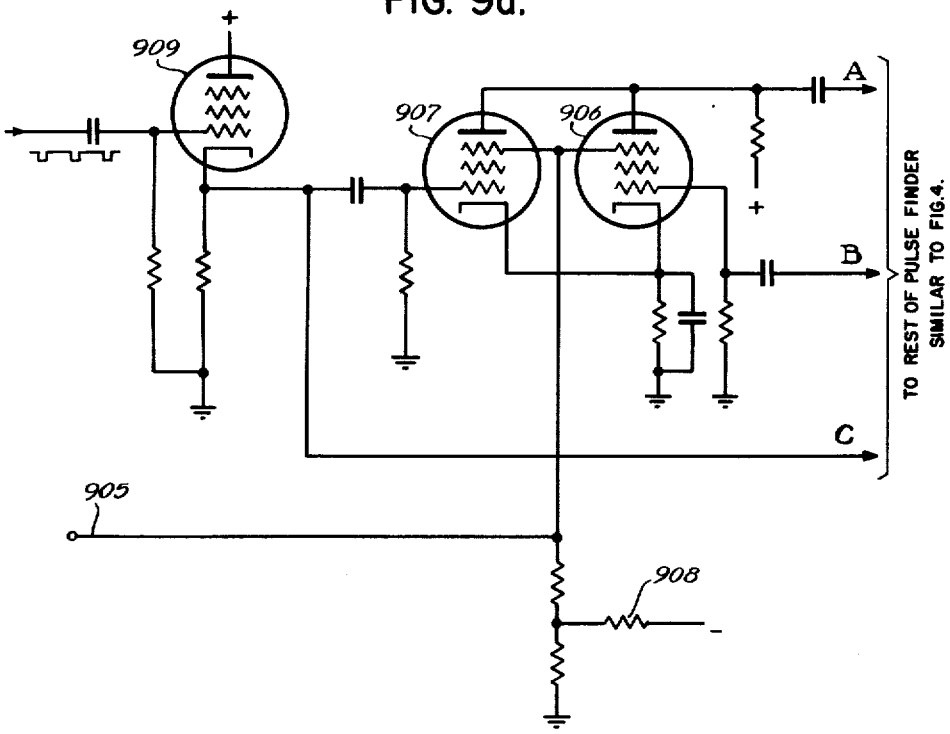
Figure 10:
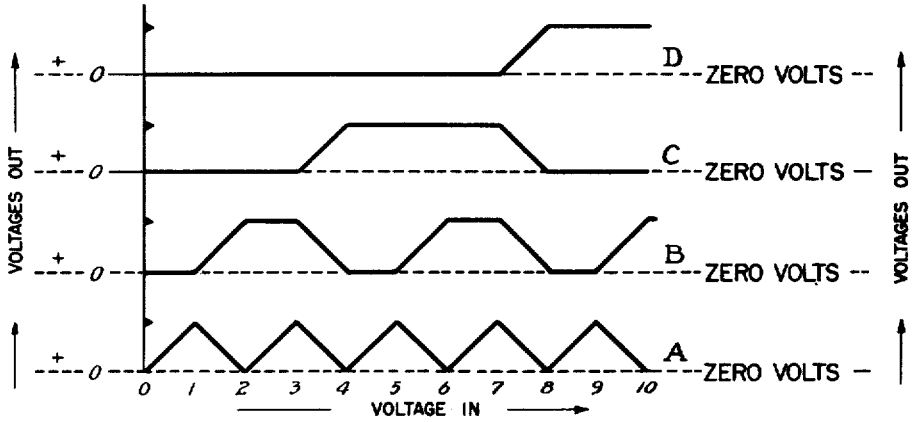
Figure 11:
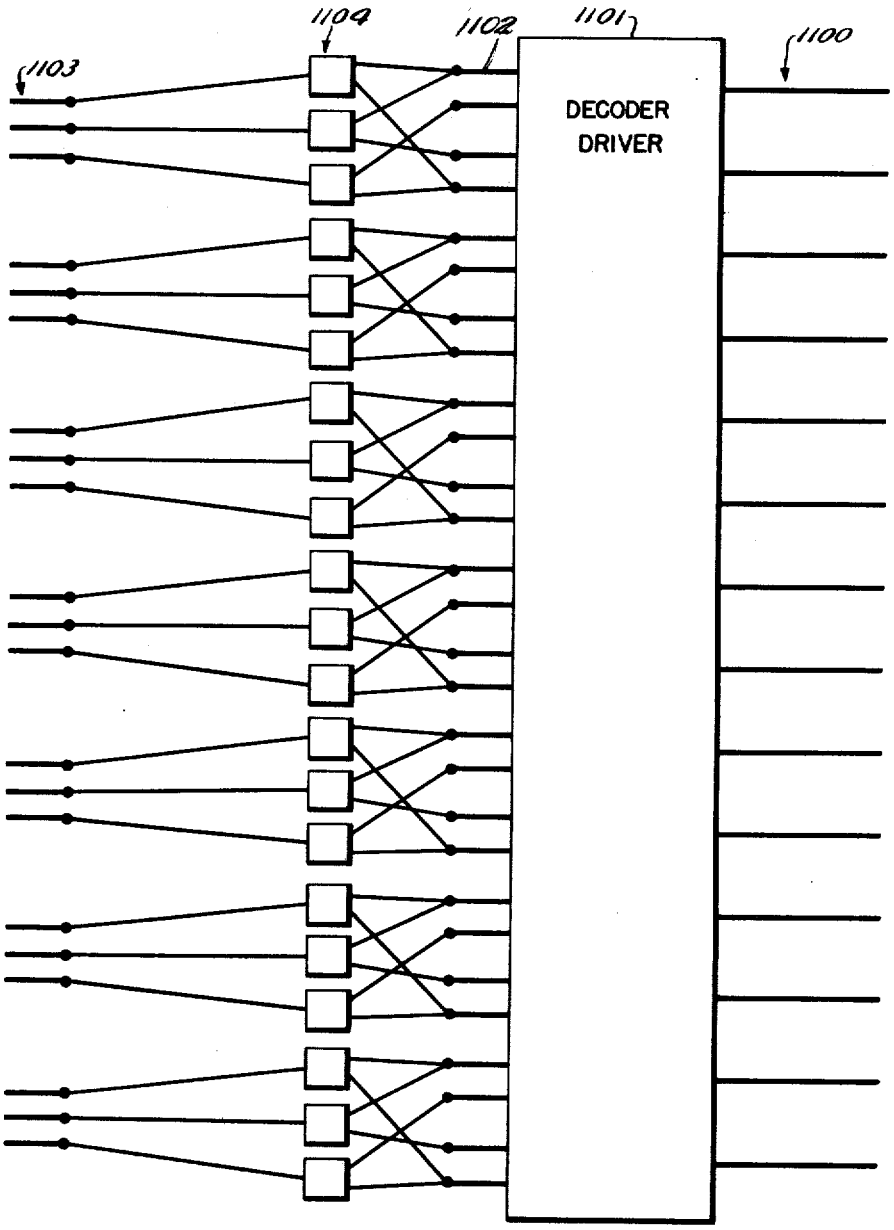

Fig. 9a is a circuit diagram of a portion of the pulse finder of the selector;

Fig. 10 is a family of four characteristic curves, respectively showing the output voltages which appear individually on four output branches of one section of a translator (Fig. 6a) for ten different input voltages which might be received on its common input lead. Each of the characteristic curves represents a plot of output voltages vs. input voltages. The combination of output voltages which will be produced on the four output leads for any assumed input voltage may be obtained by drawing a vertical line starting from the point on the horizontal coordinate which represents that input voltage and intersecting all of the characteristic curves. The voltage on each output may be read from the vertical coordinate by extending to it a horizontal reference line starting from the point where the vertical line intersects the characteristic curve for that output. It will be seen that for the family of curves shown a different output code will be produced for each of ten successive upward steps of one volt each; and Fig. 11 is a block diagram of a code adapter.

GENERAL DESCRIPTION OF OPERATION

Figure 1:
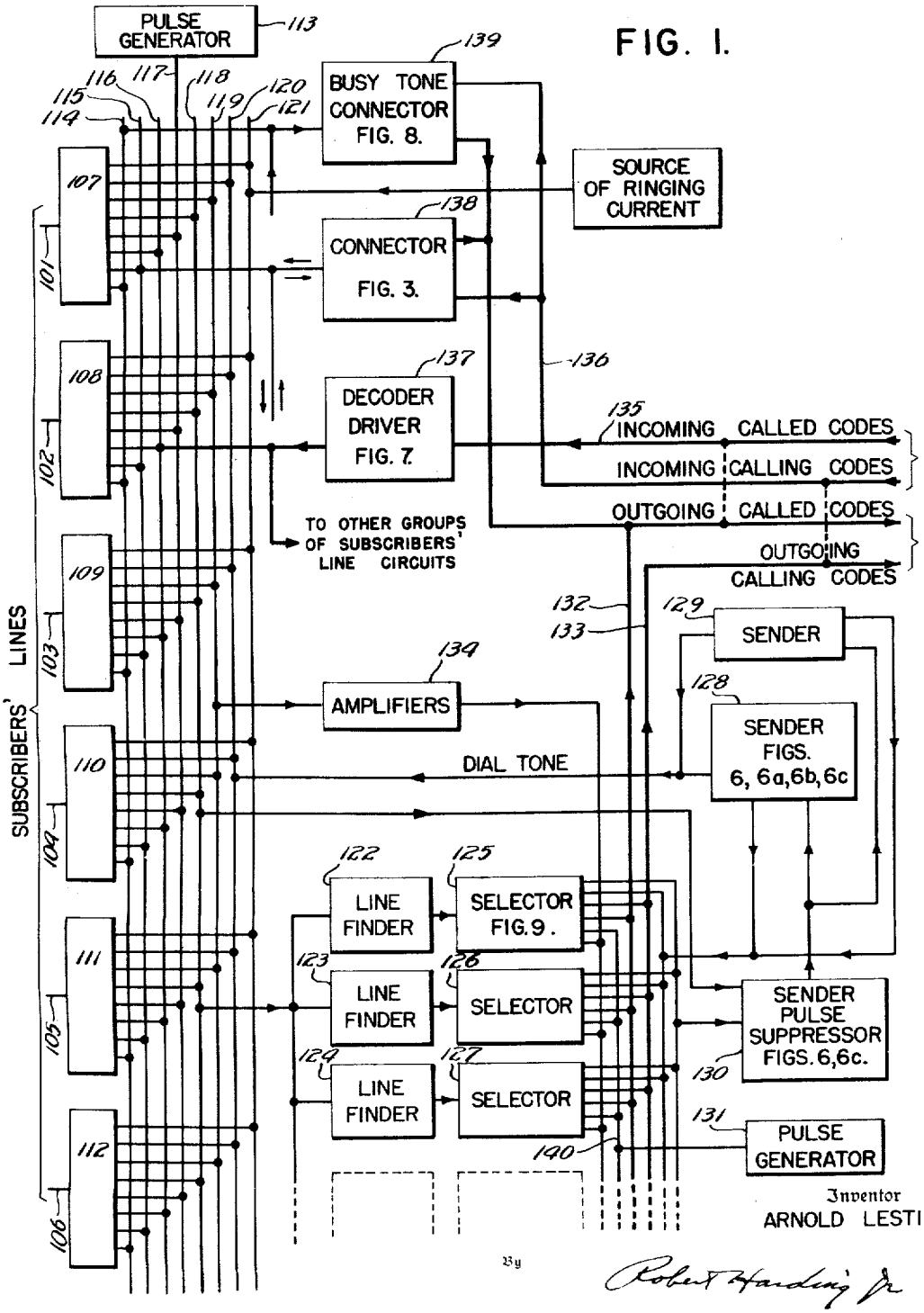
Fig. 1 is a block diagram representing the exchange system.

The over-all operation of this system is best understood by reference to Fig. 1. Any station can communicate with any other either as a calling or as a called station. However, the transmission paths followed between two stations will be somewhat different depending on which of the two parties originated the call.

In Fig. 1 there are represented several sets of code-carrying buses which are common to the whole exchange and comprise outgoing and incoming circuits of the second common network. In addition there is represented a group of conductors and sets of buses 114—121 which comprises an example of a first common network affording common transmission media to be used by a group of stations to each of which is permanently assigned a different time channel. To distinguish the sets of buses of the second network they are represented by heavy lines. Each heavy line represents a parallel set of conductors such as a group of fourteen coaxial transmission lines. The sets of buses of the second network are sometimes referred to herein as sets of main buses. The physical extension of the main buses will depend upon the physical arrangement of the various components within the central exchange. Accordingly, if coded pulses must travel for a relatively long distance, for example from a group of selectors on one floor of the central exchange to a decoder driver on a different floor, the main buses interconnecting them may be runs of coaxial cable. Similarly, where a call is routed to another central office on a coded set of pulses acting as a carrier, the interoffice trunk would consist of a set of coaxial transmission lines. However, in many portions of the system, for example in connecting a group of selectors to a set of main bus bars, the equipment will preferably be grouped closely together and sets of code carrying conductors and even the main buses in those portions of the circuit will consist of short leads of simple wire connections.

Figure 2:
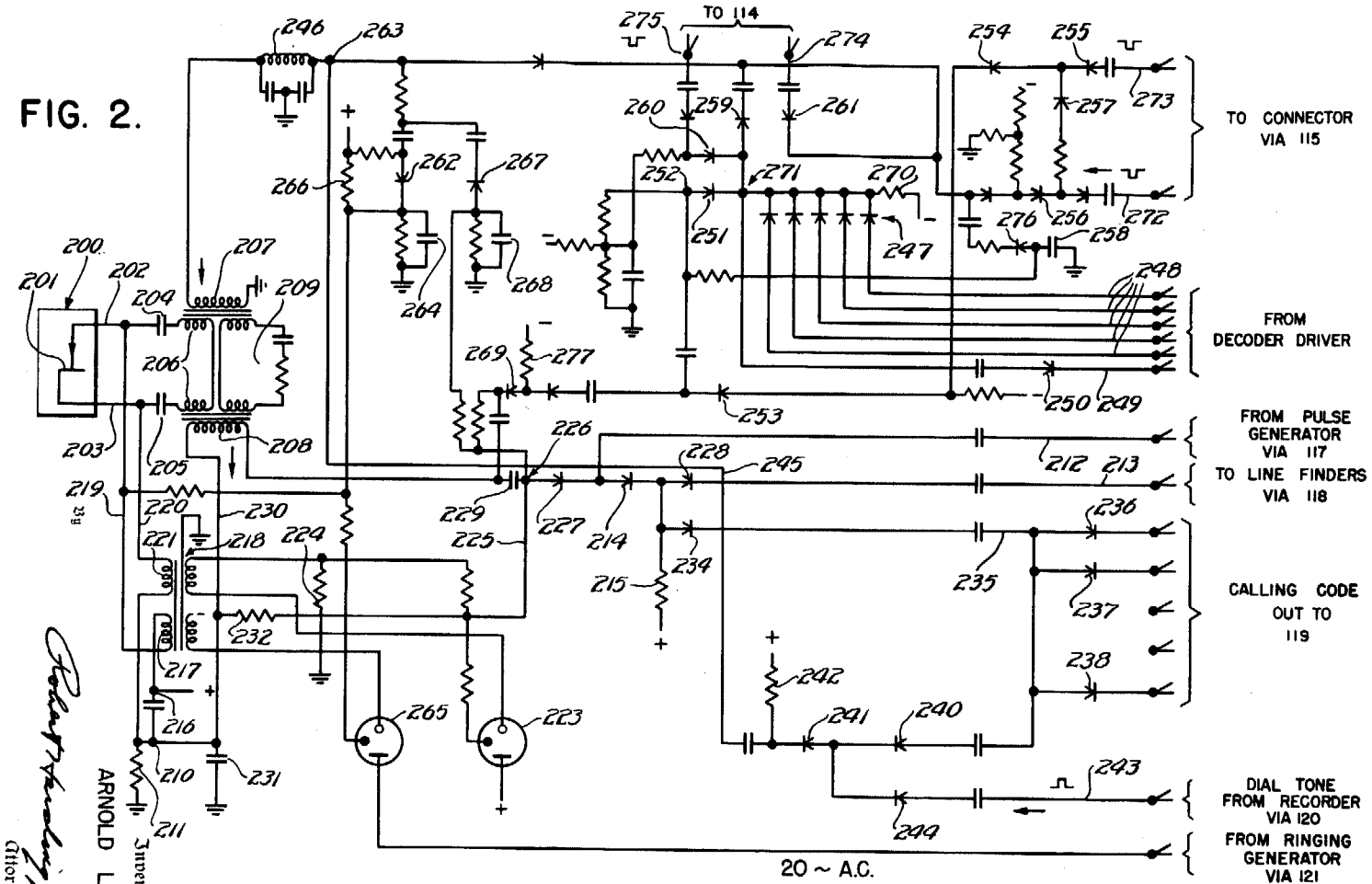
Fig. 2 is a diagram of a single line circuit in which one subscriber's line terminates.

Subscribers' lines 101, 102, 103, 104, 105, 106 extending individually from subscribers' stations to the central exchange terminate in individual line circuits whose details are illustrated in Fig. 2. The line circuit of subscriber's line 101 is indicated at 107, that of 102 at 108, and that of the other four lines represented in Fig. 1 at 109, 110, 111 and 112, respectively. The conductors and sets of buses 114—121 are multiplied to different inputs and outputs and sets of inputs and outputs of a group of say 200 subscribers' line circuit represented by the six, 107—112, shown in Fig. 1. They individually feed into and are fed from these inputs and outputs and sets of inputs and outputs of any line circuits of the group which are involved in calls, in certain cases in the private time channels permanently assigned to the calling ones of those line circuits and in others in time channels temporarily allotted to the calls. The maximum number of line circuits which can be grouped together will depend on the maximum number of time channel designating pulses which can be crowded into a single period at the repetition rate of the individually assigned pulse series. The pulses in these series must have a supersonic repetition rate, or at least a repetition rate high enough to be cut off by the response characteristics of audio-carrying elements of the circuit and thus to be inaudible to the subscribers. Since pulse-carrier multiplexing is well known it is unnecessary further to describe design principles for determining how many subscirbers' lines will be grouped together.

A delay line 117, comprising 200 sections in series and an output tap at the end of each section is fed from a generator 113 which produces pulses having a repetition rate of perhaps 10 kc. These pulses are fed into each of the line circuits over a different tap as a pulse series in a predetermined different time channel. The exact manner in which the pulses from generator 113 are distributed to the several line circuits in different time channels, is not an essential part of the invention. To supply time channels for a group of two hundred line circuits each pulse should have a duration of the order of .25 microsecond and each section of delay line 117 should produce a delay of .5 microsecond if it is desired to provide .25 microsecond intervals between adjacent time channels. By feeding the pulse series from each tap to the pulse receiving input of a line circuit over a cathode follower, instead of directly, the attenuation at each tap will be very slight and the input pulse series from generator 113 will succeed in passing along the full length of the delay line to supply all of the line circuits with pulses.

The input into any single line circuit consists of a 10 kc. pulse series in a private time channel. When no station of a particular group is calling, the pulses originating in generator 113 will not get much further than the pulse input terminals of the various line circuits. However, when one of them is calling, e.g. when the subscriber thereat takes the hand set off its cradle, the pulse series entering that station's associated line circuit from delay line 117 will be routed through the line circuit to bus 118 of the first network where it will be available for seizure by an idle line finder. In due course and during successive parts of the call this pulse series will be amplitude modulated by dial tone, by the calling subscriber's dialing impulses, and finally by his voice.

This assigned pulse series of the calling line will be seized from bus 118 by an idle one of a group of line finders presented in Fig. 1 by a group of three blocks 122, 123, 124. These line finders are fed in series over a chain circuit which is connected to bus 118 on its input end. The number of line finders required for a group of 200 subscribers' line circuits will depend upon the probable peak traffic within that group. For a typical 10,000 line exchange about sixteen line finders per group of 200 subscribers should suffice. In such an exchange there will be 50 groups of 200 subscribers' lines and line finders of the order of $50 \times 16 = 800$. The line finder which seizes a calling pulse series from the first common network will deliver the pulses to its associated selector 125, 126 or 127. Both the line finder and its associated selector will remain engaged during the entire call. Once the pulse series of a calling line has been seized by one line finder, none of the other line finders can seize the same pulse series.

On bus 118 this pulse series is available for seizure not only by a line finder but also by the pulse seizing circuit of a sender 128 or 129. The pulse series is routed to the senders from bus 118 through the circuits of sender pulse suppressor 130. The number of senders required for a group of line circuits depends partly on the probable peak traffic within that group and partly on the time during which a sender must remain engaged to perform its function. The total number of senders required for a 10,000 line office employing regular dialing equipment would be about 90 or 100 or about two for each group of 200 lines. If keys instead of regular dials are employed at the stations, the average time of engagement of a sender would be shorter and therefore a reduced number would suffice.

Each sender is equipped with a pulse seizing circuit of its own, i.e. a circuit like that of a line finder. This circuit can only seize one pulse series at a time and when it has done so no other sender will be able to seize the same pulse series.

The sender first makes use of a seized pulse series for privately sending dial tone back to the calling party and then for receiving the sequentially dialed impulses designating the called party. It registers all of the dialed digits and thereafter translates them into a code representation which it does not retain but sends to the selectors 125, 126, 127. The selector associated with the engaged line finder will seize and retain the code representation. In addition it will send the pulse series of the calling station (which it receives from its associated line finder) to pulse suppressor 130 to disengage the sender by blocking the input to its pulse seizing circuit in the time channel of the calling station. At any given time suppressor 130 will receive a number of pulse series which depends on the number of engaged selectors, i.e. the number of simultaneous calls, and at that given time it will act to block the input to the series connected pulse seizing circuits of the senders 128, 129 in the time channels of all of the calling stations involved in the calls. Once a sender has been disengaged from a call it is free to seize a calling pulse series in any of the free time channels.

Since the sender feeds dial tone only to the one first common network of the group of line circuits which it serves (since it does not feed it to a circuit, such as the second common network, which is connected to all of the line circuits in the entire exchange) no code is necessary to keep the dial tone from other than the calling party. The dial tone is carried on the pulse series which is assigned to the calling station and therefore it can be fed to all of the line circuits of this group over their first common network and yet be accepted only by the correct calling line circuit. This is accomplished by the use of a coincidence circuit in each line circuit whereby it accepts back from the senders only the dial-tone modulated pulse series which is in its own time channel.

For code representations produced by senders of the type shown herein if n equals the number of elements in each code then the number of different codes which will be possible will equal $2^n$ and n will also equal the number of buses required in each set of code carrying buses. As will be described below each code eventually will reach the incoming circuits of all the first common networks in the exchange and it will be selectively accepted at one line circuit in one first common network, i.e. at the one line circuit which that code represents. Thus, in addition to the use of different time channels for distinguishing between a limited number of line circuits within a single group, different codes are individually assigned to the line circuits for distinguishing between all of them in the exchange. This will be possible no matter how large a number of them there are simply by choosing a proper value for n. In fact, an extremely wide range of selection will be available even if n is relatively small, i.e. even with the use of a relatively small number of code elements. For example, if the code consists of 14 elements the number of different line circuits that can be selected is 16,383. Actually $2^n$ equals 16,384, but in the present embodiment certain of the circuits are so arranged that no code can be utilized unless it has at least one pulse-element. Therefore, there is just one code which is not available for use. It is the one in which every element would consist of the absence of a pulse. Thus, the number of different selections which are possible is reduced to 16,383.

A pulse generator 131 feeds reiterated frames of pulses to a bus, of the second common network, which is connected to several, or all, of the groups of selectors in the exchange. These pulses afford private time channels, which may be individually selected by pulse finders included in the selectors, and allotted to individual calls, for use in the second common network. A time channel so allotted will not be related to the time channel permanently assigned to the calling party and applied to his line circuit over the first common network from pulse generator 113. Pulse generator 131 may be common to a large number of groups of subscribers' lines or to all the groups thereof in the entire exchange. For example, in a 10,000 line exchange in which peak traffic of about 400 simultaneous calls is expected it would be desirable, if practicable, to use a single pulse generator 131 producing 10 kc. frames of pulses, each containing 400 pulses. As will be more fully explained below, there must be a sufficient interval between successive pulses in the frame so that at another point of the circuit a pulse may be delayed slightly more than its own duration so as to fit in between its normal position and the position of the next pulse in the frame. Thus, two adjacent time channels will be made available for two-way conversation. This imposes an even more rigid requirement in the matter of designing pulse generator 131, namely that the pulses must be only about half as wide as they would be were it not for this provision.

Where it is not feasible to use a single pulse generator for providing all of the necessary time channels for the traffic, two second common networks may be employed, each fed with frames of time channel pulses from a separate pulse generator like 131. Means must be provided for gating into the selectors, for seizure by their pulses finders, pulses provided by a second pulse generator 131 whenever all the pulses of the first generator 131 have been seized by other selectors and for switching the coded outputs of the selectors to the duplicate or spare second common network. A circuit meeting these requirements may readily be designed by one skilled in the art on the basis of the principles of operation of the various components shown herein.

Figure 5:
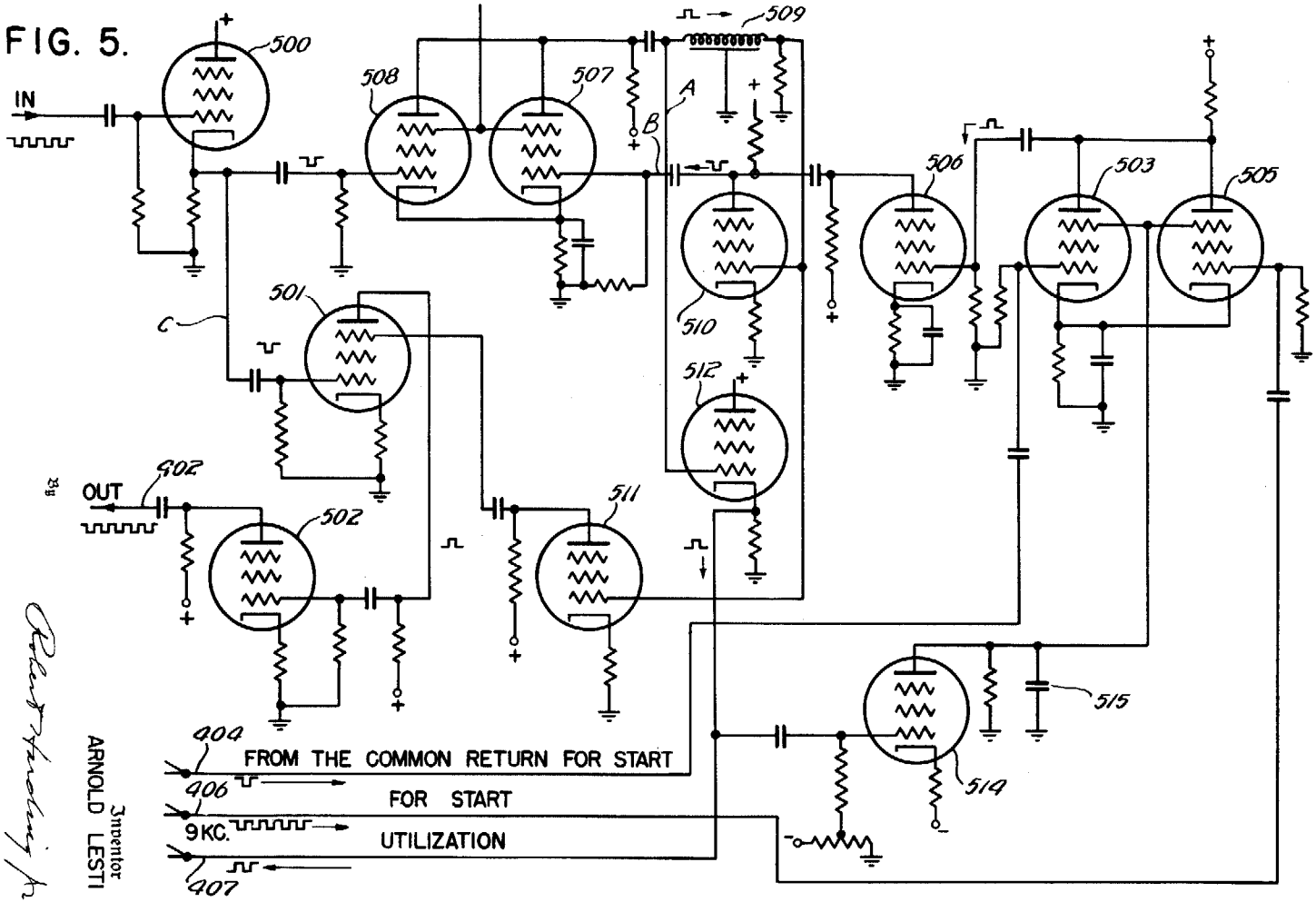
Fig. 5 is a circuit diagram of a single line finder.

Each selector comprises a pulse seizing circuit similar to the circuit of a line finder (Fig. 5). When a line finder seizes a pulse series in the first common network it delivers this series to its associated selector where it is used to produce a biasing voltage which prepares the pulse seizing circuit of the selector to seize a pulse series in the second common network. A little later dialing will be completed and the sender will transfer to the selector its called code representation which will serve to set code-producing circuits in the selector. As soon as this is accomplished the pulse series seized by the selector from the second network will become effective to gate out onto an outgoing set of main buses of the second common network sets of pulses embodying the called code and occurring in the time channel of the pulses seized from 131, which channel thus becomes allotted to the call.

The second common network comprises at least four sets of main buses; one set 132 for carrying outgoing coded sets of pulses denoting the called part (this is the set of buses upon which the selector discharges the sets of pulses referred to above), a set 133 for outgoing coded sets of pulses denoting the calling party, a set 135 for incoming codes denoting the called party and a set 136 for incoming codes denoting the calling party.

Both outgoing codes are produced in response to actions of the calling party. His own code is instantaneously produced by his line circuit as a result of his raising his hand set, and the called party's code is later set up as a result of his dialing of the party's number. The outgoing called codes will carry speech impressed upon them by the calling party.

For each call the calling and called codes sent out from a selector are in the same time channel. Therefore to avoid interference the calling code is sent out on a separate set of bus bars 133. This code at this point does not carry any speech or other modulations. However, it is fed from buses 133 to the connector 138, Fig. 1 where later it will be modulated with the called party's answering speech. To this end the connector is arranged to exploit the fact that the called code is synchronous with the calling code. The called code, of course, is accepted at the called party's line circuit at which the modulations representing the calling party's speech are detected and fed to the called party's line. The line circuit is further so arranged that whenever, during lulls in the conversation of the calling party, the called party responds, his answering speech will modulate a pulse series produced from the called code and will be carried thereon out of the line circuit to connector 138 which thereupon acts to transfer the answering speech modulations to the calling code. It is particularly convenient to do this since the two codes are synchronous. After the calling code has been thus modulated it is routed out of connector 138 to the same set of main bus bars 132 which is carrying outgoing called codes (and in particular the outgoing called code for this call) and it will thereafter find its way to the calling subscriber's line circuit just as though he were being called with that code. However, at this point both the calling and called codes for a particular call occur on the same set of bus bars and therefore they cannot be permitted to continue to occupy exactly the same time channel. For this reason connector 138 is further so arranged that it slightly delays the pulses comprising the calling codes so that each calling code will fall in the interval between the time channel of the called code used for the same call and the next time channel provided by generator 131.

The calling code set up by the calling subscriber's line circuit initially appears in the first common network on a set of bus bars generally indicated by the reference numeral 119 and shown in the drawing as a single line. The sets of pulses comprising the calling subscriber's code occur, of course, in the time channel permanently assigned to that subscriber. The selector which handles the call will, however, change the phase of the calling code pulses so that they will occur in the time channel which it seized from generator 131 for use in the second common network. Any calling subscriber's code which appears on bus 119 will be transmitted through amplifiers 134 to the group of selectors 125—127. The selector associated with a line finder which has seized the calling subscriber's pulse series will accept the calling code which is synchronous with it and will utilize it for igniting appropriate ones of a set of gaseous discharge tubes. Thereafter it will utilize the pulse series which it seized in the second common network to gate out the calling code to the set of main bus bars 133.

The calling and called outgoing codes may be transmitted over their respective sets of main bus bars (coaxial cables) 132, 133 to a distant exchange which operates according to the present system. However, for completing calls between subscribers in the same central exchange the set of main buses 133 for outgoing calling codes is connected to the set of main buses 136 for incoming calling codes. Similarly, the main outgoing called buses 132 are directly connected within the exchange to the main incoming called buses 135.

The set of main incoming called code buses 135 feeds into the decoder driver 137. If the traffic for a given central exchange can be handled without the need for overflow or spare sets of buses, i.e. if the probable peak number of calls is not too much greater than the number of time channels which can be carried on a single set of buses, then a single decoder driver will suffice. The function of driver 137 is to translate each received code into a form which is suitable for actuating the decoder of a line circuit. Driver 137 has one input connected to each bus in the set of main buses 135 for incoming called codes and it has a pair of outputs for each input. Its function is to produce a pulse on a first one of the pair of outputs when the code element received on the corresponding single input is a pulse and for producing a pulse on a second one when that code element is represented by the absence of any pulse. Each line circuit includes a decoder having n inputs which are connected over the incoming circuit of the first common network to a predetermined different combination of n of the $n \times 2$ outputs of the driver, the combination including one output of each pair thereof. Thus, when the driver receives the code of a particular line circuit it will deliver to the decoder thereof a reiterated full set of n pulses, i.e. of as many simultaneously-occurring pulses as the number of elements in the code. Each decoder is so arranged that it will be actuated only when it receives pulses simultaneously on all of its inputs. This will occur when driver 137 receives the correct input code for designating the line circuit of that decoder even though the code as received by the driver is in a form in which it does not include a full set of n pulses, i.e. the form in which it is made up of n elements certain ones of which will be represented by the absence of a pulse.

The output of the decoder in any line circuit consists of a pulse series carrying the speech modulations of a subscriber engaged in the call. In due course these modulations will be detected in the line circuit and transmitted over the subscriber's line to his station. However, before this occurs the pulse series is temporarily transferred out of the line circuit over the first of a pair of buses of the first network which together are represented as a single line 115 in Fig. 1, and is sent to the connector 138 which amplifies it and returns it over the second bus of the pair 115. Within the line circuit the amplified pulse series is routed to a demodulator whose audio output is sent to the station connected with this line circuit. The pulse series returning from the connector, even though it passes over a bus which is multiplied to all of the line circuits of the group (one of the buses of the pair 115), will not be received by any other line circuit because a coincidence circuit is provided in each line circuit which rejects all the pulse series returned from connector 138 except the one which is in synchronism with the outgoing pulse series sent to it from that same line circuit.

As soon as a decoder has accepted a series of full sets of n pulses representing the called line, some of the energy of its output single pulse series is translated into a bias for readjusting the decoder to operate at a higher signal level. This does not disable the decoder from retaining the accepted series since the new requirement is immediately satisfied by utilization of the amplified pulse series being returned from the connector. If during this period of time a third station seeks to call the same called station and, therefore, the same called code reaches the same line circuit and its decoder, the level of pulses in the code will not be initially at a sufficiently high level to operate the readjusted decoder. Under such circumstances, the busy tone connector 139 will be actuated to impress a busy signal tone as modulation on the calling code of the station which is seeking to break in. This modulated code will be returned from the busy connector to a set of main common buses and eventually to the last mentioned calling station to reveal the busy condition of the called line.

When it is desired to establish connections between two central offices then the two outgoing sets of main buses 132, 133 will give access to all of the outgoing trunk repeaters. Where it is necessary, the code combinations may be employed to operate suitable outgoing repeaters for translating the code into signals appropriate for the called office. The called office will send a signal to the incoming office trunk repeaters which will translate the signal into the appropriate pulse code on the two incoming sets of main buses 135, 136. The manner in which these alternative operations can be effected will be clear from the detailed description of component parts which is to follow.

When a train of full sets of n pulses is first accepted by a decoder the single output pulse series which it produces in response thereto will be applied to another portion of its line circuit for firing a gas tube which applies ringing current directly to the called subscriber's line. This gas tube will be extinguished when the called subscriber raises his set to receive a call.

It is in large exchanges that the greatest efficiency is obtainable in the utilization of code-producing circuits, code-transmission media, and code-accepting circuits. This is so because the number of possible different codes, $2^n$, will increase very rapidly as the number of elements constituting each code is increased above a small number such as 9 or 10. Thus, whereas the system will require a 14 element code to afford 16,384 different codes, the addition of a single element will raise the number of possible combinations to twice 16,384 or 32,768. It is possible further to increase the number of possible combinations by choosing from more than two possible conditions to represent each element of the code. For example, in contrast to the present illustrative embodiment in which each element of a code either takes the form of the presence or the absence of a pulse on a given conductor in a given time channel, it is possible to embody the present invention in a system in which each element of a code can take any one of a plurality of forms. The formula for the number of different codes in which each element may have r different conditions is $r^n$. In general the driver must be designed to include a group of r outputs of each input and to produce a pulse on only a particular one of these outputs for each different one of r conditions which may obtain for the code element received on this input. The decoders are the same irrespective of the value of r but the number of possible different connections to the driver for each input of a decoder will depend on r, i.e. will equal it. Only obvious changes need to made to the sender-translator (Fig. 6a) to adopt it for different values of r. And as to a selector, in general it should be designed so that the various ones of r different conditions that are set up or represented in the translator for different elements of a code will be retained at the outputs of the selector from which the code will issue in its final form, for example as reiterated sets of pulses of different amplitudes (including zero, if desired) and/or of opposite polarities. In the embodiment shown herein one decoder driver 137 translates into the proper form for operating the decoders the codes produced by many groups of selectors. This arrangement permits two economies: (1) it simplifies the circuits of say 800 selectors; (2) it makes it possible for the sets of main bus bars to be limited to including only as many individual buses (n) as the number of elements in the code instead of r times as many. However, if desired the common driver may be replaced by means in each selector for directly producing onto an enlarged set of main buses 132 (comprising $n \times 2$ or $n \times r$ buses) reiterated full sets of n pulses representing individual codes in that the n pulses of each code are carried on a particular combination of n buses in the enlarged set thereof.

On the other hand, the code need not consist of sets of pulses individually carried on different buses. Instead, the pulses may be superimposed on different carrier frequencies and transmitted over a single bus or through the air. The code elements could be transferred from the individual channels provided by the different carries to different metallic conductors by the use of filters and tuned circuits well known in the art of carrier multiplexing, these different conductors individually feeding the n inputs of the driver.

Moreover, in a small exchange where the traffic is so light as to require only a fraction of the available time channels, it would be feasible to carry the individual code elements in different time channels over a single bus instead of in the same time channel over a set of buses. Each call would utilize a group of n time channels. The number of such groups which can be provided by each frame of pulses produced by generator 131 will determine the peak volume of traffic, the possible number of groups being equal to the number of pulses in each frame divided by the number of elements in each code. The circuits which will be required to use this type of coding will be obvious to those familiar with the art of multiplexing.

Where for any reason the number of buses in each main set must be kept small it will be feasible to use a smaller number of elements in the code but a larger number of conditions for each element, for example, in the formula $r^n$, r might be made equivalent to 3 instead of 2 and n to only 9 instead of 14.

ESTABLISHMENT OF CONNECTIONS TO FIRST COMMON NETWORK LINE CIRCUIT (FIG. 2)

Each line circuit is an individual two-directional link between a particular subscriber's line and the first common network.

For a given call certain of the functions performed by a line circuit depend on whether its associated station received the call or initiated it. Whenever a subscriber wishes to make a call he removes his receiver from the switch hook, or his telephone hand set from the cradle, and after receiving dial tone he dials or otherwise indicates the digits of the desired called number. Block 200 represents a substation comprising a pair of contacts 201, by means of which the subscriber's loop or line 202, 203 may be interrupted to dial the called number. This line corresponds to a line such as that indicated at 101 in Fig. 1. The rest of what is shown in Fig. 2 is equipment at the central exchange which was indicated by a block such as 107 in Fig. 1. Through condensers 204, 205 the line conductors 202, 203 are connected with windings, 206 of a transformer. Windings 207, and 208 of the transformer are inductively coupled with 206 and with windings forming part of a balancing network 209. Normally while the line 202, 203 is open at the substation, point 210 of the circuit is at ground potential applied thereto over resistance 211. The pulse series provided for this line circuit is fed from pulse generator 113 (Fig. 1) over a tapped delay line (117, Fig. 1) to input conductor 212. So long as point 210 remains at ground potential this pulse series will not be transferred back out of the line circuit over output conductor 213 to bus 118 (Fig.1) of the first network. The reason for this is that a rectifier 214 which is in series between conductors 212 and 213 has applied to its output side a positive bias greater than the amplitude of the positive pulses in the pulse series fed to its input side over conductor 212. The output side of the rectifier is the one which offers high resistance to positive voltage. Because of this the rectifier does not short circuit the source of biasing potential and it affords a low impedance path for positive pulses in the direction from conductor 212 to conductor 213. Despite this low impedance path, however, the pulse series will not leave the line circuit over conductor 213 so long as the bias continues to be applied. The bias is applied over a resistor 215 from a source of potential designated as +.

When the subscriber closes the line loop at substation 200, by removing his receiver or raising his hand set, a current loop will be provided for the flow of current from a source of positive potential (also designated + in Fig. 2 and shown to be applied at circuit point 216), through primary winding 217 of a transformer 218, conductor 219, line conductor 202, contacts 201 at substation 200, line conductor 203 and conductor 220, primary winding 221 of transformer 218, resistance 211 to ground. The voltage drop across resistor 211 will raise the potential of point 210 to a positive value. This positive potential will be applied to cold cathode gas triode 223 causing it to fire. The anode current of gas tube 223 will flow downward through resistor 224 to produce a positive potential at its upper end. This will be applied via conductor 225 to a point 226 from which it is applied over another rectifier 227 to the same side of rectifier 214 as that to which the positive pulses are applied. Thus, the pulses will be superimposed on a direct positive potential and their tops will extend above the level of the positive bias applied to rectifier 214 over resistor 215. The positive pulse series will, therefore, pass through the low impedance path afforded by rectifier 214 and thence through another similarly poled rectifier 228 and out of the line circuit to bus 118 (Fig. 1) of the first common network where they will be available for seizure by a "line finder."

As will be clear from the description of a line finder, the mere presence of any unseized pulse series on bus 118 indicates that a call has been initiated on a subscriber's line. Gas tube 223 is used for creating the bias-opposing potential for rectifier 214, in preference to using the positive potential developed at point 210, because the voltage produced by the firing of the gas tube will persist for the whole duration of the call, whereas the voltage at point 210 will be disturbed during dialing. Moreover, it is desirable that the voltage impulses later to be created at point 210 in response to dialing be additive to some earlier-developed and continuously-applied bias-opposing voltage to the end that, while the latter permits the pulse series to pass out of the line circuit to bus 118, the former can be effectively employed for modulating the pulse series in accordance with dialing.

Finally as will be more fully described below each line circuit comprises means for disabling its gas tube 223 whenever the line is called so that when the subscriber at station 200 lifts his hand set to answer the call, tube 223 will not fire and his pulse series will not be routed from conductor 212 to conductor 213 and thence to bus 118.

In the circuits shown herein a number of rectifiers are employed which, in conjunction with appropriate fixed biasing voltages and bias-opposing gating pulses, perform various functions which will be described fully. In addition, there are shown in the drawing certain other rectifiers which serve to prevent back flow of current and interference between circuits.

The rectifiers may be crystals or any other suitable dry rectifiers.

DIAL TONE

As will be fully described below, the pulse series delivered to bus 118 from conductor 213, in addition to becoming immediately available for seizure by an idle one of a group of "Line Finder" pulse seizing circuits, also becomes available for seizure by an idle one of a second group of similar pulse seizing circuits individually provided in the senders. A pulse series which has been seized by the pulse seizing circuit of a sender is modulated with dial tone and is then fed via bus 120 (Fig. 1) of the first common network in multiple to the conductors 243 of all of the subscribers' line circuits of the group.

If two stations call simultaneously, two pulse series will be seized and they both will be delivered to the input conductor 243 of every line circuit in the group, but only at one of the calling line circuits will either one of these series be in phase with the pulse series which is permanently assigned to it, i.e. in phase with the pulse series entering it on conductor 212 and leaving it on conductor 213. In each calling line circuit this pulse series in passing through rectifier 214 on its way to bus 118 will also tend to pass through rectifier 241 via rectifiers 234, 240. However, a positive bias is applied to the output side of rectifier 241 over a resistor 242, and affords a counter electromotive force opposing the transfer of the pulse series through it. One of the two pulse series delivered to conductor 243 of each one of the calling subscribers' line circuits from the group of senders will be in synchronism with its assigned pulse series. These synchronous pulse series in each calling line circuit will add together at the input side of rectifier 241 and the resultant pulse series will have adequate amplitude to overcome the bias on the rectifier and to pass through it. The other pulse series will not be in synchronism with its assigned pulse series and will not be assisted to pass through its rectifier 241. The dial tone modulations of the pulse series accepted back by a calling line circuit from the sender to which it sent that series are used to inform the calling station that the sender is in condition to receive dial impulses. To this end the additive pulse series which alone passes through rectifier 241 is transferred over conductor 245 to a low pass filter 246 which separates the dial tone from the pulse carrier and forwards the dial tone component to winding 207 of the subscriber's terminating transformer. Thus, dial tone becomes audible to the calling subscriber informing him that he may commence dialing.

DIALING

The dialing will open and shut contacts 201 to cause groups of interruptions of the line loop, each interruption transiently permitting point 210 to return to ground potential from the positive potential it assumed when the hand set was first raised. The resulting train of substantially square wave voltages is added via resistor 232 to the positive voltage produced across resistor 224 by the firing of gas tube 223 and the additive result will appear at point 226 variably to oppose the bias on crystal 214 and therefore to allow more or less of the full amplitude of pulses in the pulse series present on conductor 212 to pass from it to conductor 213. This effects a modulation of the pulse series, changing the amplitude of successive groups of pulses therein between a relatively high and a relatively low value. Thus, the pulse series seized by a sender (and seized also by a line finder) will carry modulations representing the dialed impulses of the called number. As will be explained below, the sender translates these modulations into a representation of the code of the called party.

CALLING STATION'S OUTGOING TALKING CIRCUIT

In the present system selection is accomplished substantially instantaneously upon the completion of dialing and (unless the called party is busy) ringing currents will be applied to the called line immediately thereafter. Therefore, very soon after he has finished dialing, the calling subscriber will be able to commence his conversation.

The lower secondary winding 208 of the subscriber's terminating transformer includes a load circuit for speech currents comprising a resistor 232 connected in series with a condenser 229 over conductor 225. One end of resistor 232 is grounded over a condenser 231. Voltages are developed across resistor 232 in accordance with the speech currents through the secondary and they are applied from its ungrounded end and over conductor 225 to conductor 213 at point 226. Point 226 is on the same side of rectifier 214 as that to which there are applied both the pulses from conductor 212 and the bias-opposing potential produced by gas tube 223. Therefore, the instantaneous variations of these speech voltages are added to or subtracted from the direct potential developed across resistor 224 so as to determine exactly what portion of each pulse leaving the line circuit over conductor 213 will pass through rectifier 214 and thus to amplitude modulate the pulse series.

CALLING CODE SET UP

Once the pulse series of a calling line circuit is routed to its conductor 213 it will also reach conductor 235 via the rectifier 234. From conductor 235 it is fed in parallel to a group of less than n rectifiers 236, 237, 238 feeding an outgoing circuit of the first common network, i.e. each rectifier feeds a predetermined one of an outgoing set of n buses represented as a single line 119 in Fig. 1. In this way the code of the calling party is sent out over the first network. It will be in the form of a coded set of less than n simultaneously occurring pulses distributed on predetermined ones of the n buses and reiterated in the time channel assigned to the calling party.

Since by way of example n is being considered as having a value of 14, the set of buses 119 will include 14 buses and only predetermined ones of them will be fed with a pulse series over a set of less than 14 rectifiers such as the set 236—238. In each line circuit the number of rectifiers in its set therefore will depend on the number of pulse-elements in the code assigned to that line circuit, and through-connections to certain ones of the set of buses 119 will be in accordance with which ones of its code elements are pulses.

DECODER

Each line circuit includes means selecting its own code from among the thousands of codes which will reach its input over the incoming circuit of the second common network and that of the first common network of its group. If this line circuit made the call, its selecting means will accept back its assigned code which the line circuit itself will have set up as a calling code. If this line circuit was called its selecting means will accept its assigned code which instead was set up as a called code by the dialing of the distant calling station.

The selecting means is embodied herein in a circuit, designated the decoder, which is arranged so that it can respond only to a full set of simultaneously occurring pulses, i.e. to a set which feeds a pulse to each and every one of the decoder's (14) inputs. However, the codes as used over the second common network are of a type in which there will be less than 14 pulses since a code element may be represented as the absence of a pulse. Therefore, driver 137 is used to translate the form of every code before it is fed to said incoming circuits to be applied in multiple to all of the decoders. Thus, an arrangement is employed in which each decoder selects from the output of driver 137 (via said incoming circuits) only the one reiterated full set of 14 pulses which represent its code in the form to which the driver translates it, i.e. the form in which each code includes a full set of 14 pulses which are distinguished from all other sets in that its pulses occur on one particular combination of 14 of the driver's 28 outputs, and in which no code element is any longer represented as the absence of a pulse. The decoder of the line circuit shown herein comprises a group of 14 rectifiers (represented in Fig. 2 by a group of 5 rectifiers 247) which are individually connected to predetermined ones of the 28 outputs of the decoder driver, the connections being effected over a set of 14 conductors represented at 248. The output pulses provided by the driver are of negative polarity. They are fed over conductors 248 to the sides of the rectifiers 247 which offer high impedances to negative voltages. Thus none of the pulses, as such, pass through any of the rectifiers. A negative voltage is applied in multiple to all of the rectifiers 247 on their sides offering low impedance to a negative voltage and over a dropping resistor 270. Normally the rectifiers 247 will shunt out the negative potential applied to them, that is to say current flowing through one or more of them will cause a sufficient voltage drop across resistor 270 to very much reduce the negative potential on the multipled side of the rectifier set. When a full set of negative pulses is impressed on the decoder each one of the rectifiers 247 becomes sufficiently biased for the duration of one pulse temporarily to stop the flow of current through the dropping resistor and to cause the negative potential at point 271 to increase in magnitude—thus producing a negative pulse.

If any set of less than 14 pulses (any wrong code) is impressed upon these rectifiers, then at least one of them will remain conductive and the voltage drop across resistor 270 will be maintained. Thus the decoder translates a reiterated full set of 14 pulses (a set representing its own code) into a single pulse series whose individual pulses are in synchronism with the reiterations of the coded set and which appears initially at circuit point 271.

The 14 conductors 248 of each line circuit will be connected to appropriate ones of the 28 outputs of driver 137 over 28 of a set of 29 buses of the first common network for the group including this line circuit. This set of 29 buses is represented in Fig. 1 as a single line 116. As will be more fully described below, a number of tubes in the driver operate at saturation with the result that the various full sets of 14 pulses produced on and variously distributed over its 28 outputs for transfer to the decoders of line circuits engaged in calls (or about to be) are all devoid of any modulation which was carried on the corresponding coded sets of pulses fed to the driver from the set of main common buses 135. However, there is an auxiliary channel through driver 137 which also receives each reiterated coded set of input pulses along with any modulation which it may carry. For each input code the output of this channel is a single negative pulse series which still carries the modulations and is synchronous with the reiterations of the coded full set of 14 output pulses. The driver feeds this pulse series in multiple to the 29th buses of the sets of buses 116 of all of the first common networks served by the driver and this bus of each of these networks is multiplied to the input conductors 249 of all the line circuits in the group served by this network. In each line circuit this negative pulse series is applied via conductor 249, a rectifier 250 and a blocking condenser, to point 271 where it will be added in phase to the unmodulated negative pulse series produced at point 271 by the decoder in response to its receiving a reiterated full set of fourteen pulses.

The driver 137 will deliver to the conductor 249 of each line circuit twice as many of these negative, modulation-carrying pulse series as the number of calls in progress in the exchange at that moment (one for each direction of conversation and for each portion of the time channel allotted to each call). In order to prevent the modulation carried on all of these from reaching each substation 200, each line circuit includes a means for rejecting every one of the modulation-carrying pulse series except the one which is in synchronism with the coded pulse set accepted by its decoder. This means comprises another coincidence circuit including biased rectifier 251 which is placed in series between circuit point 271 and a circuit point 252. Rectifier 251 is appropriately connected between these points to offer low impedance to negative voltages in the direction from 271 to 252. However, a negative bias is applied to its outputs side, and this affords a counter electromotive force of such magnitude that none of the pulse series reaching point 271 over conductor 249 will be able to pass through rectifier 251 to point 252 without assistance.

Only one of the modulation-carrying pulse series will occur synchronously with the negative output of the decoder. The additive result of the two concurring series will be of sufficient negative amplitude to overcome the bias and therefore to pass through rectifier 251.

AMPLIFICATION IN A COMMON COMPONENT CONNECTOR

The amplitude modulated pulse series which has been selected at point 252 of a line circuit will be transferred to the connector 138 (Fig. 1) over a blocking condenser and rectifiers 253, 254, 255 in the line circuit, over one of the pair of buses 115 (Fig. 1) of the first common network for its group of line circuits, and over one of a pair of buses of the second common network. In connector 138 this pulse series will be amplified and then returned over the other bus of each of those pairs to the input conductor 272 of the line circuit.

Since connector 138 is a common piece of equipment its output will include as many amplified pulse series as the number of calls then passing through the exchange. In fact, as will be seen below, it actually includes twice as many, there being, for each call, one such pulse series for each of the two directions of conversation. In order to admit into this line circuit only the same pulse series which it sent to the connector, another biased rectifier coincidence circuit is provided. This comprises a rectifier 256 to which is applied a sufficient negative bias to block the passage of any pulse series which, having been amplified in the connector, enter the line circuit over conductor 272 and is applied unaided to this rectifier. In each line circuit engaged in a call, the pulse series which it sends out to the connector is also applied to the input side of rectifier 256 over a connection including rectifier 257. Since the transmission time to the connector and back is negligible the pulses passing through rectifier 257 will be added to those of the same series, after they re-enter the line circuit over conductor 272. However, they will be out of phase with the pulses of every other pulse series which is being amplified in the connector and which reaches conductor 272 from its common output. Since the additive pulse series will be the only one capable of exceeding the bias on rectifier 256 the line circuit will accept back only the same pulse series which it sent to the connector. After this pulse series passes through rectifier 256 it will reach filter 246 where the speech components will be extracted and transferred to substation 200 over windings 207, 206.

CALLING CODE DELAYED TO SECOND PORTION OF ALLOTTED CHANNEL CONNECTOR

For every call made the calling station which initiates it provides both a called code for carrying calling-to-called speech signals to the called station and a calling code for carrying called-to-calling speech signals back to itself. Both of these codes leave the selector in the allotted time channel and, to avoid mutual interference, they are fed from the selector to separate metallic media, i.e. separate sets of bus bars of the second network.

However, in the arrangement shown a single decoder is provided in each line circuit for accepting its assigned code irrespective of whether it is a called code or a calling code. Therefore, all of the decoders have their inputs commoned to a single medium which is accessible both to all of the called and all of the calling codes produced in the selector. For this reason while they are still moving in the second common network the calling and called codes are brought together on one transmission medium and thereafter they follow the same metallic transmission path into and through driver 137, over the set of 28 output buses of the driver, and into the commoned set of buses 116 of all of the first common networks fed by the driver.

To avoid mutual interference on this single medium the calling codes are delayed before they are fed to it from the set of main common buses 136. They are delayed in the connector over a set of delay lines therein which serve to delay the pulse elements of the calling codes each by a period of time slightly longer than the duration of a pulse. As a result each calling code on reaching the driver occupies the second portion of the time channel allotted to the call and it follows immediately after the called code with which it is associated.

A MODULATOR LINK CALLED-TO-CALLING TALKING CIRCUIT CONNECTOR

For each call both a single pulse series and a reiterated coded set of pulses are fed into connector 138 in the first portion of the time channel allotted to the call. The single pulse series is the one which comes from the called line circuit where it is produced by the decoder in response to the called code. It enters, passes through, and leaves the amplifying circuit of the connector always in the first portion of the alloted time channel. The coded set of pulses is the calling code.

In the same portion of the same time channel it reaches the connector over the set of main buses 136 of the second network. In the connector it passes through a circuit which includes near its output the delay lines for delaying it to the second portion of the allotted time channel. The connector is arranged so that before the calling code is delayed it is passed through a set of modulator tubes which also receive the single pulse series. These tubes act to impress on the calling code any modulations which may be carried on the pulse series. During a call it will carry to the connector and transfer to the calling code both calling-to-called and called-to-calling modulations. It has already been shown how this pulse series receives speech modulations of the calling party. Of course it will only receive them when that party is talking. It will also be shown that this same pulse series will be modulated (in the called line circuit) with speech signals of the called party whenever he does the talking. After the calling code has been modulated at the connector, with whatever modulations this pulse series is carrying, it leaves the connector over one output circuit thereof and eventually reaches the calling line circuit. At the same time the pulse series leaves the connector over another circuit, still carrying its own modulations of course, and it goes back to the called line circuit. Thus, all speech signals in a given call are carried to both of the engaged parties, i.e. the party who is doing the speaking at any particular moment hears his own speech as side tones in his receiver.

Calling-to-called speech modulations are usefully carried back from the connector to the called party on this single pulse series which, since it is not delayed in the connector, still occupies the first portion of the time channel allotted to the call. These modulations are carried on this pulse series from the amplification channel of the connector back to the called line circuit over one of the buses 115 of the second network which serves the called station, through rectifier 256 of the called line circuit, and to the called station. Called-to-calling modulations are also carried on it although not usefully over the same path and thus they get back to the called station as side tones. Called-to-calling modulations are usefully carried from the connector to the calling party on the calling code in the second portion of the time channel allotted to the call. They are carried by the calling code from the output of the modulating and delaying channel of the connector, over the second network, through driver 137, through the decoder of the calling line circuit, out to and back from the amplification channel of the connector, through rectifier 256 of the calling line circuit, and to the calling station. Calling-to-called modulations are also carried on the calling code, though not usefully, over the same path and thus they get back to the calling station as side tones.

For each call both the called and calling line circuits accept their individually assigned codes, that of the former being a called code occupying the first portion of the time channel allotted to the call and that of the latter being a calling code occupying the second portion thereof, and the decoder in each of these line circuits produces from its code a single pulse series which it routes to the connector for amplification. Since the pulse series which the calling line circuit thus routes through the connector is in the second portion of the time channel whereas the calling code is still in the first portion thereof while it is passing through the set of modulator tubes, the calling code will not receive any modulations which may be carried on that pulse series. The only function of connector 138 as to the pulse series sent to it from the calling line circuit is to amplify and return it. For any call both called-to-calling and calling-to-called modulations are impressed on the calling code from only that one of the two pulse series routed through one amplifying channel of the connector which is sent there from the called line circuit.

Each line circuit is so arranged that whenever the hand set at its associated station is raised to answer a call rather than to make one, the called-to-calling speech signals from that called station will be impressed as modulations upon the single pulse series produced at point 252 of its line circuit by the decoding of the called code. Thus this pulse series, which sometimes carries calling-to-called speech modulations in a manner already shown, at other times carries called-to-calling modulations. The circuit arrangement employed in each line circuit for this purpose will be described at a later point herein.

CALL TO A BUSY LINE CIRCUIT

A portion of the pulse series passing through rectifier 256 of an engaged line circuit is retified by a rectifier 276 to produce a negative bias across condenser 258. This does not depend on whether the line circuit made or received the call. This bias is applied to increase the negative bias on the output side of rectifier 251, thus readjusting the operating level of the decoder. When the decoder is thus readjusted it will not accept another complete set of 14 pulses which appear on conductors 248 (in a different time channel, of course), even though the arrival of a complete set means that the line circuit including this decoder is being called, i.e. that its correct code is reaching driver 137 (Fig. 1). Moreover it will not accept it even though this full set of pulses has the normally-required assistance of a modulation-carrying synchronous single pulse series received from driver 137 over conductor 249. Of course, negative pulses will be produced at point 271 in response to the later arriving full set of pulses and, of course, they will be augmented by the synchronous negative pulses received over 249, but even the additive pulses will be inadequate to pass through the now-strongly biased rectifier 251 to circuit point 252.

However, the adjustment of the decoder to a higher operating level will not cause it to release the initially accepted pulse series because the amplified negative pulse series returned from the connector is utilized to aid it. On returning from the connector and passing through rectifier 256 this pulse series is applied to rectifier 259 as well as to filter 246. Over rectifier 259 it will be applied to circuit point 271 of the decoder in synchronism with the pulse series initially accepted by the decoder. Thus, though the decoder is adjusted to operate at a higher level, the increase in its bias provided by the voltage across condenser 258 will be overcome during the time channel of the seized code to permit a continuation of the translation of this code into a pulse series at circuit point 252.

BUSY CONNECTOR

The decoder has a second output circuit, over a rectifier 260 which is not so strongly biased as rectifier 251. Over this output it will produce a negative pulse series for each full set of 14 pulses which reaches it, including the first set which the decoder fully "accepts" and any later sets which may arrive while it is already engaged. Each set will, of course, occupy a different time channel.

The additional bias provided by condenser 258 is only applied to rectifier 251 and not to rectifier 260. Rectifier 260, accordingly, will transfer every negative pulse series produced by the decoder to an output conductor 275 and thence to one of a pair of buses of the first common network which are generally designated as 114 and indicated as a single line in Fig. 1. In the case where one full set of 14 pulses is fully accepted and one other set later reaches the engaged decoder two pulse series will leave the line circuit over conductor 275, one of them the amplified pulse series produced in response to the fully seized code and the other an unamplified pulse series which was produced in response to the later code but did not become fully seized by the decoder to the extent of its being routed through the connector. At the same time there will be transferred to an output conductor 274 over a rectifier 261 and thence to the other bus of the pair of buses 114 the single fully seized pulse series returned amplified from the connector. The pair of buses 114 lead to busy connector 138 (Fig. 1). It has a circuit in which the fully seized amplified pulse series which reaches it over one of the buses will be canceled by the same series which reaches it over the other. Any additional unamplified pulse series, however, will reach the busy connector only over the bus fed from output conductor 275.

Therefore, all such partly-seized pulse series which reach the busy connector will remain uncanceled and will enter its circuits reaching first a tube where they will be amplitude modulated with a busy tone and then a set of modulating tubes where the busy tone will be transferred respectively to the calling codes which are synchronous with these pulse series. Thus, the calling codes of stations which are seeking to call already engaged stations will become busy tone carriers which will eventually find their way back to these calling stations to indicate that the stations which they are seeking to call are busy.

RINGING

The first few pulses of an amplified pulse series returned from the connector to conductor 272 of the line circuit and transferred toward filter 246 over biased rectifier 256 will be applied to and rectified by a rectifier 262 to produce a positive voltage across a condenser 264. This voltage is added to a fixed positive bias on the control electrode of a gas tube 265 thus firing the tube. The anode of gas tube 265 is energized from an alternating source of current such as a source of 20 cycle ringing current. When it has fired, its alternating anode-to-cathode current will pass through a winding of transformer 218 producing a ringing current flow in its secondary 217 which is connected to conductors 202, 203 of the subscriber's line.

When the called subscriber raises his hand set to answer, contacts 201 will be closed virtually to short circuit the source of firing potential for gas tube 265 by applying ground to its control electrode over a circuit including conductor 219, the conductors 202, 203 of the subscriber's line, conductor 220, winding 221 of transformer 218, and resistor 211. This will produce a voltage drop in a dropping resistor 266 of the biasing circuit, thus reducing to a low value the potential it thereafter applies to the control electrode and at the same time discharging condenser 264. Since the anode potential of this tube is alternating, the tube will be extinguished within one half cycle (of the twenty cycle ringing current) and ringing current will no longer be applied to the subscriber's line.

CALLED LINE CIRCUIT PROVIDES NO CODES NOR ANY TIME CHANNEL

Since the station which initiates a call provides both the called and the calling codes it is unnecessary and undesirable that the called station provide either. Therefore, each line circuit includes a means which is actuated when that line circuit is called to prevent its gas tube 223 from operating to route its assigned pulse series from conductor 212 to conductor 213. Thus, this pulse series does not reach the calling code producing network 236, 237, 238 of this line circuit, and it does not become available on bus 118 for seizure by called code, generating equipment. Like the ringing circuit the disabling circuit for gas tube 223 is actuated by the first few pulses of an amplified pulse series which has been fully seized by a called line circuit and has reached the input of its filter 246. A rectifier 267 passes a portion of these pulses to a condenser 268 in which a negative charge is built up. The negative potential of this charge is applied to the control electrode of gas tube 223 thus biasing it in opposition to the positive voltage which will be produced at point 210 and applied to the gas tube when the subscriber at called station 200 raises his hand set to answer.

This disabling circuit will not interfere with the normal operation of gas tube 223 in a calling line circuit. Of course when a call goes through the calling line circuit accepts back its calling code and therefore like the called line circuit it fully seizes an amplified negative pulse series returned from the connector. However, this negative voltage will not be effective to extinguished gas tube 223 because as is well known the potential on the control electrode of a gas tube is much less effective for extinguishing it than for preventing its ignition.

CALLED-TO-CALLING TALKING CIRCUIT

When either party to a call is talking his speech signals appear as voltages across resistor 232 of his line circuit. These voltages are applied to circuit point 226 at which, in a calling line circuit, they serve to modulate its privately assigned pulse series which will be in the process of leaving the line circuit over conductor 213. In a called line circuit these voltages at point 226 will be ineffective to perform the same function since its pulse series is blocked at rectifier 214. However, these voltages are also applied to a rectifier 269 at which they serve a useful purpose in a called line circuit. The positive swings of these voltages will at no time produce significant currents through this rectifier because they are applied to its side offering high impedance to positive voltage. The negative swings will produce currents through it but only when the line circuit is being called. When it is calling this is prevented by the direct positive potential produced at point 226 by the firing of tube 223. This potential is applied to the input side of rectifier 269 where it will oppose the negative swings of the speech voltages and in effect will augment a fixed negative bias applied to the output side of this rectifier over a resistor 277. While the disabling circuit 267, 268 for gas tube 223 will apply a negative potential to the same side of rectifier 269 it will be of small magnitude as compared to the positive potential produced by gas tube 223 and thus in a calling line circuit no portion of the speech voltages will pass through rectifier 269.

However, in a called line circuit gas tube 223 does not ignite when the hand set at its associated station 200 is raised for answering and it will not act to aid the fixed bias applied to rectifier 269. On the other hand the negative potential from condenser 268 will oppose this bias (as well as the small positive potential produced at circuit point 210 whenever the hand set is raised). Therefore, in a called line circuit the negative swings of the speech voltages of the called party will pass through rectifier 269 to be applied to rectifier 253 in the output circuit of the decoder. At this point they will add to the negative pulse series produced by the decoder in response to the called code. The additive voltage is impressed on the side of a rectifier 253 which offers low impedance to negative voltage while a fixed negative bias is applied to its output side. The negative swings of the called party's speech voltage will variably oppose the fixed bias and thus will control what portions of successive pulses in the series will be able to pass through rectifier 253. Thus the pulse series produced from the called code becomes a carrier in the called-to-calling talking circuit. If the called party speaks only when the calling party is not speaking, i.e. before he has started to talk or when he has stopped momentarily, and is listening for an answer, this pulse series will not be doubly modulated since it will not be carrying speech modulations of the calling party. As usual, and irrespective of what modulations it carries, this pulse series will reach the connector as usual. There its modulations will be impressed on the calling code to be carried thereon to the distant calling station. The pulse series itself will be amplified in the connector and will be returned from it to this same called line circuit where its audio component will be detected and sent to station 200. Of course the called subscriber will receive back his own speech signals whenever he talks into the microphone of his hand set.

Since usually the parties to a call speak one at a time this pulse series normally will carry either calling-to-called or called-to-calling modulations and rarely both. But even where it carries both the effect is no different than that of ordinary side tones.

Figure 3:
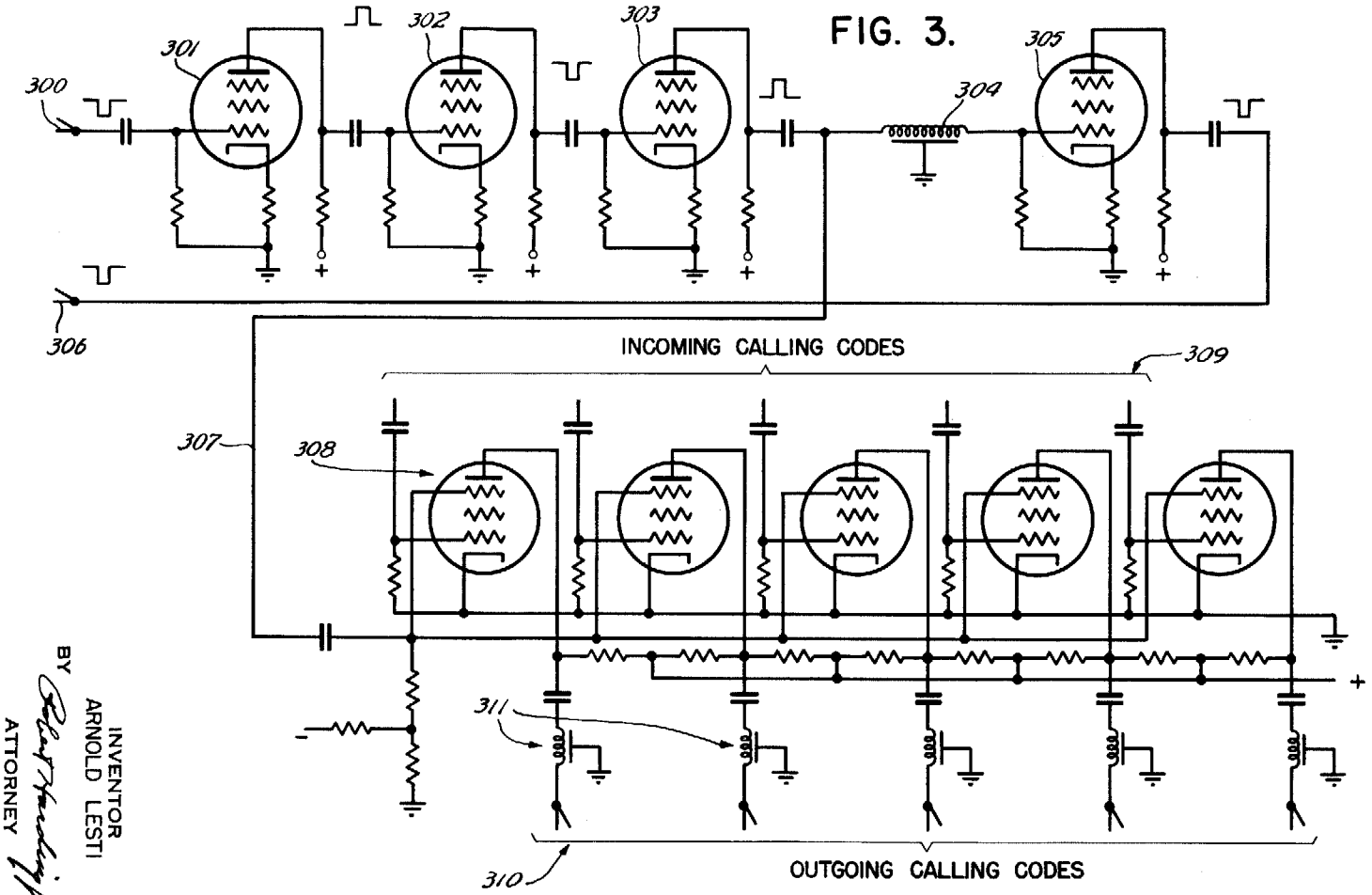
Fig. 3 is a circuit diagram of a connector common to a great many or all the subscribers' line circuits and fed from, and feeding into, sets of bus bars of the first and second common networks.

If desired the line circuits and the connector may be modified to eliminate these side tones. According to one modification (not shown) the pulse series seized at point 252 of a called line circuit is sent only to the amplification channel of the connector 138 (Fig. 1) because in the connector (Fig. 3) conductor 307 is disconnected from delay line 304. However, the same pulse series is separately sent to the set of modulator tubes 308 (Fig.

3) over a separate bus which is added to the set of buses 115 (Fig. 1) of each first network. This bus of each first network is connected on its output end to conductor 307 (Fig. 3) of the connector and on its input end to the points 252 of all the line circuits in the group it serves. In each line circuit a separate metallic pathway is provided between its point 252 and a new output terminal for feeding the added bus. This separate pathway includes a biased rectifier for clipping the tops from the pulses in the seized series to eliminate any calling-to-called modulations. The output of rectifier 269 is disconnected from the input side of rectifier 253 and connected to a corresponding rectifier provided in the separate pathway. Thus the called-to-calling modulations will be impressed on the clipped pulse series which will carry them only to the modulator tubes 308 (Fig. 3) of connector 138.

RESETTING LINE CIRCUIT

When the handset at a calling station is hung up at the end of any call, a current surge will occur in transformer 218 and this will cause a voltage to be applied to gas tube 223 to extinguish it and reset the line circuit.

LINE FINDER—FIGS. 4 AND 5

Figure 4:
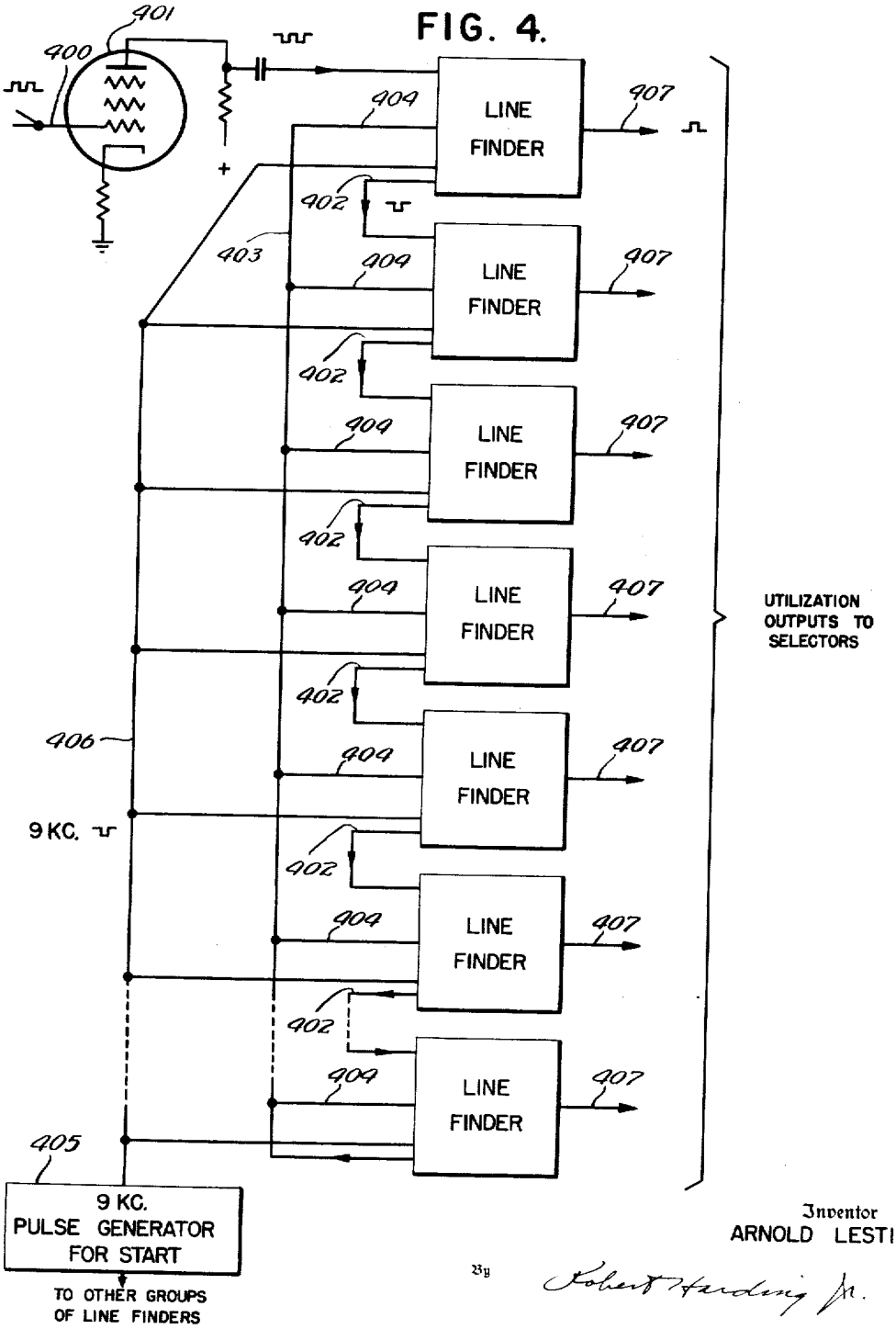
Fig. 4 is a block diagram of a group of line finders associated with one group of subscribers' lines, showing the chain circuit interconnection, the common input, and the individual utilization outputs.

Fig. 4 shows the general arrangement of the group of perhaps sixteen line finders which serves one group of perhaps two hundred subscribers' lines. Fig. 5 illustrates the circuit details employed in each line finder of the group.

The pulse series which is assigned to a line circuit and which becomes available on bus 118 of the first common network of that line circuit when it is calling is of positive polarity. The group of line finders (122–124 Fig. 1) for this network receives this pulse series from bus 118 (Fig. 1) on a single input connection 400 (Figs. 4, 5).

The line finders are connected in a chain circuit in which each line finder but the first receives the pulse series from the preceding one (the first receives it from the single input connection 400); each line finder twice inverts the polarity of the pulse series (i.e. in effect doesn't invert it at all); each line finder but the last one passes the pulse series on to the next one; and the last line finder feeds back the pulse series in multiple to all of the pulse finders feeding it to each one over an individual input 404. The positive pulse series received from bus 118 is inverted before it is applied to the first line finder in the chain. For this purpose a reversing tube 401 is included in series in the connection 400. The negative pulse series fed into each line finder first passes through one cathode follower 500 and thereafter through two amplifier stages 501, 502 and therefore appears at an output 402 with its polarity unchanged. The output 402 of each line finder, except the last one, feeds into the cathode follower 500 of the next line finder. In this way the group of line finders are connected into a chain circuit. Because of the short transient time through the stages in the chain (from the input of the first line finder to the output 402 of the last one) the pulses of this pulse series will be impressed on the input tubes 500 of each of the line finders at substantially the same time and they will have substantially the same phase at their entrance and exit terminals of the chain circuit.

If two or three subscribers in the group are simultaneously initiating calls then two or three pulse series, each occupying a different time channel provided by generator 113, will pass through the chain circuit of line finders. As soon as one of the pulse series is seized by one of the line finders, that series will be suppressed at that point in the chain circuit and will cease to pass through to the other line finders. Therefore, no line finder having a position further along in the chain circuit will be able to seize or at least to hold onto the same pulse series.

The chain circuit is not a closed chain, i.e. the output of the last line finder in the chain is not red back into the input of the first one in the chain. However, the output of the last line finder in the chain is fed in parallel to the input 404 of all the line finders. Each line finder is so arranged that it cannot start to seize a pulse series until that pulse series has been returned to it over its input 404. Hence this input is designated as its common return for start. Since this is so, no line finder can undertake to seize a pulse series until that pulse series has passed through the entire chain circuit and is then fed back to all of them. Thereafter, so long as a pulse series is not seized, and therefore is not suppressed, it will continue to pass through the entire chain circuit and it will continue to be fed back from the output of the last line finder to the common returns for start of all of them until some idle one of the line finders is actuated to seize the pulse series.

There is provided in the exchange, for one or more groups of line finders, a scanning pulse generator 405 (Fig. 4) having a repetition frequency different from that of the pulse generators 113 for the first common networks for example, a repetition frequency of 9 kc., as compared to that of 10 kc. of the generators 113. Where one pulse generator 405 is employed for several groups of line finders, it is desirable that the pulse generators 113 serving the groups of line circuits associated with those groups of line finders all have the same or nearly the same repetition frequency. The frequency of pulse generator 405 is selected so that the difference or beat frequency between its output and that of any of such generators 113 will be low enough, for example 1 kc., so that one period thereof will be substantially longer than the time constant of a disabling circuit to be described below. When this condition is met the disabling circuit will have time to act to prevent the same line finder from starting to seize a second pulse series while it is still in the act of seizing a first one.

At one circuit point in each line finder each pulse series which is passing through the chain circuit is "scanned" by the pulse series of the 9 kc. generator at a rate equal to the beat frequency. As a result for each pulse series a coincidence will soon occur at that point, in at least one of the line finders, between one of the pulses of this series and one pulse of the series from the 9 kc. generator. This coincidence will be utilized by a circuit of the line finder wherein it occurred to start that line finder to seize the pulse series in question. The probable time interval between this coincidence in that line finder and a later one in it involving a pulse of a different pulse series will be related to one period of the relatively slow beat frequency, i.e. to one millisecond. Thus, if there are two input pulse series from local common bus 118, the probable time interval between the occurrence of coincidence involving both of them in the same line finder will be adequate to permit operation of its disabling circuit before the second one occurs. Therefore, the second coincidence will not be effective to perform its starting function in this line finder though it will be in one or more of the others—one of which eventually will complete seizure of the second pulse series and will cause any others which started to seize it to release it. As is indicated in Fig. 4 generator 405 has its output connected in parallel to all of the line finders in the group over a conductor 406.

Because of the use of the common return for start, it will be impossible for a pulse series to be fed into the chain of line finders without its very soon being seized so long as there is any unengaged line finder in the group.

When a line finder has seized a pulse series, it transfers it to an output utilization circuit 407 individually connected to the particular selector (125, 126, or 127, Fig. 1) with which that line finder is permanently associated. Thus, though a number of pulse series might enter the line finder chain circuit over common lead 400 (each of them, of course, occupying its own private time channel), after their respective seizures by different ones of the line finders, the different pulse series will leave the chain circuit to be fed out of separate utilization conductors which are indicated at 407 in Fig. 4.

As shown in Fig. 5, a negative pulse series which is fed to the control grid of the input cathode follower 500 of a line finder, is passed on in the same negative polarity to a suppressor tube 501, the anode output of which is applied to the control grid of a tube 502 whose anode output conductor 402 forms the first link in the chain circuit by being connected to the control grid of the cathode follower 500 of the next line finder. Eventually, as mentioned above, the pulse series, still negative in polarity and with but negligible delay, will leave the output conductor 402 of the last line finder and pass over the common return for start 404. This feeds the negative pulse series to the control grid of a tube 503 in each of the line finders. Each tube 503 is connected in parallel with a tube 505 to the control grid of which is fed the 9 kc. pulse series over input conductor 406.

The tubes 503 and 505 are both normally conducting so that when a negative pulse is received on the control grid of one of them, the positive output which tends to appear in its plate circuit will be absorbed by the shunting action of the other tube. Therefore, despite the application of one or more continuing pulse series to the control grid of tube 503, over the common return for start, and despite the application of the single continuing 9 kc. pulse series to the control grid of tube 505, not a single positive pulse will appear in the common anode circuit of this pair of tubes until a coincidence of pulses occurs between a scanning 9 kc. pulse and a pulse of one of the pulse series applied to tube 503. At the time of such a coincidence one positive pulse will appear in the common anode circuit of this pair of tubes.

On account of the relatively low scanning rate and despite the presence of more than one pulse series on the grid of tube 503, another similar positive pulse will not appear at this same circuit point soon enough to cause improper operation of the remaining circuits of the line finder. This one positive pulse is fed to inverter tube 506 which feeds one corresponding negative pulse to the control grid of a tube 507. Tube 507 is connected in parallel with a tube 508 to form an arrangement of mutually shunting tubes identical with that formed by the tubes 503 and 505. During the scanning the control grid of tube 508 will be receiving from cathode follower 500 any unseized pulse series which is passing through the chain circuit. Therefore, since the transit time of the chain circuit is negligible, the single negative pulse applied to tube 507 will coincide with one pulse of one of the pulse series which are applied to tube 508. This single coincidence will produce a single positive pulse on the output of the pair of tubes 507, 508. This positive pulse is delayed in a delay line 509 by a time interval exactly equal to one period of the 10 kc. pulse series, 100 microseconds. The delayed positive pulse is inverted in tube 510 and supplied to the control grid of tube 507. Thus, tube 507 receives a second negative pulse exactly one period later than the first coincidence in circuit 507, 508, i.e. just in time to cause a coincidence with the next pulse of the same input pulse series, which supplied the pulse for the preceding coincidence. Thus, another positive pulse will appear in the common output of tube 507, 508; it will be delayed by one period and inverted in tube 510; and the cycle will repeat over and over again so long as the seized 10 kc. pulse series continues to be available over bus 118.

At delay line 509 the seized pulse series is positive. It is inverted in tube 511 and applied to the suppressor grid of suppressor tube 501 to block that tube during the time channel of the seized calling pulse series. Since tube 501 is part of the line finder chain circuit, this pulse series will be prevented from reaching any of the line finders further on in the chain. As a result, if any of them had already started to seize the same pulse series, they would all immediately release it. If desired, delay lines each having a different time delay could be included individually in the connections from generator 405 to the tubes 505 of the several line finder circuits. Their use would prevent simultaneous starts at seizure of the same pulse series by several line finders. If this is done the result of the blocking tube 501 in the time channel of a seized pulse series would more often be that of preventing other line finders from starting to seize it than that of causing them to release it. Either result, of course, is satisfactory.

A pulse series seized by the coincidence circuit 507, 508 of a given line finder is applied from that circuit to a cathode follower 512. The pulse series, still in positive polarity, leaves the cathode follower over an output utilization lead 407 to be delivered to an input of the selector associated with this line finder. The positive pulse series occurring at the output of cathode follower 512 is also applied to a rectifier tube 514 which is energized by a negative source of potential applied to its cathode instead of by the usual arrangement of connecting a positive potential to its anode. The control grid of tube 514 is negatively biased so that the tube is normally cut off. However, when a pulse series has been seized the application of its positive pulses to tube 514 produce current impulses through it thus causing the accumulation of a negative charge in a condenser 515 which is connected in its anode circuit. This direct negative potential is connected to the suppressor grids of the tubes 503, 505 of the coincidence circuit for start. Since this negative bias will persist while the seized pulse series remain engaged, the starting circuit of this line finder will be disabled for all of that time as to all pulse series irrespective of their time channels and it will be impossible for the same line finder to seize more than one pulse series. The time constant of the circuits including condenser 515 is very short with respect to one period of the scanning frequency of one kc.

Between its point of entry to a group of line finders over the common input 400 and its point of egress over one of the output utilization leads 407, no pulse series encounters a saturated vacuum tube stage. Therefore, the speech modulation impressed by the calling party upon a pulse series will be carried through the seizure circuits of the line finder engaged by that pulse series and will appear on its output utilization lead 407 still carried on the pulse series.

SENDER—FIGS. 6, 6A, 6B, 6C, ITS REGISTER PORTION FIGS. 6, 6B

Fig. 6 shows the circuit details of a preferred embodiment of the register portion of a sender. Sometimes it will also be referred to as the register or the sender register. The function of the register is to receive the impulses which are sequentially dialed at the calling station and are carried to the sender on the calling party's pulse series over bus 118 and to translate them into a representation of the called number in which individual representations of the several digits of the called number become simultaneously available for translation into the code of the called party.

The register accomplishes this translation by causing a group of condensers to be charged in accordance with the called number, the potential built up across each condenser representing one or more digits. This representation will thereafter be translated into the actual called code, i.e. coded sets of simultaneous pulses, by the sender translator and a selector.

PULSE SUPPRESSOR

Each sender, i.e. its register and its translator will be engaged only transiently during dialing. Therefore, a means must be provided for disengaging it after it has compelted its function. This means is the sender pulse suppressor (130 of Fig. 1) which is shown as a block surrounded by dotted lines in the upper right hand corner of Fig. 6. The various pulse series which are delivered by different calling line circuits onto bus 118 of their first common network are transferred from it not only to the group of line finders for this network but also to its group of senders. The pulse series reach the group of senders over their common pulse suppressor 130. In the pulse suppressor the input lead 600 receives from bus 118 all the pulse series present thereon and applies them to the control grid of its vacuum tube 601. These are transferred from the pulse suppressor via the output circuit of tube 601 to the common input 602 of a chain circuit interconnecting several pulse finders which are individually provided for the several senders (128, 129, Fig. 1). This chain circuit corresponds to that of the group of line finders described above and accordingly the common input conductor 602 corresponds to common input conductor 400. In the example chosen this chain circuit will include only two pulse finders one for each of the senders 128, 129 shown in Fig. 1.

Pulse finder 603 of Fig. 6 corresponds to the first line finder in the block diagram of Fig. 4. It, as well as its associated pulse finders, are fed with a 9 kc. pulse series in the same manner and for the same purpose as are the line finders. This pulse series is fed to pulse finder 603 over lead 604 from a 9 kc. pulse generator which may be the generator 405 serving the group of line finders. However, a separate 9 kc. pulse generator for scanning may be provided. Output 605 is the individual utilization output of the first pulse finder, 603, in the chain circuit and, therefore, it corresponds to the utilization outputs 407 of the first line finder shown in Fig. 4. The output designated as "out" provides a link in the chain circuit of the pulse finders and therefore corresponds to a lead 402 of Fig. 4. Similarly, the common-return-for-start 607' corresponds to the common-return-for-start 404 of Fig. 4. One pulse finder is provided for each sender.

Pulse finder 603 delivers a seized pulse series over utilization output 605 to the control grids of vacuum tubes 606 and 607. A source of dial tone is permanently connected to the suppressor grid of vacuum tube 607 for amplitude modulating the seized pulse series. With dial tone modulations it will leave tube 607 over conductor 608 to reach bus 120 (Fig. 1) of the first common network. From this bus it is applied in multiple to the input conductors 243 (Fig. 2) of the same two hundred line circuits in the group served by this sender. Due to the use of biased rectifier arrangements in all of these line circuits, this returning pulse series will be accepted only by the one of them which sent the same pulse series to this sender over bus 118. This one line circuit upon receiving the returned (incoming) pulse series will detect the dial tone component (at 264, Fig. 2) and send it over its associated subscriber's line to its associated calling station to inform it that the sender is ready to accept dialing. And, shortly afterward, when this line circuit receives dialing impulses from its calling station it will use them to amplitude modulate this same pulse series at a point where it is outgoing. Since the outgoing pulse series is already seized at 603 in the sender, the dialing impulses will be carried to tube 606. From tube 606 they are fed to two tubes, 609 and 610, each of which uses its output to charge a condenser in a manner related to the dialing. The output of tube 609 is applied to a rectifier 611 which passes the positive component to a condenser 612. A bleeder resistor is connected across condenser 612 and has such a high value of resistance with respect to the condenser's capacity that the positive charge which is accumulated in the condenser soon after the pulse series is first seized, i.e. sometime before dialing started, will be retained throughout the dialing despite the fact that the amplitude of the pulse series drops sharply during each dialing impulse. The output of tube 610 is applied to a rectifier 613 which similarly passes the positive component transferring it to a filter 614 having a condenser 615 across its output. The frequency response of the filter and its time constant for the discharge of condenser 615 are such that the dialing modulations will be detected from the 10 kc. pulse carrier and the output across the condenser will follow only the envelope of the dialing modulation. For each dialing interruption of the subscriber's line loop at contacts 201 (Fig. 2) a negative square wave will appear at the output of filter 614. The filter output is differentiated in a circuit comprising a resistor 616 and a condenser 617 and it is thereafter applied to the control grid of a tube 618. The cathode of tube 618 is normally positively biased with respect to its control grid thus cutting off its anode current even when it receives positive pips from the differentiator. However, condenser 612 is connected to the control grid of tube 618 and therefore the positive voltage which was developed across this condenser soon after the pulse series was first seized at 603 will be applied to this tube where it will overcome the normal control grid-to-cathode bias and prepare it to amplify both the positive and the negative pips which it will receive from the differentiator. Of course, at the very beginning of a call, i.e. when a pulse series is first seized and applied to tube 606, a positive pip will be produced at the output of the differentiator, and, as will be apparent, it is desirable that this pip should not pass through tube 618. Therefore, condenser 612 has such a value of capacity that the buildup of positive voltage across it will be slow enough to prevent tube 618 from being prepared in time to respond to that single first positive pip. Later during dialing, a negative pip will be produced at the leading edge of each negative dialing impulse and a positive one at its trailing edge. By the time this happens, however, tube 618 will be prepared to invert and amplify all of the pips delivered to it from the differentiator. Therefore, for each dialed digit of the called number, a group of positive and negative pips will appear in the output of tube 618. The number of pips of each polarity in that group will exactly correspond to that digit. Once a pulse series has been seized there will be no other interruptions or abrupt amplitude modulations of it, which can produce pips equal to those caused by dialing. These amplified negative pips will be used to control the registering of each digit while the positive ones will be used to actuate a circuit for marking the terminations of the successive digits.

The sender register acts to charge a succession of condensers to voltages proportionate to the successive digits of a called number. To do this accurately it comprises means for providing that each of these condensers will be charged only in accordance with the number of impulses in a dialed digit, and not in accordance with the durations of the impulses (their durations will vary with irregularities in the speed of return of the dial). This means comprises a flipflop circuit which is actuated by the negative pips in the output of tube 618 to produce square waves of voltage of a predetermined duration. By thereafter controlling the charging of each condenser by square waves from the multi-vibrator, it can be made to be proportional only to the number of pips in each digit. The flipflop multi-vibrator, sometimes also designated as a single stability flipflop circuit, comprises vacuum tubes 619 and 620.

Tube 620 of the multi-vibrator is its normally conducting tube. Accordingly, its plate voltage is normally at a relatively low value. Each time that a negative pip occurs at the output of tube 618 it is applied to the control grid of tube 620. It acts to cause a transient disturbance of the normal stability of the multi-vibrator, in a well-known manner as follows: The negative pip is amplified in conducting tube 620 and applied as an amplified positive pip to the grid of tube 619 which further amplifies it, restores it to negative polarity, and feeds it back again to the grid of 620. The regenerative effect, as is well known, is abruptly to cut off tube 620 and equally abruptly to render tube 619 fully conducting. Thus, the anode of tube 620 will rise sharply from its normally low level to a relatively high level where it will remain until the multivibrator recovers its original stable condition in a time interval depending upon the time constant of a circuit including the coupling condenser between tubes 619 and 620. Thus, an output positive pulse will become available at the anode of tube 620 in response to each negative input pip from tube 618 and it will have a controllable duration depending upon the circuit constants and the adjustments of the multi-vibrator. The positive pips will have no effect on the multi-vibrator.

The sender register includes a group of as many storage-condenser circuits, of the kind shown once in detail in dotted block 621, as the number of digits constituting a called number, for example seven. In Fig. 6 this group of circuits is represented by blocks 621—624. Each of the blocks 621—624 includes a storage condenser 625 so arranged that by the end of dialing it will have been charged to a potential level corresponding to a particular one of the digits of the called number. Thus, the charge on one condenser will represent the thousand's digit, that on another will represent the hundred's digit and so forth. For this purpose there is employed in each block a gating tube 626 which will respond only to that train of square waves which is produced by the multi-vibrator during the dialing of the digit assigned to this block and which, in responding to it, will gate into its associated storage condenser a succession of as many measured charges as the number of square waves in that train. Each block includes a switching tube 627 which is actuated during the dialing of that assigned digit to overcome a cut-off bias normally applied to gating tube 626 thereby preparing it to be responsive to the output of the multi-vibrator. Each block includes a discharge tube 628 for clearing the storage condenser of its charge after the sender register has fully translated into stored potentials all the dialing impulses of one called number; has passed them along to the translator for utilization therein; and is ready to be reset, to be disengaged, and to be made available for a later call. And each block includes a coupling arrangement 629 for transferring a transient voltage proportional to the potential, which was built up in its storage condenser during the dialing of a number, to the input lead of one of a group of sections of the translator portion of the sender—which section will translate that voltage into a representation of a portion of the called code.

The output square waves from the anode of tube 620 are applied in multiple to the control grids of the gating tubes 626 of all the blocks 621—624. Each of these tubes is energized by the application of a direct negative potential to its cathode and it has its anode grounded over its associated storage condenser 625. Thus, if this tube should be conductive, and while it remains conductive, its anode (and the ungrounded plate of the condenser) will become progressively more and more negative until it reaches a limiting value near to that of the energizing potential applied to the cathode. However, the suppressor and control grids of each tube 626 are respectively connected to two biasing sources, each providing a negative potential sufficiently greater in magnitude than that applied to the cathode to cut off the tube irrespective of the other. Thus, even though the square waves from the multi-vibrator will be of sufficient magnitude to overcome the control grid-to-cathode negative cut-off bias—and may even be large enough to establish a positive bias for producing saturation current—they will have no effect unless the bias on the suppressor grid is removed. Each switching tube 627 is normally drawing current and is arranged so that while it does so it produces the negative cut-off bias applied to the suppressor grid of its associated gating tube 626. In addition, this tube is controlled so that during the dialing of one predetermined digit it becomes cut off and ceases to produce this bias. Each tube 627 is energized over its cathode by a negative direct potential and its anode is grounded over a resistor for translating the anode current into the negative biasing voltage. To actuate the switching tubes 627 of the several blocks 621—625, they have their control grids individually connected to individual tubes of a gas tube chain circuit 630, 631, 632, 633. Each of the gas tubes is effective during the dialing of a different digit to apply a negative potential to its associated switching tube. Each time that a switching tube 627 receives a negative potential on its control grid it will be cut off and will cease to apply the negative cut-off bias to the suppressor grid of its associated gating tube 626 thus rendering it responsive to control by the square waves for charging its associate storage condenser.

Assuming that gas tube 630, and no other gas tube, is conductive to start with, at the start of the dialing of the first digit, tube 630 will be cutting off the tube 627 of block 621 whereby the gating tube 626 of that block will be in a condition to conduct during every square wave received from the multi-vibrator. A means is provided for actuating the chain of gas tubes to transfer this condition from block 621 to block 622 at the end of the dialing of the first digit. This means comprises a circuit for extinguishing gas tube 630 at that time and for simultaneously igniting tube 631.

The output of tube 618, in addition to being applied to multi-vibrator 619, 620, is also applied to the control grid of vacuum tube 634 which is biased to cut-off so as to respond only to positive pips. The anode circuit of tube 634 includes an integrator 635 which translates each group of output of negative pips representing one dialed digit into one long negative pulse starting at the end of the first dialing impulse for the digit and ending at the end of the last one. The long square waves produced at 635 are applied to a differentiator 636 which will produce a negative pip from the leading edge of each one and a positive pip from its trailing edge. Thus, the output of differentiator 636 will include a positive pip marking the end of the dialing of each digit. This is fed to a vacuum tube 637 which may be biased to slightly below cut-off. Therefore, tube 637 will pass only the positive pips so that at the end of the dialing of each digit a negative pip will appear in the output of tube 637. These are applied to a vacuum tube 638 which will amplify and invert them and apply them to a cathode follower 639. The positive pip appearing at the output of cathode follower 639 at the end of the dialing of the first digit will actuate the gas tube chain circuit. It will be applied in multiple to all of the gas tubes 630, 631, 632, 633 to reduce the negative energizing potential which is applied to their cathodes. This will extinguish gas tube 630 which will be the only one ionized and drawing current at the time. The anode of tube 630 will rise to ground potential from a negative potential caused by the voltage drop across its anode resistor 640 produced by its anode current while it was ionized. The increase in anode potential of tube 630 will be differentiated in circuit 641 to apply a positive-going transient voltage to the control grid (or firing electrode) of gas tube 631. Tube 631 will fire and will remain ionized after the transient positive potential has ceased to be applied to its control electrode. When tube 631 draws current the voltage drop across its anode load resistor 642 will reduce its anode potential to a negative value. The negative anode potential of tube 631 is applied to the control grid of the tube 627 of block 622 to cut off, while at the same instant the negative cut-off potential previously produced by gas 630 will cease to be applied to the tube 627 of block 621. These switching tubes will act respectively in the manner already described above simultaneously to prepare the gating tube 626 of block 622 and to disable the gating tube 626 of block 621. When the gating tube of block 621 is disabled, i.e. cut off, storage condenser 625 of that block will be left holding a charge proportional to the first digit. As soon thereafter as dialing of the second digit commences, the storage condenser of block 622 will start to be charged in accordance therewith.

At the termination of the dialing of the second digit, the circuit 634—639 will act to extinguish the second gas tube, tube 631, and to ignite the third one, 632, in the manner already explained, and thereafter this process will be repeated for all of the ensuing digits.

When the next to the last digit has been dialed (in the illustrative circuit shown in Fig. 6 this would be the third digit), the last gas tube in the chain circuit will be ignited and it will apply a negative cut-off bias to the control grid of the tube 627 of the last block (624 in this example) to prepare it to respond to the impulses of the last digit. In addition, the negative anode voltage of gas tube 633 will be applied as a cut-off bias to the control grid of tube 643 of a pair of mutually shunting tubes 643, 644.

The negative pips which occur in the anode circuit of tube 637 at the end of the dialed digits are fed to the control grid of tube 644 as well as to tube 638. Despite this and even though tube 644 is so biased that its plate current is momentarily reduced each time that a pip occurs on its grid, normally no positive pips will occur in the common anode circuit of tubes 643, 644 at the ends of the dialed digits. This is due to the shunting effect of tube 643 which is biased normally to saturation. However, the application of the cut-off bias to tube 644 at the end of dialing of the next-to-the-last digit will remove this shunting effect. Therefore, a positive pip will appear in the common anode circuit at the end of dialing of the last digit. This is fed to an amplifier 645 which has an integrator of short time constant in its anode circuit. The condenser of this integrator charges quickly during this pip and applies the integrated amplified pip to a tube 646 which has in its anode circuit a shaping network 647 wherein the output of tube 646 is formed into a deblocking pulse of about 100 micro-seconds duration, i.e. of about the duration of one period of the 10 kc. pulse series which is seized at 603. This long positive deblocking pulse is applied to the control grid of tube 648 preparing it to draw current when a positive pulse is applied to its suppressor grid. The suppressor grid of tube 648 is connected to the utilization output 605 of pulse finder 603, which applies to it positive pulses of the seized series. Because of the long duration of the deblocking pulse it will persist on the control grid of tube 648 long enough for a coincidence to be established with one of the pulses of the seized series. Accordingly, tube 648 will produce a negative pulse at its output only after the termination of the last dialed digit and in exact synchronism with a pulse of the seized series. This is applied to an inverter tube 649 which will apply to a positive pulse to the coupling arrangements 629 of all the blocks 621—624 as well as to their discharge tubes 628.

The coupling arrangement of each block 621—624 comprises two cathode followers, 650 and 651 which may be matched tubes. The suppressor grid of one of these tubes, 650, is connected to the same reference potential-level, i.e. ground, as that to which one plate of the storage condenser is connected. The suppressor grid of the other tube, 651, is connected to the other plate of the condenser. Thus, if no charge is present on the storage condenser both tubes will have the same suppressor tube potential, and, because of the use of equal potentials on their other electrodes and equal values of their corresponding circuit elements, they will draw currents of equal magnitude. The primary of a transformer 652 is connected across the top ends of the cathode load resistors of these tubes. In this arrangement, assuming the cathode load resistors to be equal, any current flow through this primary will be a function of the difference between the magnitudes of the cathode currents of the two tubes, and there will be no current flow therethrough at all if those cathode currents are equal. As is well known the cathode current of a pentode is a function of its suppressor grid potential. Thus when the storage condenser 625 is at all negatively charged unequal currents will flow through tubes 650 and 651 and a voltage difference will exist across the ends of the primary of transformer 652. The resulting current flow through the primary will be proportional to that voltage difference and therefore proportional to the negative charge accumulated in condenser 625. Normally the control grid-to-cathode biases of tubes 650 and 651 will be set either to cut off the tubes or to reduce their currents to small quiescent values. The positive pulse produced at the output of tube 649 soon after the end of dialing of the entire called number and in synchronism with a pulse of the seized series, is applied to the control grids of both cathode follower tubes of the coupling arrangements of all of the blocks 621—624. In each block the pip will abruptly cut in the tubes (or suddenly increase their currents) to produce unequal surges through them and a resulting current surge through the primary of transformer 652 which will be in synchronism with said pulse of the seized series and proportional to the charge in its storage condenser 625. This current surge will produce across the secondary of the transformer a transient voltage which will also be proportional to that charge. Such a transient voltage will be delivered over the conductor 653 of each and every one of the blocks 621—624 to a corresponding input of the sender translator which is to be described below.

If desired, the coupling arrangement 629 used in each block 621—624 can be simplified by connecting its output lead 653 directly to the upper end of the cathode load resistor of its tube 651 and by completely eliminating the associated transformer 652 and tube 650. However, the circuit shown herein has been found to be preferable for an application of this kind. Tube 650 provides a means for balancing out the D.C. components so that the total current carried by primary of the transformer will be only the small but useful transient current related to the digit representation being transferred over it from the storage condenser to an input lead of the translator.

The pulsing of tubes 650, 651 in the several blocks 621—624 will not draw charge from any one of the condensers 625, during the above mentioned transfer, because of the well-known high input impedance of negatively biased suppressor grids. However, the single positive pulse provided by tube 649 to actuate the tubes 650, 651 also actuates another circuit for completely discharging the storage condensers after the representations of their potentials have been transferred to the sender translator. To this end the anode of tube 649 is connected to the control grid of the discharge tube 628 in each block 621—624 over a delay line 654. The cathode of each tube 628 is connected to the ungrounded plate of its associated storage condenser, its anode is connected to a source of positive potential, and its control grid is connected to a source of negative cut-off bias. A clamping diode 655 is connected in shunt to each of the condensers with its anode connected to the ungrounded plate. The delayed positive pulse reaches tube 628 after the sender-register has completed its useful function and it cuts in the tube thereby allowing current to flow into the condenser from the source of positive potential and thereby eliminating the negative charge. When the ungrounded plate reaches ground potential and then tends to go positive, the clamping diode will start to draw current to stop the discharge process with the ungrounded plate at the reference potential-level of ground.

Thus, at the conclusion of dialing, and in synchronism with a pulse of the seized series, a group of transient voltages (four in the illustrative example of Fig. 6, but actually as many as the number of digits in a called number) will be simultaneously applied over individual conductors 653 to a group of inputs of the sender translator, and shortly thereafter the storage condensers will be reset so as to be available for registering a called number dialed by a later calling party.

It is now desirable that pulse suppressor 130 act to disengage the register, i.e. to free it from the pulse series of the calling station. All during dialing this pulse series will have also been held by a line finder. Shortly after the gating out of the transient voltages from the resistor (and not sooner) the selector associated with that line finder will apply the pulse series from it to pulse suppressor 130 for suppressing this same pulse series from any longer reaching the input 602 of the chain circuit of pulse finders 603. How the selector acts to accomplish this timing will be apparent from the later detailed description of that component. The selector applies this pulse to the control grid of a tube 656 which will invert and amplify it and apply it as a negative pulse series to the suppressor grid of tube 601. This will block tube 601 only in the time channel of this one pulse series. Any other pulse series reaching the input conductor 600 of tube 601 from any subsequently calling line circuit of the group served by this sender will pass through it to the pulse finder chain circuit. When this pulse series has been thus suppressed it will be released by pulse finder 603. Its suppression will continue during all of the call, i.e. during all of the time that this series remains engaged by the line finder which first seized it. When the call ends this pulse series will cease to be engaged by that finder and therefore it will no longer be available to block tube 601 in the time channel of this series. Therefore, if the same calling party initiates another call the chain circuit of sender pulse finders will once more be able to receive his calling pulse series via the pulse suppressor.

When a sender is disengaged from one call its gas tube chain circuit must be reset before it receives the dialing impulses of a later call, i.e. its first tube must be reignited and all of its others must be extinguished. Each sender comprises circuits for assuring this resetting either in cases where it becomes disengaged after the dialing of as many digits (seven) as are needed to constitute a complete called number or in cases where the calling party hangs up before completing dialing.

During the dialing of the last digit of a called number only the last gas tube will be ionized and at the termination thereof circuit 631—639 will act to extinguish it. If the first tube is thereafter ionized the resetting of the chain circuit will be complete. Upon being extinguished the last tube does not act directly to ignite the first one. This is due to the fact that its anode is not connected to the firing electrode of the first tube. However, the first tube is adjusted so that it will fire of its own accord whenever no other gas tube remains ignited. To this end the firing electrode of the first tube is biased at a different potential than those of the other tubes. In addition, a dropping resistor 663 is placed in series in a single ground return provided for the commoned anodes of the gas tubes. Due to the magnitude of the voltage drop maintained across this resistor all during dialing when different ones of the other tubes are successively drawing current, tube 630 does not ignite spontaneously. However, when the last tube is extinguished and no other comes on this voltage drop will disappear and tube 630 will fire automatically. Its own current will, of course, restore the drop but this will not extinguish the tubes because a gas tube does not require as much potential difference across its cathode and anode to maintain ionization as to establish it.

Though it is not essential, an auxiliary circuit is provided to assure the reignition of tube 630. This circuit utilizes the positive pulse produced at tube 649 after the dialing of the last digit. After first being delayed in a delay line 657, this pulse is fed to two amplifier stages 658, 659 from which it is then applied, amplified and still positive, to the control electrode of the first gas tube thus assuring its ionization and resetting the circuit. Because of the delay in line 657 this positive pulse will not be applied to the gas tube 630 until after the last quenching pulse from circuit 634—639 has ceased to be applied to the gas tube chain circuit.

The circuit for resetting the gas tube chain circuit in cases where the calling party hangs up before dialing all the digits of a number comprises a rectifier 660 and a condenser 661 in the anode circuit of tube 610. This circuit accomplishes part of the resetting in response to the release of the pulse series of the party who initiated a call and then abandoned it, and it completes the resetting in response to the seizure of the pulse series of the next calling party. In response to the release of a pulse series, this circuit acts via tube 639 to so reduce the value of the energizing potential applied to the gas tubes that any which may remain ignited will be extinguished. (In cases where dialing has been normally completed before the release of a pulse series, so that the chain circuit is already in a fully reset condition and only the first tube is ignited, this drop in potential will not disturb the reset condition, i.e. it will not quench the first tube. This is because of the special bias applied to its firing electrode.) In response to the seizure of the pulse series of the next calling party, this circuit acts via tube 639 to raise the energizing potential to the level of gas tube 630, but none of the others will ignite of its own accord. The detailed operation of this circuit for the first part of resetting is as follows: So long as a pulse series is held at 603 unidirectional currents will continue to be drawn through rectifier 660 from condenser 661 causing it to remain negatively charged and the negative potential from this condenser will continue to be applied to the control grid of tube 639 over conductor 662. Under these conditions the gas tube chain circuit is maintained in suitable condition for its normal stepping operation and for normal resetting. This is true for two reasons: (1) tube 639 fixes the negative energizing potential for the gas tubes at the desired level at which all of the tubes will respond to the quenching pulses and tube 630 can ignite spontaneously when the last tube is quenched, and (2) tube 639 is itself properly biased for amplifying the quenching pulses from tube 638. When a pulse series ceases to be held at 630, whether it is because the calling party has hung up before completing dialing or because dialing has been completed and suppressor 130 has acted to disengage the sender, the negative potential from condenser 661 will cease to be applied to tube 639. The control grid-to-cathode potential of tube 639 will return to a level provided by a source of fixed bias (not shown) at which the tube draws a large current. The drop across its cathode resistor will increase, thus reducing the negative energizing potential for the gas tubes. As a result none of them, except tube 630 which is differently biased than the others, will be able to remain ionized. Therefore, in a case where dialing has not been completed when the pulse series is released, the tube which is left ignited will be quenched.

This circuit does not complete the resetting until after the next call is initiated. In particular it does so after the instant of seizure of the pulse series of the next call but quickly enough to ready the chain circuit before the start of dialing. Its detailed operation in completing the resetting is as follows: When the next calling pulse series is seized condenser 661 will again apply the negative potential to tube 639 which therefore will again be actuated to augment the negative energizing potential for the gas tubes. In the case of all of the tubes but the first one this will merely prepare them for their normal stepping operation in response to the quenching pips which tube 639 will apply to the chain circuit during dialing. However, in the case of the first one, 630, this will cause that tube to fire spontaneously. The firing electrode of tube 630 is biased high enough so that it can thus fire spontaneously but not so high that it will not be quenched by the first pip from tube 639.

Though tube 630 is capable of spontaneous ignition, it will not again do so during dialing after it has been extinguished by the quenching pip delivered from tube 639 at the end of the first dialed digit. This is because of dropping resistor 663. Once tube 631 is ignited the drop across resistor 663 will cause the anode of tube 630 to go negative so reducing its cathode to anode potential that it will no longer be able spontaneously to ionize.

Resetting of the storage condensers in cases of incompleted dialing can be achieved by the use of a free running pulse generator, not shown, which is disabled whenever condenser 661 is negatively charged, i.e. during the holding of any pulse series by 603, and which produces positive pulses at all other times. These pulses are applied to the control grids of the discharge tubes 628 of all the blocks 621—624 but not to their coupling arrangements 629.

Multi-vibrator 619, 620 of the sender register should be adjusted so that it will not be triggered for any input pulse below a predetermined level. This will prevent false registering in response to speech or room noises which may occur at the calling station during the transient engagement of the sender.

TRANSLATOR PORTION OF SENDER—FIGS. 6A, 6C

The translator portion of each sender includes as many sections A, B, C, D as the number of blocks 621—624 (Fig. 6) in the register portion thereof. At the end of the dialing of a called number each block delivers to each section a single transient voltage representing a portion of that number, for example, one of its digits, which that section in turn translates into an initial representation of a portion of the called code. In Fig. 6a the input for each section is designated as "653 IN" since in practice it will simply consist of an extension of the output lead 653 of the block which feeds it.

The total number of outputs 667 of the translator is equal to the number of elements in the code, i.e. to the number of main buses in each set thereof in the second common network. These outputs are apportioned among the several sections, for example apportioned among them equally.

Each translating section A, B, C, or D in turn includes as many sub-section circuits 666 as the number of outputs 667 which are apportioned to it and one common biasing voltage divider 663 which serves all of the sub-section circuits. Each of the sub-section circuits 666 of each of the translating sections A, B, C, or D produces one of the elements of the portion of each called code, produced by that translating section. For a dialing system in which each digit of a called number can have any one of ten possible values, each biasing voltage divider 663 will have ten output taps, each one feeding one of ten inputs for each sub-section circuit 666 in the same section. The biasing voltage divider is grounded on one end and adjacent taps along its length are separated by equal amounts of resistance. The ungrounded end is connected to a source of potential having the same polarity (herein assumed to be positive) as that of the transient voltage which, at the end of the complete dialing of a called number, is delivered from the register, over one of the conductors "653 IN," to the translating section which includes this biasing voltage divider, and having a magnitude equal to the maximum possible potential attainable by this transient voltage.

The potential level of each successive tap, going upward from the ground connection, is greater than that of the preceding one by a fixed and predetermined amount. Each of the taps is connected to a rectifier 664 on the side thereof which offers high impedance to positive voltages. In each translating section its input "653 IN" is connected in multiple to all of its rectifiers 664 on their sides offering low impedance to positive voltages. Thus at the end of the dialing of a called number all of the rectifiers 664 of each translating section of the translator involved in the call will receive a transient positive voltage from one of the blocks 621—624 (Fig. 6) of its associated register. It is obvious that the number of rectifiers 664 which will pass a current impulse in response to such a voltage transient will depend on its amplitude. While the positive transients will not encounter high impedance at any of the rectifier inputs they will encounter a counter electromotive force at every one of them, this force being stepwise greater and greater, starting at the rectifier input nearest the grounded end of biasing voltage divider 663 and going upward. When a given transient is applied in multiple to all of the rectifiers 664 an output impulse will pass through the rectifier having the highest bias which is exceeded by the amplitude of the transient as well as through all of the others between that rectifier and ground. The amplitude of the output transient from each rectifier will be the amount by which the input transient exceeds the bias on that rectifier. Thus, for each one of ten possible input transient voltages, of appropriately unequal amplitudes, a different number of transient voltages (from one to ten) will appear in the ten outputs of the bank of rectifiers and no two output transients will be of equal amplitude.

The bias applied to each of the rectifiers is applied thereto over a resistor 668 of relatively high resistance. An output lead 665 is connected to each rectifier on the output side thereof, i.e. the same side as that to which the bias is applied, and each lead 665 is multipled to extend to one input for each of the several subsection circuits 666 in its translating section. Each output lead 665 includes a condenser 669 for blocking continuous direct current flow from the tap to which it is connected. However, as to alternating currents (and, therefore, as to transients) it is conductively connected to a grounded point 670 in each subsection circuit. Therefore, each output lead 665 is grounded as to transients over as many parallel paths as the number of said subsection circuits. Since each of these parallel paths offers relatively low resistance as compared to that offered by a resistor 668, each output transient will return to ground principally over lead 665 and its several multipled branches instead of through the voltage divider. In each subsection circuit each of the ground return paths includes an individual voltage dividing resistor 671 which is individual to that return path and one of two common voltage dividing resistors 672, 673 each of which is common to several of the return paths.

Therefore, for a given input transient voltage to one of the translating sections A, B, C or D a transient voltage will appear across either one, or the other, or both of the two common voltage dividing resistors 672, 673 in each of its subsection circuits 666. The value of the voltage transient thus produced across either of them will depend upon its own resistance value and the resistance values of the several individual voltage dividing resistors 671 connected to it which may have individually received output transient voltages from several of the rectifiers 664, and upon the amplitudes of those output transients. The two common voltage dividing resistors 672, 673 are connected in series opposition whereby the magnitude of the combined output across both of them will be equal to the difference between their individual magnitudes and its sign will depend upon which one of the two has the greater magnitude. In the embodiment of Fig. 6a the combined transient output from series circuit 672—673 is transferred to the output conductor 667 of the subsection circuit over a pulse transformer 674 and through vacuum tube amplifier stages 675, 676, 677.

It can be mathematically demonstrated that it is possible to use in a single translating section, such as section A, a larger number of subsection circuits 666 each delivering over its output lead 667 an output transient voltage which, for a single input transient voltage to the section, will be different from that delivered by all of the others, and which will have a different value for every different input transient voltage, and that any desired combinations of output transient voltages for different input transient voltage can be obtained simply by selecting proper values for the individual resistors 671 and the common resistors 672, 673. In other words, it is perfectly possible to control the output voltage vs. input characteristic of each subsection circuits as desired without changing its circuit arrangement and simply by proper selection of its circuit constants. By proper selection of the overall gain of the amplifier stages 665—667 it is possible to control the range of variation of the output.

A detailed mathematical treatment of the principle of this circuit and a full description of the manner in which it can be designed will not be presented herein inasmuch as both are fully set forth in my earlier filed copending U.S. application, Serial No. 11,261/48, filed February 26, 1948, which is entitled "Translating Pulse Amplitude Modulation into Pulse Code Modulation by Means of Rectifiers" (Lesti 4).

Considering the example shown in Fig. 6a by proper selection of the values of the voltage dividing resistors (individual and common) of the four subsection circuits 666 of translating section A each of them may be made to have an input voltage vs. output voltage characteristic like one of the curves A, B, C or D of Fig. 10. For these curves it is assumed that the maximum possible amplitude for an input transient is ten volts. In curve A there is zero output for zero input. When the input is increased to one volt the output will rise to a positive value (which may be any convenient value needed in the circuit to be fed from the translator, for example 10 or 20 volts). Thereafter for successive one volt upward steps in the amplitude of the input voltage applied at "653 IN" the output voltage will alternately drop to zero and rise to said positive value so that this voltage vs. voltage characteristic has a similar appearance to a train of triangular waves on a time base.

In curve B there is zero output both when the input is zero volts and also when it is one volt; then the output rises to said positive value both when the input is two volts and remains there, when it is three volts; it returns to zero volts when the input is four volts and remains there when it is five volts; and so forth, so that this voltage characteristic has a similar appearance to a train of trapezoidal waves on a time base. Assuming that the four subsection circuits 666 of translating section A are in fact built so that their respective characteristics correspond to the curves A, B, C and D of Fig. 10, then it will be noted that for a one volt input transient on the single input "653 IN" of translating section A an output transient of said positive voltage of 10 or 20 volts will appear on only one of the outputs 667 and no transients of any kind will appear on any of the others; that for a two volt input transient an output transient of said positive voltage will again appear on only one of the output leads 667 but that it will be a different output lead this time; and that for each different input transient voltage having an amplitude which is an even multiple of one volt and lies between one and ten volts there will be a different combination of outputs on the output leads 667 one or more elements of each combination being in the form of an output transient of said positive voltage of 10 or 20 volts and all of the others being in the form of the absence of any output. Thus any dialed first digit of a called number, any digit from 1 to 10, can be represented by a different digit-representing code on the four output leads 667 of section A, while the whole called number can be represented by a complete station code on the full set of output leads 667 for the whole translator.

Even on the basis that there are only these two different possible conditions for each element of each digit-representing code, i.e. the presence of a transient having a particular voltage or the complete absence of any voltage, so that the general formula $r^n$ becomes $2^n$, it is apparent that the four output leads 667 from each section A, B, C or D are actually capable of carrying 16 different combinations. Therefore there is a certain loss of efficiency since in a decimal system each digit can only have one of ten values. However, it is within the scope of this invention to overcome this inefficiency in any one of a number of possible ways. One way would be to use an entirely different sender arrangement for translating decimal dialed numbers into a binary code. Another would be to assign to the subscribers' stations only numbers made up of digits under eight so that three outputs 667 (and three subsections 666) would be adequate for each translating section A, B, C or D ($2^3=8$). Another way would be to use trinary, quaternary, and other systems in which there are more than two possible conditions for each code element. These systems offer very great flexibility as to the number of outputs required for each translating section and hence as to the number of buses required for each set of master common buses.

All of the translating sections A, B, C and D of each translator employ the same general circuit arrangement. However, each section has its input lead "653 IN" connected to the output of a different one of the blocks 621—624 (Fig. 6) of its associated register and its group of output leads 667 corresponds to a different one of several groups of buses comprising the full set of master bus bars 132 (Fig. 1) for outgoing called codes.

During dialing the register sequentially accumulates representations of the digits of a called number in the form of charges on a plurality of condensers; and at the end of dialing the register simultaneously sends to the translator a group of transients corresponding to those charges; and the translator instantly converts the group of transients representing the called number into a larger group of transients representing the code corresponding to the called number. This final large group of transients leaves the sender and is used to set a selector, which is to be described below, preparing it to send out onto the set of main buses for outgoing called codes 132 (Fig. 1) coded sets of pulses repeated on the buses in a private time channel which will have been allotted thereon to this particular call.

MODIFIED REGISTER—(FIG. 6B)

Fig. 6b shows a modification of a portion of the register of Fig. 6 whereby a single storage condenser is charged in accordance with two successive digits of a called number thereby cuttings in half the required number of blocks 621—624 (Fig. 6). When the register thus modified is applied to a decimal dialing system the amount of charge fed to a storage condenser for each dialing impulse of the first of the two digits (say the thousands digit) is ten times as great as that fed to it for each dialing impulse of the second of them (say the hundreds digit). Since two successive digits can be dialed in 100 different ways it must be possible to charge the condenser to 100 discrete potentials any two of which must have a large enough potential difference so that each will produce a predetermined distinct response in a translator section. Assuming five volt steps for each dialing impulse of the first of the two digits and one half volt steps for the second, the operating range of the condenser would be 0 to 50 volts. In such an arrangement the biasing voltage divider 663 (Fig. 6a) in each translating section A, B, C or D of the translator has 100 taps and 100 rectifiers 664 (Fig. 6a), and if binary coding is used, each translating section A, B, C or D has seven output leads 667 in order to provide the necessary number of combinations ($2^7=128$ i.e. over 100). This represents fairly high efficiency since it leaves only 28 unused combinations. As a matter of fact, this many spare combinations might well be put to useful service, different ones of them being set up in response to other controls than station dialing for the purpose of performing some auxiliary service.

Many portions of the circuit shown in Fig. 6b are substantially the same as corresponding portions of the circuit of Fig. 6 and perform corresponding functions. Thus pulse finder 603 seizes the pulse series of a calling station and holds it until the end of dialing when pulse suppressor 130 suppresses it; tube 607 modulates the seized series with dial tone and transfers it back to the calling line circuit; tube 606 receives the seized pulse series and transfers it to a circuit for negatively charging storage condenser 625 in accordance with its dialing impulse modulations; and rectifier 611 and condenser 612 act, upon the seizure of the pulse series, slowly to overcome a bias which before that prevented premature operation of the circuit for charging. To simplify Fig. 6b the flipflop multi-vibrator 619, 620 Fig. 6), is excluded and the dialing impulses (square waves) act directly on the circuit for charging. If the multivibrator is actually excluded in practice the equipment at each substation must be closely controlled as to the return speed of its dial.

Due to the direct use of the dialing impulses no differentiators 616, 617 are provided to translate them into pips. Therefore, tube 634 receives groups of square waves instead of groups of pips. Even so the output of this tube is still a single long pulse for each input group of impulses representing one digit, and, as in Fig. 6, each long impulse is differentiated to produce a pip marking the end of the dialing of each digit.

To further simplify Fig. 6b, inasmuch as only one storage condenser is illustrated, the gas tube chain circuit is excluded. However, one skilled in the art can readily combine features of the circuits of Figs. 6 and 6b. Thus in adding the gas tube chain circuit it will be apparent that it may contain a reduced number of tubes because of the reduced number of storage condensers and that each tube should be fired after the dialing of two successive digits instead of one.

For each storage condenser there is a pair of gating tubes 678, 681 which have their control grids commoned to the output of filter 614 (which provides them with the envelope of the dialing impulses) and their anodes commoned to the ungrounded plate of the storage condenser. A circuit is provided for causing tube 678 to control the charging during the dialing of the first of the two digits and tube 681 to do so during that of the second. This circuit comprises a flipflop multivibrator 679, 680. The negative pip produced at 637 at the end of the dialing of the first of the two digits is used to upset the stability of the multivibrator which thereupon applies a negative potential to the suppressor grid of tube 678 and a positive one to that of tube 681.

The circuits of tubes 678 and 681 have different constants so that the charge received by condenser 625 for each dialing impulse of the first of the two digits will be ten times as great as that for each impulse of the second. Negative energizing potential is applied to the cathodes of tubes 678 and 681 in an arrangement similar to that for tube 626 in Fig. 6. This permits ground to be used as a reference potential level for one plate of the storage condenser.

An alternate arrangement is shown for the mutually shunting tubes 643, 644 in which their control grids are connected together. Their resulting common input receives voltages both from the output of tube 637 (a negative pip at the end of each dialed digit) and from the grid of tube 679 of the multivibrator (a negative square wave at the end of the dialing of the first digit). Though the negative pip produced by tube 637 at the end of the first digit will thus be applied to both of the tubes 643, 644 it will not operate these tubes to produce a positive pip in their common anode circuit inasmuch as the grid circuit of one of them includes an integrator whereas that of the other includes a differentiator. At the end of the first digit a long negative square wave from the multivibrator is applied to the common input with the result that during the dialing of the second digit condenser 682 of the integrator will charge up. This prepares the coincidence circuit by cutting off tube 644 to remove its shunting effect. The leading edge of the long negative square wave will not itself actuate this coincidence circuit because like the negative pip from tube 637 its application will be delayed in the integrator. It makes no difference that the square wave will continue to be applied long enough to charge condenser 682 since the pip produced by the differentiator in response to the leading edge of the square wave will be very short and will be gone by that time.

The charged condition of condenser 682 will make a difference later on at the end of the dialing of the second of the two digits. At that time tube 637 will apply another negative pip to the common input circuit and this one will result in a positive pip in the common anode circuit since the amplified and inverted pip produced by tube 643 will not be shunted out by the cut off tube 644.

Tubes 645, 646, 648, and 649 and pulse forming circuit 647 all function in the same manner as in Fig. 6 to produce a single gating pulse at the end of dialing and in the time channel assigned to the calling party, i.e. in synchronism with one pulse of this pulse series.

The coupling arrangement shown in Fig. 6b is simply a cathode follower 651 whose cathode load resistor is directly connected to the output conductor 653 over a blocking condenser. Its electrodes are connected to condenser 625 and to tube 649, respectively, in the same manner as in Fig. 6.

In this arrangement neither cathode follower 650 nor pulse transformer 652 is needed. The condenser discharging arrangement comprising discharge tube 628, clamping diode 655, and delay line 654 is similar to the corresponding portion of the circuit of Fig. 6. However, only one is shown to simplify this figure.

A tube 682 is provided for hastening the resetting of multivibrator 679, 680. This tube has its control grid connected to the ungrounded plate of storage condenser 625 with the result that the tube is cut off while the storage condenser is negatively charged. Its control grid-to-cathode bias is adjusted so that it will not draw current until the discharge of the storage condenser is nearly completed at which time a current surge through the tube will produce a negative output voltage which is applied to the control grid of tube 680 of the multi-vibrator, thus hastening its return to its stable condition. If the subscriber hangs up his hand set before completing dialing the resetting of the storage condensers (only one is shown) and of the gas tube chain circuit (not shown) will be as was explained above for Fig. 6. In addition the multivibrator will be reset of its own accord in a period of time determined by the time constants of its circuit.

It is obvious that by combining features of the circuits of Figs. 6 and 6b it will be a simple matter to devise a register which can handle called numbers comprising any desired number of digits and which will translate pairs (or even groups) of successively dialed digits thereof into single representations in the form of individual potentials on individual storage condensers, whereby the total number of condensers needed would be only a fraction of the number of digits.

MODIFIED TRANSLATOR

Fig. 6c represents one translating section of an alternate embodiment of a translator and shows circuit details for one of its subsection circuits 666 which are slightly different from those shown in the first subsection circuit 666 of Fig. 6a. The sub-section circuit of this embodiment employs a pair of vacuum tubes 684, 685 which are gated at the instant when they perform the desired function, this being very soon after the transfer of an input transient voltage to this translating section over its input lead "653 IN." To this end there is applied to the control grids of tubes 684 and 685 the same single positive pulse which is produced at tube 649 in the register (Figs. 6 and 6b) at the end of dialing and which, in the register, serves to gate out the set of transients to the translator and to actuate the discharge tube(s) 628 for discharging the storage condenser(s) 625. This positive pulse from an engaged register is applied to each of the subsection circuits 666 of each translating section A, B, C, D of its associated translator over an output lead 686 (Figs. 6 and 6b) which includes a delay line 687 for delaying the pulse by an interval equal to the slight transmission delay of a subsection circuit 666 so that the gating of any pair of tubes 684, 685 will not occur until a transient which enters the section over "653 IN" reaches their suppressor grids.

In this alternate embodiment the biasing voltage divider 663 is shown to have a source of negative potential applied to its ungrounded end. This will be the proper arrangement in embodiments in which the transient input voltage received from the register over input lead "653 IN" are negative. Obviously, transients of either polarity can readily be obtained from the coupling arrangement 629 (Fig. 6) by proper selection of which end of the secondary of transformer 652 is to be grounded and which is to feed output lead 653. In the case of the register shown in Fig. 6b, the cathode follower will deliver positive transients. However, these can readily be inverted if necessary by the use of a single vacuum tube stage. If it be assumed that the translator of Fig. 6c is intended to cooperate with the particular register of Fig. 6b, though this is not necessary, the number of taps on voltage divider 663, and the number of rectifiers 664, would be 100, even though they are represented in Fig. 6c by only 7. The pair of vacuum tubes 684, 685 replaces the arrangement of series-opposed resistors 672, 673 and the pulse transformer 674 shown in Fig. 6a.

The several voltage divisions are accomplished in each subsection circuit 666 in this embodiment over several alternating current ground return paths each including an individual condenser 688 and one of two common condensers 689, 690 rather than the individual and common voltage dividing resistors 671, 672, 673, of Fig. 6a.

Since the bias voltages and the input transients herein are negative, each of the rectifiers 664 in this embodiment has its two sides respectively connected to a tap and to the common input "653 IN" in a converse manner with respect to how each rectifier 664 is connected in the Fig. 6a embodiment. The voltage division accomplished in each of the several ground return paths multipled from each output conductor 665 is similar to that accomplished in the corresponding ground return path of the Fig. 6a embodiment. In each subsection circuit 666 the transient voltage developed across common voltage dividing condenser 689 is applied to the suppressor grid of tube 684 while that developed across the other common voltage dividing condenser is applied to the corresponding electrode of tube 685. Normally the tube may be biased to cut off. Upon the application to their control grids of the single positive pulse delivered from output 686 of the register (Figs. 6 and 6b) over input lead 691 (this being delayed to occur in synchronism with the full development of the transients across condensers 689 and 690) both of the tubes 684 and 685 will draw current pulses, the respective magnitudes of which will depend upon the voltages applied to their suppressor grids by the condensers. Tubes 684, 685 are identical and the values of their circuit elements are selected so that equal inputs to their respective suppressor grids will cause equal outputs when the tubes are gated. Their outputs are of opposite polarity since that of tube 684 is taken on its cathode load resistor while that of tube 685 is taken from its anode resistor. Their outputs are added algebraically over a common circuit 692 and applied to the input of a cathode follower 693 whose output 677 corresponds to one of the outputs 667 shown for each subsection circuit 666 of each translating section into the embodiment of Fig. 6a.

Since 100 different negative voltage transients may be received over the input "653 IN" of each translating section, assuming that the translator which includes them is associated with a register of the kind shown in Fig. 6b, each section must be capable of producing 100 different binary codes each representing a different combination of two successively dialed digits and each comprising a portion of the called code corresponding to the called number. According to the formula $2^n$ this will require at least seven output leads for each translating section and hence at least 7 subsection circuits 666. Each of which, of course, is fed over 100 outputs 665 from a single group of 100 rectifiers 664.

In order to simplify the drawing the various groups of components and circuit elements are represented in Fig. 6c (as well as in other figures herein) by reduced numbers of each.

A LINK BETWEEN THE TIME CHANNELS USED ON THE FIRST AND SECOND NETWORKS; THE SELECTOR—FIG. 9

Each selector includes a pulse finder for seizing an idle pulse series for allotting, to a call a time channel in the second common network. While a selector and its associated line finder are idle its pulse finder is disabled. However, at the start of a call this pulse finder will be rendered operative if the associated line finder should seize the calling pulse series from bus 118 (Fig. 1) of the first common network. As soon as it thus becomes operative a selector pulse finder will seize an idle pulse series which is available to be allotted by such seizure, for use on the second common network.

This is done because, while the available number of time channels on the second network will not be great enough so that a different one can be permanently assigned to each station, it will be great enough so that at a given time a different channel can be allotted to each one of all the calls then in progress.

After a call has been initiated in the time channel of the calling party, the selector acts to shift it into the time channel allotted to the call. It receives from a sender a group of transients which represents the called code and is produced once (not reiterated) in the time channel of the calling party. In the selector this group of transient sets a group of gas tubes so that a representation of the called code will be retained throughout the call and then, under control of the gas tubes, the seized pulse series gates reiterations of the called code out of the selector to the second common network in the allotted time channel. In addition to this, the selector receives the calling code from the first common network and, by use of another group of gas tubes and the seized pulse series, it similarly gates reiterations of the calling code out of the selector to the second common network in the allotted time channel. The selector receives calling-to-called speech signals as modulations of the calling pulse series, i.e. they are carried to it in the calling station's assigned time channel. The selector transfers the modulations to the pulses comprising the outgoing called codes. Therefore, the calling-to-called talking circuit in the second network is also in the allotted time channel.

A number of groups of selectors (possibly every group thereof in the exchange) is supplied from a common pulse generator 131 (Fig. 1) with a plurality of pulse series from which any selector of any group may seize an idle one when it has been prepared as indicated above. Each selector in each group has its own pulse finder and the several pulse finders in each group are connected in a series chain circuit like that of the line finders (Fig. 4). Each chain circuit has a single input which is connected to the generator 131. For this reason generator 131 has its output connected to a common single bus 140 which in turn is connected to the single input for the said chain circuit of every group of selectors which this generator serves.

Pulse generator 131 provides reiterated frames of pulses which afford the private time channels for the second network. If the probable peak traffic of the exchange is not too great a single generator 131 may suffice. The limit to the number of time channels which one such generator can provide will depend on the number of pulses (with adequate inter-pulse spacings between them) which it will be able to generate within a single frame, i.e. within a time interval equal to one period of the frame repetition frequency. Of course, the higher the frame frequency is, the shorter will be the time occupied by a single frame, and yet it must be well above the upper end of the audio pass band of the system, for example 10 kc. In other words, the maximum number of channels will depend upon the shortness of the pulses and of the inter-pulse intervals which the generator will be capable of achieving and sustaining in a dependable manner. In this connection it must also be borne in mind that between successive pulses in each frame there must be a sufficiently long time interval (of the order of three times the duration of one pulse) to accommodate a delayed pulse, which will later be inserted therein, and to leave adequate time intervals on each side of it. Where a single pulse generator can provide enough time channels for the probable peak traffic, all the selector pulse finders of the exchange will be connected to it over common single bus 140 (Fig. 1).

The selector pulse finders utilize a scanning pulse series for start. The 9 kc. pulse series used for start both in the chain of line finders and in the chain of sender pulse finders will usually be suitable. However, it will not be suitable if the frame rate of generator 131 is quite different from the say 10 kc. repetition frequency of the generators 113. The important requirement is that the beat frequency should have a period whose length is much greater than the time constant of a circuit for disabling a pulse finder in time to prevent it from seizing a second series after it has started to seize a first one. Therefore, if the frame rate of pulse generator 131 is equal to or near to the repetition frequency of the pulse generators 113, then it will be proper to employ a common 9 kc. pulse generator for start.

PREPARING THE SELECTOR PULSE FINDER. FIGS 9, 9a

The utilization lead 407 (see Fig. 4) of each line finder is directly connected to an input lead 901 of its associated selector. The calling party's pulse series received at 901 is applied to tube 902 for amplification. The output circuit of tube 902 is connected to a rectifier 903 and a condenser 904 across which a positive potential is developed in response to the input pulse series. This is applied to the pulse finder of this selector over a conductor 905. Within the pulse finder (see Fig. 9a) this potential is applied to the suppressor grids of a pair of mutually shunting tubes 906, 907 which correspond to the tubes 507, 508 of a line finder (Fig. 5). Fig. 9a shows only a portion of the selector pulse finder to show how this positive potential is applied to tubes 906, 907. In the absence of this potential the suppressor grids are normally biased with a negative potential provided over a resistor 908 from a source designated by the symbol "—". The vacuum tube 909 shown in Fig. 9a corresponds to vacuum tube 500 of a line finder (Fig. 5). The rest of the selector pulse finder circuit is the same as that of the line finder circuit. To avoid any possibility of error in relating the partial circuit of Fig. 9a to the complete circuit of Fig. 5, three conductors of Fig. 9a which correspond exactly with three conductors, A, B, C, of Fig. 5, are marked with the same reference letters. The selector pulse finder has a utilization lead 910 (see lower left and upper right Fig. 9) over which it delivers the pulse series, which it seizes from the output of generator 131, to two sets of rectifiers which shall be described more fully below. The output conductor 911 and the input conductor 912 shown in Fig. 9 correspond respectively to conductor 402 and input 404 of Fig. 4, i.e. conductor 912 is the input conductor which feeds this pulse finder from the common return for start of the chain circuit of selector pulse finders.

PLACING THE CODES IN THE ALLOTTED TIME CHANNEL

Therefore, very soon after the calling party raises his hand set his assigned pulse series will have been seized by a line finder, and the selector associated with that line finder will have thereafter seized a free pulse series from generator 131 thereby allotting to the call a private time channel on the second common network. The latter seized pulse series will be applied over lead 910 to two sets of rectifiers 913 and 914, each set of which includes as many rectifiers as the number of elements in the code, i.e. 14 in the suggested example for a 10,000 line exchange. To avoid burdensome detail in the drawing each set of rectifiers is represented in Fig. 9 by an illustrative group of five. As is apparent by reference to Fig. 9 the seized pulse series is applied from lead 910 directly and in multiple to all of the rectifiers of the set 914, whereas it is applied in multiple to the rectifiers of the other set 913, over two amplification stages 915a, and 916a at the output of which the pulse series has its original positive polarity. Both sets of rectifiers receive the pulse series in positive polarity and on their sides which offer low impedances to positive voltage. The opposite side of each rectifier of each set is connected to an output conductor. Therefore, there are two sets of output conductors 915 and 916. If nothing more were provided each positive input pulse of the series seized at the selector would result in two complete sets of simultaneously occurring positive output pulses, each set comprising as many pulses as the number of elements in a code and each set appearing on one of the sets of conductors 915, 916. However, all of the rectifiers of each set have a positive biasing voltage applied to their output sides, i.e. their sides offering high impedance to positive voltages, and the magnitude of this bias is greater than the amplitude of the pulses. Therefore, ordinarily i.e. when the selector is idle, no output pulses occur on any of the conductors of either of the sets 915, 916.

Even after the selector is engaged the bias will still be applied to all of the rectifiers 913 until the end of dialing. However, a means is provided which responds to the group of transients sent to the selector from the sender-translator at the end of dialing to overcome the bias on particular ones of the rectifiers 913, thus permitting coded sets of simultaneously-occurring pulses to be transferred out of the selector over a group of particular ones of the conductors 915 which correspond respectively to said particular outs of the rectifiers. Thus the group of transients which represents the called code, though it itself occurs only once (and for that once in the time channel assigned to the calling party) will actuate the selector to produce a coded pulse carrier which will be repeated throughout the call in the time channel alotted to it for transmission through the second network.

A similar means is provided which responds to the calling code, sent to the selector from the calling line circuit, to overcome the bias on particular ones of the other set of rectifiers 914. Since the calling code starts to be produced immediately after the calling party raises his hand set, the selector will be operated to deliver calling codes to the second network sooner than it is operated to produce called codes. Sets of simultaneously-occurring pulses coded like the original calling codes will be transferred out of the selector over a group of particular ones of the conductors 916. The function of the selector with respect to the calling code is to transfer it from the time channel assigned to the calling station to the time channel allotted to the call.

A calling line circuit sends its code over the set of buses 119 (Fig. 1) of its first common network to the inputs of a set of amplifiers (or amplifier cascades) 134 (Fig. 1). The set of amplifier outputs is connected in multiple to the sets of conductors 917 of the say sixteen selectors connected to this first network. Obviously, if several line circuits in the same group are calling simultaneously then a number of calling codes each, of course, in a different time channel, will appear on the set of input conductors 917 of every selector serving the group. However, each selector is arranged to respond only to the calling code occupying the same time channel as the one calling pulse series seized by its associated line finder.

In each selector the means for responding to a calling code to overcome the bias on particular ones of the set of rectifiers 914 comprises a set of gas tubes. It is arranged so that a coincidence of pulses is required to fire any of the gas tubes and therefore the set of tubes will not be operated by any calling code other than that for the one call for which the selector is engaged. In an engaged selector both the one calling pulse series, which it receives at 901 from its associated line finder, and all of the calling codes, which it receives over the set of conductors 917, are applied to the set of tubes 918. The pulse series will occupy the same time channel as one of the calling codes, and one of its pulses will aid a set of pulses comprising that code to produce ionization of particular ones of the gas tubes.

For each calling code positive pulses (the pulse elements of that code) will be applied to the firing electrodes of particular ones of the set of tubes 918 over particular ones of the conductors 917. The calling pulse series is also applied to the control electrodes of these tubes, it being applied in multiple to all of them. No one of the positive pulses of the pulse series, nor any one of the positive pulses comprising an element of a calling code will alone have sufficient amplitude, so that its voltage, combined with a fixed bias which is provided, will exceed the firing potential for a tube. However, each of the particular tubes which receives a pulse element of the calling code occupying the time channel of the seized pulse series will receive a pulse from that series each time that it receives one of said pulse elements. On the control grid of each of these particular tubes a coincidence of positive pulses will be repeated at the repetition rate of generator 113 (Fig. 1) from the moment the calling party raises his handset until the moment when he replaces it. The first coincidence, however, will be the useful one, it will fire the tube which will remain ignited because of its characteristics as a gas tube.

The cathode of each gas tube 918 is grounded through a cathode load resistor and therefore a positive potential will be developed at the upper end of this resistor after the tube has fired. Each gas tube has its cathode connected to the input side of a corresponding one of the set of rectifiers 914. Therefore, for each ignited tube, of the set of tubes 918 one of the rectifiers 914 will have its bias at least partly overcome whereby the positive pulse series applied to it from the selector pulse finder over 910 will pass through it onto one of the output conductors 916. Thus the calling code is first translated into the ignition of particular tubes corresponding to the pulse elements of the code, and then, as a result of this, reiterated sets of coded pulses will be transferred out of the selector to the second network over conductors 916 in a time channel not permanently assigned to any subscriber but temporarily allotted to this call. Thus far the calling party's code will still carry no modulation.

Each selector has a set of input conductors 919 for receiving from the senders the groups of transients representing called codes. Therefore the sets of conductors 919 of all of the, say 16, selectors serving one first network are multipled to the sets of outputs 667 (Figs. 6a, 6c) of all the, say two, sender translators serving it.

Since very often several stations will be dialing at about the same time, it is possible that several groups of transients each representing a different called number may enter each of the selectors on its set of conductors 919 at nearly the same time. But they will never do so at exactly the same time, since each group of transients will be in synchronism with one pulse of only one of the several different calling pulse series.

Corresponding to the set of gas tubes 918, there is another set of gas tubes 920 which have their control electrodes individually connected to the input leads 919 and, like the tubes 918, also have them multipled to the input lead 901. These tubes also are biased so that none of them will be ignited by a transient coming over a conductor 919 unless there is a coincidence between it and a pulse of the seized series delivered over 901. When a group of transients is received on conductors 919 at the end of the dialing of a calling station in the same time channel as its assigned pulse series which is entering the selector over conductor 901, particular ones if the gas tubes 920 will become and remain ionized, thus translating the transient representation of the called code into a representation of controllable duration. A positive potential will be developed at the cathode of each of the ignited tubes and applied to one of the set of rectifiers 913. Thus, there will be discharged onto the set of output conductors 915 simultaneously reiterated coded sets of pulses in the time channel allotted to the call for transmission over the second network.

CALLING-TO-CALLED TALKING CIRCUIT THROUGH THE SELECTOR

Each called code, and each calling code, in addition to performing a station selecting function also serves to carry speech modulations. In the case of a called code it receives speech modulations in the selector. For this purpose a circuit is provided in the selector for transferring to an outgoing called code the modulations which were carried into the selector over conductor 901 on the calling party's pulse series. In the case of a calling code it leaves the selector and passes over a portion of the second network to the connector before it receives any modulations. The calling pulse series is fed from the output of tube 902 to a filter 921 which extracts the audio signal carried by it and applies that signal to the control grid of tube 922. Tube 922 amplifies the audio signal and transfers it over conductor 923 to the control grid of tube 915a. At the same time tube 915a will be receiving on its suppressor grid (via lead 910) the pulse series seized by the selector pulse finder from generator 131. Therefore this tube will act to modulate this pulse series in accordance with the audio wave delivered from 922. In this way the modulation envelope is transferred from the calling station's pulse series to the pulse series allotted to the call, i.e. from one time channel to another. The modulated pulse series is inverted and amplified by tube 916a and transferred from it in multiple to the input sides of the set of rectifiers 913 over another set of rectifiers 924. Therefore, each reiterated pulse element of a called code which is released onto a conductor 915 over a rectifier 913 will leave the selector carrying any voice modulations of the calling party which were carried on the single pulse series leaving tube 916a.

RESETTING SELECTOR

The selector comprises means for producing a pip at the termination of a call and for utilizing it to reset the gas tubes. The pulse series received over input conductor 901 at the start of a call is amplified in tube 925 and applied to an integrating circuit which converts it into one long square wave which lasts all during the call. This is differentiated at 926 and applied to the control grid of a tube 927. When the subscriber hangs up and cuts off his pulse series, the square wave will end and differentiator circuit 926 will produce a pip. This will be amplified in tubes 927, 928 and fed to a transformer 929. A transient voltage will be induced in the secondary of that transformer which will oppose the energizing potential feeding the anodes of both of the sets of gas tubes. Thus, the tubes will be extinguished and prepared for a new cycle of operation.

When the calling pulse series on input 901 comes to an end condenser 904 will discharge permitting the suppressor grids of tubes 906, 907 (Fig. 9a) of the selector pulse finder to return to their normal negative bias thereby blocking those tubes and releasing the allotted pulse series seized from the output of generator 131 at the beginning of the call. This released pulse series and the time channel which it represents thus becomes available for seizure and use in a later call.

SELECTOR ACTUATES PULSE SUPPRESSOR

Once its set of tubes 920 has been set by a group of transients from a sender, the selector acts to provide pulse suppressor 130 (Fig. 1) with the pulse series which actuates it to disengage the sender. The cathode circuits of these gas tubes have a common ground return including a common resistor 932. Even if a called code includes only one pulse element, i.e. even if only one of the gas tubes is fired, the voltage developed across this resistor will be large enough to overcome or usefully reduce a fixed positive bias applied to the output side of a rectifier 930. The calling pulse series is applied to the input side of rectifier 930 from input 901. Therefore, once the set of gas tubes 920 is set the calling pulse series will pass through rectifier 930 and out of the selector over lead 931 from which it will be applied to the control electrodes of the tube 656 (Fig. 6) of sender pulse suppressor 130 (Fig. 1). Once the pulse suppressor receives this pulse series it utilizes it to disengage the one sender which just completed its function by sending the group of transients to this selector.

SELECTOR FEEDS SECOND NETWORK

The sets of conductors 915 of all of the selectors in the exchange feed called codes to the second common network. To this end their individual conductors are multipled to the buses comprising the set of main buses for outgoing called codes which is represented in Fig. 1 by a single heavy line 132. Similarly, and to feed calling codes to the second network, the sets of conductors 916 of all of the selectors in the exchange have their individual conductors multipled to the buses comprising the set of main buses for outgoing calling codes (133, Fig. 1).

TRANSLATING CALLED AND CALLING CODES INTO A FORM FOR OPERATING DECODERS; DECODER DRIVER FIG. 7.

The decoder driver is a common component which transfers incoming called and calling codes from the second common network to many or all of the first common networks of the exchange over each of which they reach the decoders of all the line circuits served by it. In transferring the codes it translates them into a proper form for operating the decoders. The driver has a group of inputs, 700, each of which is fed from one bus of the set of main buses 135 for incoming called codes. This set of buses receives called codes over a link from the set of main buses 132 for outgoing called codes. It receives calling codes over the same link and the same set of buses (132) since the calling codes are fed to the set of buses 132 after they leave the connector. To simplify the drawing this group of perhaps 14 inputs 700 is represented in Fig. 7 by a group of only five. Each of the inputs 700 is connected to the control grid of one tube of each of two sets of vacuum tubes 701, 702. Each vacuum tube of the set 701 has its anode circuit connected to one of a first group of individual output terminals for the driver and also to the control grid of a corresponding tube of a third set of tubes 703. Thus, when one of the tubes 701 receives on its control grid a code element in the form of a reiterated positive pulse it will deliver a negative pulse series both to one of the individual output leads of said first group and also to the control grid of said corresponding tube of the set 703. Each of the tubes 702 normally has its control grid biased to cut off (not shown) and the plate circuits of all of these tubes are commoned. Therefore, when the driver receives reiterations of a code in a given time channel, whether the code includes many pulse elements or only one this set of tubes will produce a single negative output pulse series in the same time channel. This single series is inverted in a tube 704 which applies the resulting positive pulse series to the suppressor grids of all the tubes 703. Each of the tubes 703 is normally cut off by a fixed negative bias on its suppressor grid. However, this is overcome in the time channel of any incoming code by the pulse series produced from it by the set of tubes 702 and the tube 704. Therefore, each of the tubes 703 which does not have a negative pulse series applied to its control grid in the same time channel from its associated tube 701 will produce a negative pulse series in that time channel. On the other hand any tube 703 which is receiving a negative pulse series in that time channel from its associated tube 701 will remain cut off. Each tube 703 has its anode circuit connected to one of a second group of individual outputs for the driver.

From the foregoing it is apparent that in the driver the form of the code is translated. On its input side there is a set of 14 conductors 700 which receives codes having 14 elements any one of which may have the form either of the presence of a pulse or of its absence. On its output side there are 14 pairs of conductors each pair comprising a conductor 707 and a conductor 708. The full set of 28 conductors (designated 706 in Fig. 7) carries translated codes each of which will consist of a reiterated full set of 14 simultaneously occurring pulses distributed over particular ones of the 28 conductors in accordance with the input code, and the output set will include 14 pulses no matter how many or how few pulse elements—even so few as one—the input code may have included before it was translated.

TALKING CIRCUIT THROUGH THE DRIVER

All of the tubes of set 701, or of set 703, or of both sets, are adjusted to operate at saturation. Therefore, no modulation will be carried on the reiterations of a set of output pulses comprising a translated code. This is not essential but it is shown to illustrate how the modulations can be carried if in practice it should prove advantageous to actuate a decoder with a set of pulses of uniform amplitude. However, none of the tubes 702 operates at saturation and therefore each single pulse series produced by this set of tubes will carry the modulations previously carried by the input code occupying the same time channel, i.e. by the one or more synchronous pulse series comprising that input code. Each of these modulated single pulse series is amplified in a tube 705 from which it is applied in multiple to all of the line circuits in the exchange on the output sides of their decoders. The decoder of any line circuit engaged in a call will receive on its input side reiterated sets of fourteen simultaneously-occurring pulses representing its code and on its output side, and in the same time channel, a modulation-carrying single pulse series produced from its code by the set of tubes 702 of the driver. It will accept the sets of 14 pulses and convert them into a single (unmodulated) pulse series in the same time channel. Therefore, there will occur at the output of the decoder two synchronous single pulse series—one modulated and one not modulated. They are added together to produce a single pulse series whose pulses have a larger average amplitude and are modulated. This additive pulse series, as was explained above is eventually filtered and its audio components are sent to the station served by that line circuit.

In the first common network serving each group of line circuits there is a set of 29 buses shown in Fig. 1 as a single line 116. The driver's set of 28 code-carrying outputs 706 has its conductors individually connected to 28 buses of the set of 29 buses 116 of each first network. The output circuit of tube 705 is connected to the 29th bus of each set.

For any input code the driver will produce a full set of 14 output pulses reiterated on particular ones of the outputs 706 and over them on particular ones of the buses 116 (Fig. 1). Therefore, in order that a decoder will respond only to its assigned code all that is necessary in that its 14 inputs be connected to particular ones of the set of buses 116, of the first network serving its line circuit, in accordance with that code.

Dotted block 709 contains an enlarged circuit diagram of a decoder (also shown in Fig. 4). A negative potential is applied to circuit point 271 of the decoder over dropping resistor 270. Point 271 is grounded over 14 rectifiers 247, represented in Fig. 7 by the group of five, each of which is connected to point 271 on its side offering low impedance to a negative voltage. Normally current will flow through the whole set of rectifiers over dropping resistor 270 thus greatly reducing the negative voltage applied to point 271. Even when the decoder is receiving sets of less than 14 pulses the same condition will continue to exist. However, when a full set of 14 negative pulses is applied to the decoder, one of them to each of the rectifiers 247, the opposition to the bias which they provide for the duration of a pulse will momentarily stop all current flow through 270 thus sharply increasing the negative potential at point 271 and producing a negative pulse. At the same time an amplitude modulated negative pulse series in the same time channel will be delivered to point 271 of this decoder from tube 705 over the 29th bus of the set 116 serving the line circuit including this decoder and over the input conductor 249 (Fig. 2) of that line circuit.

A number of amplitude modulated single pulse series may be delivered from tube 705 to point 271 of this decoder, and to the corresponding point of every other decoder in the exchange but none of itself will be of sufficient amplitude to pass through negatively biased rectifier 251. However, in any line circuit engaged in a call one of the ampliutde modulated pulse series which is received at 271 will be in synchronism with a full set of 14 pulses (its code) which will be actuating its set of rectifiers 247. Therefore, negative pulse series produced in response to its code will add to the modulated single pulse series and together they will pass through biased rectifier 251.

TRANSLATING OTHER TYPES OF CODE

The driver illustrated in Fig. 7 is the type of driver suitable in a binary system in which each element of a code has the form either of the presence or of absence of a pulse on the one conductor, of a set thereof which is provided for carrying that code element. However, this system is adaptable to other types of code, such as trinary, quaternary, etc. in which each element of the code may have r possible states of being. For example it is adaptable to a type of trinary system in which each element of the code may be a positive pulse, or the absence of any pulse, or a negative pulse. The sender translator is fully capable of producing a transient representation of this kind of an output code (as well as of many other kinds) simply by proper selection of the circuit constants. Certain obvious modifications would be required in the selector to adapt it to translate an initial representation of a trinary or "r-nary" code which it receives from the sender translator into a final form for use in the second network. The decoders would not have to be modified, and certain modifications would be required for the driver.

For each input of the driver in a trinary system (each input corresponding to an input 700 of Fig. 7), there would be a group of three outputs instead of a pair of two. It would be necessary to provide a circuit whereby a pulse would be produced on a different output lead of each group of three depending on which one of its three possible conditions obtained for the code element received on the corresponding input.

Though not shown in the drawing the circuit of a driver suitable for the type of trinary system mentioned above is described below. It is described with reference to, and as a modification of, Fig. 7. Each input 700 could feed one of a set of tubes such as the tubes 701 of Fig. 7, which would be biased to cut off so as to respond only to positive pulses, producing negative pulses in response thereto. Each of these tubes would feed one output of a group of three corresponding to its input lead. Each input lead feeding a tube 701 could also feed one tube of an additional group of tubes, a group not needed and not shown in Fig. 7, each of which is adjusted to operate normally at saturation so as to produce an output pulse only in response to a negative input pulse. Each tube of this group would feed a third output of a group of three corresponding to its input lead. In order that the pulses delivered by the tubes of this additional group be of negative polarity they may be taken off from load impedances in their cathode circuits or they may be taken from their anode circuits and then passed through a set of inverter tubes. The rest of the driver could be exactly like the driver of Fig. 7 except for one additional provision. This would be to connect the negative output of each tube of said additional set of saturated tubes to the control grid of an associated one of the tubes 703 for blocking it, despite the action of positive pulse series from tube 704, to prevent the generation of an undesired negative pulse on the second output (of one of the groups of three) which is fed by this tube 703 when the code element received on the corresponding input 700 is a negative pulse. The only further difference thereafter between a trinary system employing such a driver and the binary system shown and described above would be that the set of buses 116 of each first network, though it would still serve to carry sets of only 14 simultaneously occurring pulses, would comprise forty-two code carrying buses plus one additional bus for carrying the single modulated pulse series delivered from the tube 705. Each decoder would still comprise 14 individual inputs which, in this case, would be connected to a distinctive combination of 14 of the 42 outputs of the driver.

It is obvious from the foregoing that considerable flexibility is available in embodying the present invention and that this flexibility makes it possible to design each embodiment to obtain maximum efficiency in the use of particular components for which high efficiency is important. For example, if economy is desired particularly in the matter in keeping down the number of buses in each set thereof in the second network, because they are to be used to connect two widely separated central offices and the cost of the co-axials is important, then the formula $r^n$, the value of n, i.e. the number of buses, can be made small, this being compensated for by the use of a large value for r.

On the other hand under different conditions where the number of buses is of secondary importance, but it is desired to simplify the circuit arrangements of some of the components, it might be expedient to use a binary system.

ADAPTING CODES FROM ONE SYSTEM OF CODING FOR EQUIPMENT OF ANOTHER, FIG. 11

Sometimes, it will be desirable to go from one code system into another, for example from a trinary into a binary. This might occur within a single exchange. It would be even more likely where two exchanges of radically different sizes are to be interconnected by code carrying buses. Thus, a small exchange might use fewer code elements, i.e. a smaller value for n, while a large exchange might use a greater number of code elements and/or might go even further and use a value for r which is greater than two.

BINARY TO TRINARY

Fig. 11 is a block diagram showing an arrangement whereby binary codes received over a set of 14 bus bars (perhaps from a distant exchange) may be translated directly into the proper form for feeding decoders which normally receive the output of a driver in a trinary system using sets of only seven main buses, i.e. a system operating under the formula $3^7$ (r=3, n=7). In Fig. 11, the group of 14 input conductors 1100 may be assumed to be individually connected to a set of 14 main buses for incoming binary codes. These conductors feed a decoder driver 1101 the circuit of which is identical to the driver circuit shown in Fig. 7. Accordingly the outputs 1102 for decoder driver 1101 number twice as many as its inputs, 28, i.e. there being a pair of outputs for each input. In the trinary system there will be, in each first network, a set of buses corresponding to the set 116 shown in Fig. 1 for the binary system described herein but including $3\times7=21$ code carrying buses instead of $2\times14=28$. The code adapter shown in Fig. 11 will feed in multiple these sets of buses 116 of all of the first networks and to this end the set of 21 output conductors 1103 of the code adapter is multipled to all of said sets of buses. The 21 output conductors 1103 comprise seven groups of three. This output arrangement corresponds to that of a decoder driver (not shown) which is employed in the trinary system. Its 21 outputs will be similarly multipled to said sets of buses of all the first networks. The decoder of each line circuit will have seven inputs which are connected to a distinctive combination of 7 of the 21 code carrying buses comprising the set 116 of the first network serving that line circuit. The code adapter is so arranged that its conductors 1103 will deliver to the decoders of the trinary exchange a full set of seven simultaneously recurring pulses into which it translates codes which it received in the binary form. Therefore, the code adapter translates binary codes into the same form as that into which the trinary driver converts trinary codes. Thus, the arrangement of Fig. 11, i.e. the code adapter, takes the place of the trinary decoder driver for all outside calls arriving in the form of binary codes, while that driver handles normal trinary codes received over only the second network of the trinary system. In Fig. 11 the components which occur between the outputs 1102 of the binary driver 1101 and the output conductors 1103 (which correspond to outputs of a trinary driver) serve to perform the translating function. To this end, two elements of a binary code, the elements occurring on the first two input conductors 1100, are made to determine on which one of the first group of three outputs 1103 a pulse will appear. The different possible combinations for two elements in a binary code will be $2^2=4$, i.e. (1) there could be no pulse on either, (2) a pulse on the first but not on the second, (3) a pulse on the second but not on the first, or (4) pulses on both. However, the first set of three conductors 1103 could only handle three possibilities, either a pulse on the first, or one on the second, or one on the third. Therefore, in the transfer there will be slight loss of efficiency and the particular trinary system postulated herein will not be able to handle as wide a range of selection as the input binary system.

For each two pairs of outputs 1102 there will be a group of three decoders of a type similar to the one shown in the dotted block in Fig. 7 except that each decoder will comprise only two input rectifiers. The two inputs of each of the decoders will be connected to a different combination of two of the four output leads 1102. Therefore, only one decoder in the first group of three will produce an output pulse series in response to each of three predetermined different combination of code elements on the first two input leads 1100. Each one of the first group of three decoders 1104 has its output individually connected to a particular one of the first group of three outputs 1103. This same arrangement is carried out between each ensuing group of two inputs 1100 and each ensuing group of three output leads 1103. Therefore, without using the decoder driver provided in the trinary system the incoming binary codes will be translated directly into the same form as that into which the trinary codes are translated by the trinary driver. From the code adapter the translated binary codes will be applied to the set of buses 116 of many or all of the first networks in the trinary system.

TRINARY TO BINARY

For effecting code adaptations in the opposite direction, i.e. from trinary to binary, the circuit of the translator already shown herein may be employed. For example, if each bus in a set of main buses carrying trinary codes (perhaps from a distant exchange) is fed to the input of a circuit corresponding to section A of Fig. 6a and if it be assumed that an element of the code carried on that bus may have any of the following three states of being, i.e. that it is a pulse of one volt, or a pulse of two volts, or a pulse of three volts, then it is apparent that the translator will be capable of producing for each different input a different binary code output on its group of output leads, corresponding to the leads 667 of Fig. 6a. The translator used for this purpose would have as many sections as the number of elements per code in the trinary system feeding it and as many outputs 667 as the number of elements per code in the binary system fed from it. It is obvious without further explanation that the translator also could adapt codes received from a quaternary system or any other system in which a single code element may have any one of a plurality of stages of being.

CONNECTOR, FIG. 3; A COMMON AMPLIFIER

The connector has an amplifying channel which is connected to the pair of buses 115 of many or all of the first common networks in the exchange. When engaged in a call any line circuit served by a given first network will feed from its output conductor 273 (Fig. 2) and into one of the pair of buses 115 of that network the pulse series which is produced at output point 252 of its decoder in response to a correct incoming code. At the connector this pulse series is received on input conductor 300. The series is thereafter amplified by tubes 301, 302, and 303 and delayed in a delay line 304 by one period at its repetition frequency, i.e. 100 microseconds at 10 kc. From the delay line it passes into an amplifier tube 305 and then to an output conductor 306 which is multipled to the other bus of the pair 115 of many or all of the first networks. In each first network this other bus is multipled to the input conductors 272 (Fig. 2) of all of the line circuits served by that network. At any time twice as many pulse series will be making the two way trip to and from the connector as the number of calls then taking place. This is due to the fact that for each call the connector amplifies two pulse series, one from the decoder of the called line circuit and one from that of the calling line circuit. Each pulse series sent to the connector from any line circuit in any first network is returned in multiple to all of the line circuits of all of the networks. However, each line circuit includes a coincidence circuit which rejects all of these returning pulses series when the line circuit is idle and will accept only a particular one when it becomes engaged in a call, namely the same pulse series which it sent to the connector (in the allotted time channel) and which it will continue to send to it until the end of the call.

Any pulse series coming into a given line circuit on its input conductor 272 (Fig. 2) from the connector will encounter a biased rectifier 256 which will prevent the series from progressing further into the line circuit. However, if the line circuit is engaged in a call one of the pulse series entering over 272 will be in synchronism with the pulse series leaving the same line circuit over its conductor 273. That output pulse series will follow a conductive circuit through rectifier 257, to a point where it will join and be added to series returning amplified from the connector. Actually it is the same pulse series at different points in a transmission loop and therefore synchronism will obtain so long as the transit time is negligible. The additive amplitude of the incoming and outgoing pulse series will be sufficient for passing through rectifier 256. Thus, only the proper pulse series gains access to a particular line circuit and therefore any voice modulations which it may carry will be privately transferred to the associated substation 200 over circuits of the line circuit which have already been described.

A COMMON MODULATOR FOR THE CALLING CODES

For every call two pulse series pass through the connector for amplification. One is in a first portion of the time channel allotted to the call and the other is in a second portion. The one in the first portion comes from the called line circuit where it is produced from the called code. The other comes from the calling line circuit where it is produced from the calling code.

Although the called and calling codes both occupy said first portion of the allotted time channel at the time when they are fed from the selector to the second network, a means is employed for delaying the calling code while it is on route through the second network and before it reaches the calling line circuit. As a result the pulse series produced from it occupies that second portion. The connector provides the delay means. It includes a circuit which links two sets of buses which carry calling codes through the second network. The means for delaying the calling codes is provided near the output side of this link. However, before the calling codes reach this means, and therefore while they are still in the first portion of the allotted time channel, they pass through a set of modulator tubes included in the link nearer to its input side. At this point both the undelayed calling code and the pulse series from the called line circuit are synchronous, i.e. they are both in the first portion. Because of this arrangement this pulse series can be, and is, utilized for carrying called-to-calling voice signals from the called line circuit to the modulator tubes where they can be impressed on the calling code.

Each pulse series which passes through the amplifying channel of the connector is applied over a conductor 307 from tube 303 to the suppressor grids of all of a group of 14 modulator tubes 308. (There are as many modulator tubes as the number of elements in a code.) A set of 14 conductors 309 (shown as 5) individually connect the main buses 136 for incoming calling codes to the control grids of the modulator tubes. Accordingly, for each call any modulation carried on the pulse series arriving from the called line circuit will be impressed on the calling code. More particularly, it will be impressed on the one or more synchronous pulse series comprising the calling code, the modulation being accomplished in the one or more modulator tubes which are carrying pulse elements of the code.

The modulated calling code leaves the connector of a group of output connectors 310 which are fed from the anode circuits of modulator tubes 308. Each of the conductors 310 includes in series one of a group of 14 delay lines 311 for delaying each pulse element of each calling code by a little more than the duration of a single pulse. This delay moves each calling code to an unused second portion of the time channel allotted to the call, thus making it possible to feed the calling codes leaving the connector to the set of main common buses 132 which has thus far been described as carrying called codes and, in fact, has even been designated as the set of buses for outgoing called codes. In fact, over at least part of its extension this set of buses carries both the called and calling codes for a given call. Since both codes are to be transmitted over the rest of the second network of the same metallic circuit and since they must not interfere with each other, it is essential that the called and the calling codes must no longer occupy the same portion of the allotted time channel. After it has been delayed a calling code will be adjacent to and immediately after the called code for the same call thus establishing on the same medium one private channel for calling-to-called transmissions and another to called-to-calling transmissions.

A modulated calling code which passes over conductors 310 to the set of main buses 132 thereafter will follow a transmission path already described for the called codes. It will pass from the set of buses 132 to the set of buses 135 through decoder driver 137, to the sets of buses 116 of many or all of the first networks in the exchange, to the decoders of all of the line circuits of each of these first networks, and into the line circuit of the calling party since its decoder will accept its own code.

MODULATING CALLING CODES WITH BUSY TONE; BUSY CONNECTOR, FIG. 8

The busy connector is connected to the pair of buses 114 of many or all of the first common networks in the exchange over its pair of input conductors 800, 801 (Fig. 8). The decoder of each line circuit involved in a call accepts its own code and produces from it a pulse series which it feeds out of the line circuit over two separate outputs 274 and 275 (Fig. 2). In each of the line circuits involved in the call this pulse series reaches its output 275 directly from its decoder over a rectifier 260 and it reaches its output 274 indirectly from the decoder via a two way trip of the first network to, through, and from the amplification channel or connector 138, and over a rectifier 261. When some third station tries to call either one of the two stations engaged in a call and, by dialing that station's number sends its correct called code to its already-busy decoder, that decoder will not fully accept it to the extent of routing through connector 138 the pulse series which it produces from the decoder. It will only partially accept it to the extent that it will send the pulse series it produces from the code over the rectifier 260 to the output 275. Thus for an attempted call to a busy station the line circuit of that station will send out a pulse series which it produces from its called code only over one of the two separate outputs 274, 275. Therefore two pulse series will leave the busy line circuit on its conductor 275 each of them, of course, occupying different allotted time channels, and only one pulse series will leave over its conductor 274, this one being in the allotted time channel for the completed call.

For a given call busy connector 139 will receive from both conductors 274 and 275 of the called line circuit a pulse series in the first portion of the allotted time channel and it will also receive from both of these conductors of the calling line circuit a pulse series in the second portion. The only difference for each attempted call to a busy station will be that the two pulse series which busy connector 139 receives in the two portions of the time channel allotted to the attempted call will reach it only over the outputs 275 of the called and calling line circuits. Since the output conductors 274 and 275 of all the line circuits in each group are multipled to the pair of buses 114 of the first network serving the group and since the pulse of buses 114 of many or all of the first network are multipled to the busy connector inputs 800, 801, the busy connector will receive at any time twice as many pulse series as the number of calls then in progress. There will be two pulse series on both of the conductors 800, 801 for each completed call and two pulse series on one conductor 800, 801 for each attempted call on a busy station. The two pulse series for each completed call are fed both to the control grid of a tube 802 and to the control grid of a tube 803 (over the input conductors 800 and 801, respectively). Tubes 802 and 803 comprise a subtraction circuit. No matter how many calls are in progress at the same time the two pulse series are received over both conductors 800, 801, those received for completed calls, will cancel themselves out in the subtraction circuit. The two pulse series for each attempted call to a busy station will appear only on conductor 800 and such cancellation therefore will not take place.

If any station seeks to call a busy station, one of the two uncancelled pulse series entering busy connector 139 over its input 800 will occupy the first portion of the time channel allotted to the attempted call and will come from the line circuit which is being called while busy, and the other will occupy the second portion of the allotted time channel and will come from the line circuit which is attempting to call.

Busy connector 139 has a group of 14 input conductors 804, each of which individually connects a position of the set of main buses 136 for incoming calling codes to the control grid of one of 14 modulator tubes 805. Since the busy connector is common equipment all of the calling codes passing through the exchange at a given time will reach the set of tubes 805. This will be true whether the calling codes are related to completed calls or to attempts to call. However, the suppressor grids of these tubes are normally biased negatively to cut off and most of the calling codes will not pass through the tubes 805. In fact none of the calling codes related to completed calls will pass through them.

The output of subtraction circuit 802, 803 will consist of two pulse series for each attempted call to a busy line. One of these, that occupying the first portion of the time channel allotted to the attempted call, will be synchronous with the calling code of the station which is attempting the call. It is utilized in the busy connector for increasing the cut-off bias in said first portion of said allotted time channel to permit the calling code to be transmitted through the set of tubes. To this end the output of subtraction circuit 802, 803 is fed to the control grid of the vacuum tube 806 whose output in turn is fed to that of a tube 807. Tube 807 has its suppressor grid connected to a source 808 of a busy signal so that every pulse series which passes through this tube will be modulated with that signal. These pulse series are applied over a conductor 809 in multiple to the suppressor grids or all of the modulator tubes 805. For each attempted call to a busy station the pulse series in a first portion of the allotted time channel will overcome the cut-off bias on the suppressor grids of tubes 805 just as the calling code for the same attempted call is applied to their control grids. Different calling codes will be allowed to pass through the tubes and at the same time the busy signal modulation will be impressed upon the pulse elements of this call. The outgoing calling codes which are thus gated through the busy connector and modulated with busy tone pass out of busy connector 139 over a group of outputs 810 which is connected to the set of main buses 132 for carrying called codes. Each of the output conductors 810 of the busy connector includes an in-series delay line 811 which delays each pulse passing through it by an interval slightly greater than the duration of one pulse. The purpose for using these delay lines is the same as that for using the similar delay lines in connector 138.

Like the calling codes which leave connector 138, the busy-signal-modulated calling codes which leave busy connector 139 are routed through the second network, driver 137, and many or all of the first networks, and eventually find their way to the calling line circuits in which they respectively originated, thus informing the station associated with each of them of the busy condition of the line it is seeking to call.

For each attempted call to a busy station the output of tube 807 will also include a pulse series in the second portion of the time channel allotted to the attempted call. While this pulse series also will be effective to overcome the fixed bias of the tubes 805, it will do so in a portion of the allotted time channel in which no calling code will be reaching the control grids of these tubes. Hence the presence of this second pulse series in the busy connector will have no effect on its operation.

PATH OF CALLED CODES

To make a call the calling station indicates the called station by sequentially dialing groups of impulses representing the digits of its number. The impulses pass over the line of the calling station to its line circuit where they are impressed upon its assigned pulse series. On this pulse series the impulses are carried over the first common network which serves the calling line circuit to a sender which becomes engaged for the call. The register of that sender stores in a group of condensers potentials corresponding to the sequentially received representations of the digits of the called number and, at the end of dialing, it transmits simultaneously a group of transient voltages corresponding to the potentials, transmitting them in the time channel of the calling party but not reiterated therein. The translator of that sender receives the group of transients representing the called number and translates it into a larger group of transients which is synchronous with the first group, i.e. still in the calling party's time channel though not reiterated therein, and which represents, in an initial form, the code of the called station. The translator applies the second group of transients, the code-representing transients, to a selector, which has become engaged for the call, for setting a group of gas tubes, which will control continued reiteration of the called code throughout the call. A pulse seizing circuit of the engaged selector seizes an idle pulse series thus allotting to the call a free time channel on the second common network. The selector utilizes this pulse series to gate out a reiterated set of pulses which will constitute the called code in accordance with the setting of the group of gas tubes. The selector feeds the called code to a set of buses of the second network in the allotted time channel, in particular to the set of buses for outgoing called codes. In the second network, the called code passes over a link circuit to a set of main buses 135 for incoming called codes. Over the set of buses 135 the called code is delivered to decoder driver 137 which translates them into a form in which each reiterated code includes a full set of 14 pulses distributed on 28 output conductors of the driver. The called code in this translated form is applied to many or all of the first common networks in the exchange from each of which it is applied to the decoders of all of the line circuits served by it. Only the decoder of the called line circuit accepts the called code (in this translated form) and converts it into a single pulse series in the same time channel, i.e. the time channel allotted to the call. This single pulse series is routed out of the called line circuit to the amplification channel of connector 138 which returns it amplified to the same line circuit, the two way trip being made over buses of the first common network serving the called line circuit. In the called line circuit any speech modulations carried by the returned amplified pulse series are detected and carried over the subscriber's line to the called station.

PATH OF CALLING CODES

When a station initiates a call its line circuit immediately delivers its assigned code to a set of buses 119 of its first common network. The calling code passes through a group of amplifiers 134 for amplifying its one or more synchronous pulse series and thereafter it is applied to a second group of gas tubes in the selector which has become engaged for the call. In its transmission from the calling line circuit to the selector the calling code is in the time channel assigned to the calling station. In the selector this code fires appropriate ones of the second group of gas tubes to set them for controlling reiterations of the calling code throughout the call in a time channel allotted to it. In the engaged selector the seized pulse series which it utilizes for gating the called code is also utilized for similarly gating out of the selected reiterations of the calling code in the allotted time channel. In the case of the calling code it is already in a reiterated form when the selector receives it but the selector acts to transfer it from the calling party's time channel to the time channel allotted to the call for use on the second network. The calling code passes from the selector to a set of main buses 133 of the second common network, the set for outgoing calling codes. It passes over a link to a set of buses 136 for incoming calling codes (still in the second network). From the set of buses 136 the calling code is delivered to connector 138 and busy connector 139. It is routed through circuits of both of these connectors and returned to the second network where it is fed to the set of main buses 132 which has been described as a set of buses for carrying outgoing called codes. The calling code when it reaches the set of buses 132 does not interfere with the called code for the same call because the calling code is slightly delayed in both connectors and by the time it reaches the set of buses 132 it occupies a second portion of the time channel allotted for the call, whereas the called code always occupies the first portion. Therefore during its transmission from the selector to connectors 138 and 139 the calling code moves on sets of buses which carry only calling codes and it moves on them on the first portion of the channel allotted to the call. After leaving the connectors the calling code moves back into the second network to a set of buses which carry both called and calling codes but by now it is in the second portion of the allotted time channel. After the calling code reaches the set of buses 132 it travels to all of the line circuits over a similar transmission path to that of the called code; over a link to the set of buses 135 described as a set of buses for incoming called codes, over decoder driver 137 to many or all of the first common networks of the exchange, to the decoders of all of the line circuits served by those first networks, and therefore in particular to the decoder of the calling line circuit. The last-mentioned decoder accepts the calling code and translates it into a single pulse series still in the second portion of the allotted time channel. From the calling line circuit this single pulse series travels out to and back from the amplifying channel of connector 138, and within the calling line circuit it reaches a detector where any speech modulations which it carries will be detected and transferred to the calling station over its line.

CALLING-TO-CALLED TALKING CIRCUIT

The calling party's speech reaches his line circuit as a simple audio signal. In his line circuit it is impressed upon his assigned pulse series and is carried thereon in its time channel to the selector which becomes engaged for the call. In the selector the calling-to-called modulations are removed from the calling party's pulse series and the simple audio signal which is thus obtained is then impressed upon the reiterated called code which leaves the selector in the time channel allotted to the call. The calling-to-called speech is carried on the called code over the second network to decoder driver 137. The translated called code which leaves driver 137, has, in addition to its 28 code carrying output conductors, a conductor for carrying a single pulse series which is also in the allotted time channel and which still carries the calling-to-called modulations. This single pulse series is delivered to many or all of the first common networks in the exchange and it reaches the called line circuit over the one of them which serves it. In the called line circuit this single pulse series and the calling-to-called speech signals still carried on it is added to the single pulse series which is produced by its decoder in response to the called code. The resulting amplitude modulated single pulse series is sent from the called line circuit over a pair of buses of its first common network out to and back from the amplifying channel of connector 138. Upon its return from connector 138 the amplified pulse series is accepted back by the called line circuit (because it is still in the allotted time channel) and it is transferred to a detector which extracts the calling-to-called voice signals and sends them to the calling subscriber over his line. The calling-to-called speech signals are carried in two time channels during their transmission from the calling line circuit to the called line circuit; from the calling line circuit to the selector they are carried on a single pulse series in the time channel of the calling party, for the rest of their transmission (from the selector over the second network and through the driver to the called line circuit, out of it to the connector, and back from the connector to the called line circuit) they travel in the time channel allotted to the call and in particular in the first portion of that channel.

CALLED-TO-CALLING TALKING CIRCUIT

The speech signals of the called party reach his line circuit as simple audio signals. In the called line circuit they are impressed upon the single pulse series which its decoder produces from received reiterations of the called code. If the called party speaks only when the calling party is silent this pulse series will be free of calling-to-called modulations each time that the called line circuit acts to modulate it with the called-to-calling signals. The called party's speech is carried on this pulse series out to and back from the connector 138 over a pair of buses 115 of the first network serving the called line circuit. In connector 138 these modulations will be applied by the single pulse series directly to reiterations of the calling code which are passing through a set of modulator tubes therein. This direct application of the modulations is possible since the calling code while it is passing through the modulator tubes is still in the first portion of the allotted time channel, i.e. is synchronous with this single pulse series. Before the reiterations of the calling code leave the connector carrying the called-to-calling modulations they are delayed to the second portion of the allotted time channel. The called-to-calling speech signals are carried from connector 138 over the second common network to decoder driver 137 in the second portion of the allotted time channel. Driver 137 translates the calling code into a form in which each reiterated set of coded pulses includes 14 pulses. These sets of pulses do not carry the called-to-calling modulations but the selector also translates the calling code into a single pulse series which still carries these modulations and is still in the second portion of the allotted time channel. This single pulse series is delivered by driver 137 to many or all of the first common networks of the exchange and over that one of them which serves the calling line circuit it is delivered to the calling line circuit. In the calling line circuit this pulse is added to an unmodulated single pulse series produced by the decoder of the calling line circuit in response to its receiving the translated calling code sent from the driver. The additive pulse series is modulated with the called-to-calling speech and still occupies the second portion of the allotted time channel. This pulse series is routed from the calling line circuit over the pair of buses 115 of its first common network out to and back from the amplifying channel of connector 138. On its return from connector 138 this amplified, amplitude-modulated, single-pulse, series is accepted by the calling line circuit (because it is still in the second portion of the allotted time channel) and it is transferred to a detector which removes the speech signal component. From the detector of the calling line circuit the speech signals of the called party are transferred to the calling station over its line.

I claim:

1. In a communication system, a number of lines terminating in a central exchange, in the exchange and common to the lines a set of conductors affording a common transmission medium for line-designating codes, means for producing a different code designation for each line in the form of the simultaneous presence of a number of voltages occurring individually on particular ones of said conductors which together comprise a distinctive combination thereof, means for receiving from a calling line signals which designate a called line and for producing therefrom the code designation of the called line on the set of conductors, individual means associated with each line for accepting only its own code designation to link the set of conductors with its line, and means for feeding the individual means in multiple from the set of conductors.

2. In a communication system, the combination, as in claim 1, further comprising means for providing a plurality of time channels for transmitting a number of simultaneous code designations over the set of conductors, the last mentioned means including a source of a number of pulse series each defining a different time channel and serving as a carrier for transmitting a code designation therein, means for allotting a pulse series to a call for its duration, the means for producing the code designation including means for utilizing the pulse series which is allotted to the call to produce reiterations of the voltages comprising a code designation in the time channel defined by it and onto the set of conductors for the duration of the call.

3. In a communication system, the combination, as in claim 1, further comprising means for providing a plurality of time channels for transmitting a number of simultaneous code designations over the set of conductors, the last mentioned means including a source of a number of pulse series each defining a different time channel and serving as a carrier for transmitting a code designation therein, means for allotting a pulse series to a call for its duration, said means for receiving and producing including means for utilizing the pulse series allotted to a call to produce the code designation of the called line on the set of conductors and in the time channel defined by the pulse series as reiterations of the voltages which comprise said designation, the pulse series having a repetition rate at least as high as the higher frequencies in the audio band, means for receiving calling-to-called speech signals from a calling line and impressing them as modulations on the reiterated code designation of the called line, and in which said individual means is arranged to accept the code designation of its associated line by producing from it a single pulse series in the same time channel and to link the set of conductors with its line by transferring the speech signals received on its input as modulations of the reiterated code designation to its output as modulations of the single pulse series.

4. In a communication system, the combination, as in claim 1, further comprising means for providing time channels for use on the common network, the last mentioned means including a source of a number of pulse series each designating a time channel and serving as a carrier for transmission therein and means for allotting a pulse series to a call for its duration, in which the signals for designating a called line comprise groups of dialing impulses which represent the digits of a number assigned to it and are sequentially received at the exchange over the calling line, and the means for producing the code designation comprises a means for accumulating in a plurality of condensers a plurality of voltages each representing one of the groups of dialing impulses, means for translating the plurality of voltages into an initial representation of said code designation in the form of one or more simultaneously-occurring transient voltages on a distinctive combination of one or more conductors of a set thereof corresponding to said set of conductors of the network, and a circuit which receives and is set by the initial code designation and in accordance with the setting utilizes the allotted pulse series for producing onto the set of conductors of the network reiterations of said code designation in the time channel defined by said pulse series and for the duration of the call.

5. In a communication system, a plurality of lines, individual line circuits in which the lines terminate in a central exchange, a common network in the exchange serving the lines and including two sets of n conductors for carrying code designations, means for providing time channels for use on the common network, the last mentioned means including a source of a number of pulse series each designating a time channel and serving as a carrier for transmissions therein and means for allotting a pulse series to a call for its duration, a different code designation for each line in the form of the presence of from one to n synchronous pulse series on a distinctive combination of from one to n conductors of a set of n, means responsive to the initiation of a call by one of the lines to utilize the pulse series allotted to the call for producing its own code designation in a first portion of the time channel defined by the pulse series and on a first one of the two sets of conductors, means for selectively establishing a transmission path from the calling line to the called line over the second set of conductors in said first portion of said time channel, means for receiving speech signals from the called line and impressing them as modulations upon at least one of the pulse series comprising the code designation of the calling line, means for delaying the code designations of the calling line after it has received said modulations and for transferring it to the second set of conductors in a second portion of said time channel, means for applying code designations from the second set of conductors in multiple to all of the individual line circuits, and means in each line circuit for selectively accepting from the second set of conductors only the code designation of its associated line.

6. In a communication system, a number of groups of lines, a central exchange in which said lines terminate in individual line circuits, a first common network serving each group of lines, means associated with each group for assigning to each line thereof a different time channel for transmissions over the first network serving the group, each of said last-mentioned means including a source of a number of pulse series assigned individually to the line circuits of the group, each of the pulse series defining a different time channel and serving as a carrier for transmissions therein, a second common network serving a number of groups of lines and including a set of n conductors affording an outgoing circuit for line-designating codes, means for providing a plurality of time channels for transmitting a number of simultaneous calls over the second network, the latter means including a generator of a number of pulse series each defining a different time channel on the second network and serving as a carrier for transmissions thereon, means for allotting different pulse series to different calls for the durations thereof, means in each line circuit effective when a call is initiated over its associated line for transferring the pulse series assigned to the line circuit over the first network serving it to a link between said first network and the second common network, other means in each line circuit for modulating the pulse series with signals which are received over the calling line and designate the called line and with calling-to-called speech signals, the link comprising means responsive to the signals designating a called line to translate them into a code designation for it and to feed the code designation to the second common network and means for transferring the speech signals to the code designation, the code designation for each line having the form of the simultaneous transmission of from one to n synchronous pulse series individually over different conductors of said set which together comprise a distinctive combination thereof, means including a set of n×2 output conductors for receiving a code designation from the set of n conductors and translating it into the form of the simultaneous transmission of n synchronous pulse series over a particular n of said n×2 output conductors which together comprise a distinctive combination thereof according to the code designation, means in each line circuit for accepting only the code designations of the line terminating in it to produce therefrom a single pulse series carrying any modulations which were carried thereon, each of the means for accepting including a set of n inputs, means for individually linking to the n inputs of each of said last mentioned means a particular n of said set of n×2 output conductors which together comprise a distinctive combination thereof in accordance with the code designation of the line terminating in the line circuit including this means, the means for linking comprising the multiple connection of the set of n×2 output conductors to sets of n×2 conductors in all of the first networks.

7. In a communication system, the combination, as in claim 6, in which said link comprises a chain circuit of line finders for each first network for receiving from it at any time all of the pulse series available thereon from different calling line circuits which it serves, and for transferring each one to a different idle one of a group of common equipments for said network to engage it during the call and to actuate a circuit thereof to select an idle one of the pulse series which define time channels on the second network, means for receiving the signals which designate the called line and for translating them into an initial form of its code designation on a group of output terminals in which form a simultaneous group of from 1 to n transient voltages occur individually on from 1 to n different ones of the output terminals which together comprise a distinctive combination thereof in accordance with the code designation of the called line, the transients occurring once in the time channel assigned to the calling line for transmissions over its first network, means for producing called codes in their form for transmission over said outgoing circuit of the second network including a group of n gas tubes for receiving a group of transients from said terminals to ignite particular ones thereof and thereby set the group of gas tubes in accordance with the initial code designation, and means for feeding the selected pulse series to the means for producing codes for gating the code designation of the called line from it to said outgoing circuit, and in the time channel allotted to the call by the selection of said pulse series, in accordance with the setting of the group of gas tubes by the transients.

8. In a communication system a number of groups of lines, a central exchange in which said lines terminate in individual line circuits, a first common network serving each group of lines, means associated with each group for assigning to each line thereof a different time channel for transmissions over the first network serving the group, each of said last mentioned means including a source of a number of pulse series assigned individually to the line circuits of the group, each of the pulse series defining a different time channel and serving as a carrier for transmissions therein, a second common network serving a number of groups of lines and including a first set of n conductors affording an outgoing circuit for calling-line code designations and a second set of n conductors for carrying both called-line and calling-line code designations, means for providing a plurality of time channels each comprising a first and a second portion for providing calling-to-called and called-to-calling transmission channels for a number of simultaneous calls over the second network, the latter means including a generator of a number of pulse series each defining the first portion of a different time channel on the second network and serving as a carrier for transmissions therein, means for allotting different pulse series to different calls for the durations thereof, means in each line circuit effective when a call is initiated over its associated line for transferring the pulse series assigned to the line circuit over the first network serving it to a link between said first network and the second network, other means in each line circuit for modulating the pulse series with signals which are received over the calling line and designate the called line and with calling-to-called speech signals, the link comprising means responsive to the signals designating a called line to translate them into a code designation for it and to feed the code designation to said second set of conductors in the first portion of the time channel allotted to the call and means for transferring the speech signals to the code designation, the code designation for each line whether it is calling or called, having the form of the simultaneous transmission of from one to n synchronous pulse series individually over different ones of a set of n conductors which together comprise a distinctive combination thereof, means including a set of n×2 output conductors for receiving a code designation from said second set of conductors and translating it into the form of the simultaneous transmission of n synchronous pulse series over a particular n of said n×2 output conductors which comprise a distinctive combination thereof according to the code designation and occupy the same portion of the same time channel which it occupied at the input of this means, means in each line circuit for accepting only the code designation of the line terminating in it to produce therefrom a single pulse series occupying the same portion of the same time channel and carrying any modulations which were carried thereon, each of the means for accepting including a set of n inputs, means for individually linking to the n inputs of each of said last mentioned means a particular n of said set of n×2 output conductors which together comprise a distinctive combination thereof in accordance with the code designation of the line terminating in the particular line circuit including this means, the means for linking comprising the multiple connection of the set of n×2 output conductors to sets of n×2 conductors in all of the first networks, in each line circuit a means which becomes operable when the line circuit is called to modulate the single pulse series produced in the line circuit by the acceptance of its code designation, with called-to-calling speech signals received from its associated link, said link including means responsive to the initiation of a call by one of the lines to utilize the pulse series allotted to the call for producing the code designation of that line in the first portion of the time channel which is defined by it and onto said first set of conductors, means for receiving in the first portion of the time channel allotted to a call both the modulated single pulse series from the called line circuit and the code designation of the calling line and for impressing the modulations which are carried on the pulse series onto said code designation, and means for delaying a thus modulated calling code designation to place it in the second portion of the time channel allotted to the call and for thereafter feeding it to said second set of conductors.

9. In a communication system, a number of groups of lines, a different first common network serving each group, means for assigning an individual time channel to carry transmisisons therein, a second common network the means including a source of a plurality of pulse series each of which defines a different time channel and serves to carry transmisisons therein, a second common network serving a number of groups of lines, means for providing a number of time channels for use on the second network the means including a source of a number of other pulse series each of which defines a different time channel for the second network and serves for carrying transmissions therein, means for allotting an idle one of said other pulse series to a call for use on the second network for the duration of a call, means for transmitting signals from a calling line as modulations of its pulse series over its line circuit and its first network in its assigned time channel, a link for receiving the signals and transferring them from the time channel of the calling line to the time channel allotted to the call and for feeding the signals to a carrier on the second network in the allotted time channel, the link including means controlled both by signals received from the calling line and by the allotted pulse series to produce a pulsed carrier comprising reiterations of a code designation for the called line, means for feeding the signals from the second common network in multiple to a number of first networks and for applying them thereover to the line circuits of a number of groups of lines, and means in each line circuit for accepting a pulsed carrier comprising the code designation for its line to admit into the line circuit signals carried thereon.

10. In a communication system, a number of lines terminating in a central exchange in the exchange and common to the lines, a set of n media affording parallel transmission paths for elements of line designating codes, means for producing a different code designation for each line on said media in the form of the simultaneous transmission of from 1 to n predetermined voltages individually over different ones of said media which together comprise a distinctive combination thereof, means for receiving from a calling line signals which designate a called line and for responding thereto to produce on the set of media the code designation of the called line, means including a set of $n \times 2$ output media for receiving a code designation of a called line from the set of n media and translating it into the form of the simultaneous transmission of n predetermined voltages over a particular n of said $n \times 2$ output media which together comprise a distinctive combination thereof according to the code, individual means associaed with each line for accepting only its own code designation in said translated form and from said set of output media to link that set of media to the line, and means for feeding the individual means in multiple from the set of output media.

11. In a communication system, the combination, as in claim 10, in which the set of n media comprises n conductors and in which the voltages comprising a code designation are synchronous pulse series, having a repetition rate which is at least as high as the higher frequencies in the audio frequency band.

12. In a communication system, the combination, as in claim 10, in which the set of n media comprises one or more conductors affording transmission paths for n carrier frequency voltages and in which said voltages comprising a code designation are synchronous pulse series carried on the carrier frequency voltages and having a repetition rate which is at least as high as the higher frequencies in the audio frequency band.

13. In a communication system, a number of lines terminating in a central exchange, in the exchange and common to the lines a set of $n \times 2$ media affording transmission paths for line-designating codes, means for producing a different code designation for each line on said media in the form of the simultaneous transmission of n predetermined voltages over a particular n of said media which together comprise a distinctive combination thereof, means for receiving from a calling line signals which designate a called line and for responding thereto to produce on the set of media the code designation of the called line, means for impressing calling-to-called speech signals as modulations on the voltages comprising a code designation, individual means associated with each line for accepting only its own code designation to receive the speech signals carried thereon, and means for feeding code designations in multiple to the individual means from the set of media.

14. In a communication system, the combination, as in claim 13, in which the individual means associated with each line comprises a source of voltage, a connection between the source and a circuit point of the means over a dropping resistor, and n parallel conductive paths each arranged to draw enough current from the source over the resistor to reduce the voltage applied to said point to a value much smaller than that of the voltage at the source, and in which the means for feeding comprises means for linking the n paths in each individual means to the distinctive combination of n media over which a code designation of its associated line must be transmitted, the n voltages comprising any code designation which is being transmitted over the set of $n \times 2$ media being applied over the link to said n paths of the particular individual means which is associated with the line designated by it simultaneously to reduce the currents through all of them to produce an output voltage in the form of a substantial increase in the value of the voltage at said point, and further comprising means for transferring speech signal modulations from the voltages comprising the code designation to the output voltage.

15. In a communication system, the combination, as in claim 13, in which the individual means associated with each line comprises a source of voltage, a connection between the source and a circuit point of the means over a dropping resistor, and n parallel conductive paths each arranged to draw enough current from the source over the resistor to reduce the voltage applied to said point to a value much smaller than that of the voltage at the source, and in which the means for feeding comprises means for linking the n paths in each individual means to the distinctive combination of n media over which a code designation of its associated line must be transmitted, the n voltages comprising any code designation which is being transmitted over the set of $n \times 2$ media being applied over the link of said n paths of the particular individual means which is associated with the line designated by it simultaneously to reduce the currents through all of them to produce an output voltage in the form of a substantial increase in the value of the voltage at said point, and further comprising means for transferring speech signal modulations from the voltages comprising the code designation to the output voltage, each of the n conductive paths including a rectifier connected in series therewith so that its side facing said source of voltage is the one which offers low impedance to voltages of the same polarity as that voltage.

16. In a communication system, a number of lines terminating in a central exchange, in the exchange and common to the lines a set of $n \times r$ media affording transmission paths for line-designating codes, means for producing a different code designation for each line on said media in the form of the simultaneous transmission of n predetermined voltages over a particular n of said media which together comprise a distinctive combination thereof, means for receiving from a calling line signals which designate a called line and for responding thereto to produce on the set of media the code designation of the called line, means for impressing calling-to-called speech signals as modulations on the voltages comprising a code designation, individual means associated with each line for accepting only its own code designation to receive the speech signals carried thereon, and means for feeding code designations in multiple to the individual means from the set of media.

17. In a communication system, a number of lines terminating in a central exchange, in the exchange and common to the lines a set of $n \times r$ conductors affording transmission paths for line-designating codes, means for producing a different code designation for each line on said conductors in the form of the simultaneous transmission of n synchronous pulse series over a particular n of said conductors which together comprise a distinctive combination thereof, the pulse series having a repetition rate which is at least as high as the higher frequencies in the audio frequency band, means for receiving from a called line signals which designate a called line and for responding thereto to produce on the set of conductors a code designation of the called line, means for impressing calling-to-called speech signals as modulations on the pulse series comprising a code designation, individual means associated with each line for accepting only its own code designation to produce from it a single pulse series carrying speech signals which were carried to the individual means on the code designation, means for feeding code designations in multiple to the individual means from the set of conductors, and in each individual means a filter for separating the speech signals from the pulse series produced from the code designation to produce audio voltages and a circuit for feeding the audio voltages from the filter to the line associated with the individual means.

18. In a communication system, a number of lines terminating in a central exchange, in the exchange and common to the lines a set of n media affording a common transmission path for line-designating codes, means for producing a different code designation for each line on said media in the form of the simultaneous transmission of n synchronous pulse series individually over different ones of said media each of the pulse series having one of r different values which may include values of opposite polarity and the group of pulse series together comprising a distinctive combination thereof, each of the pulse series having a repetition rate which is at least as high as the higher frequencies in the audio frequency band, means for receiving from a calling line signals which designate a called line and for responding thereto to produce on the set of media and in a time channel allotted to the call the code designation of the called line, means including a set of $n \times r$ output media for receiving a code designation of a called line from the set of n media and translating it into the form of the simultaneous transmission of n synchronous pulse series, all having amplitudes greater than zero and within the same range, over a particular n of said $n \times r$ output media which together comprise a distinctive combination thereof according to the code, individual means associated with each line for accepting only its own code designation in said translated form and from said set of output media selectively to link the line to the common transmission path over the individual means and the means for receiving and translating, and means for feeding the individual means in multiple from the set of output media.

19. In a switching system, a plurality of lines terminating in an exchange, in the exchange a plurality of first common networks with which groups of said lines are respectively associated, at least one second network associated with a plurality of groups of lines, means for assigning to each line in each group a different time channel during which it may initiate calls over its associated first network, means effective at the start of a call for selecting an available time channel during which transmissions from the calling line may be extended over a second network, and means for establishing a connection from a calling line to a called line over the first network associated with the calling line in the time channel of the calling line, over a second network in a selected time channel, and over the first network associated with the called line in said selected time channel.

20. The system according to claim 19, and in which separate means are provided for each first common network for establishing the time channels assigned to its associated lines.

21. The system according to claim 20, and in which the separate means are generators of cyclically recurring pulses.

22. The method of switching lines via a plurality of networks common thereto, comprising the steps of establishing for each line a time channel during which it may initiate a call over one network, establishing for each initiated call a time channel during which transmissions from the calling line may be extended over a second common network, and connecting a calling line to a called line via the first network during said first mentioned time channel and then via said second network during said second mentioned time channel.

23. In a switching system, a plurality of lines, an exchange comprising a plurality of first common networks with each of which a group of said lines is associated, means for establishing different time channels for the individual lines of each group during which they may employ the associated first common network, a second common network, means for establishing different time channels during which different calls may be transmitted over the second network, and means for connecting any calling line to any called line via the first common network associated with the calling line in a time channel assigned to it therein in series with said second common network during a time channel allotted to the call therein.

24. In a switching system, the combination, according to claim 23, further comprising means operative upon the initiation of a call on a line for connecting it with its associated first common network during a predetermined time channel assigned to the line.

25. In a switching system, the combination, according to claim 23, further comprising means operative upon the initiation of a call for connecting a line with the second common network via the first common network associated with the line during a time channel therein assigned to the line.

26. In a switching system, the combination, according to claim 23, in which the means for connecting comprises means for transferring calling-to-called signals from the first common network associated with the calling line and from the time channel assigned to the calling line to the second common network and to the time channel allotted to the call, and means for transmitting the signals from the second network to the called line in said allotted channel via the first network associated with the called line.

27. In a switching system, the combination, according to claim 23, further comprising means for generating in the first common networks cyclically recurring pulses to produce the time channels therein, and means for generating cyclically recurring pulses in the second common network for producing the time channel therein.

28. In a communication system, a plurality of lines, each having a characteristic designation, an exchange at which said lines terminate, a first and a second common network at the exchange, means individual for each line for effectively associating the line with an incoming circuit of the first network, said means being operable only when signals characteristic of the particular line are applied to the first network from the second network, means for establishing time channels on said networks during which lines may use them, means for establishing an outgoing and an incoming link between said networks, means operable upon the initiation of a call on a line for establishing in the first network a time channel predetermined for said line, means for connecting the first network to said outgoing line during said predetermined time channel, means associated with each line and operable when it initiates a call for applying to the first network during said predetermined channel signals characterizing itself, the outgoing link including a register means and means responsive during the predetermined time channel to set the register means in accordance with the signals characterizing the calling line, means in said outgoing link for selecting one idle time channel and establishing it on the second network, connections from said register means to the second network, means controlled by the register means for applying to the second network via the last-mentioned connections and during the time channel selected on the second network signals characterizing the calling line in accordance with the setting of the register means, and means for applying the last-mentioned signals to the incoming circuit of the first network from the second network via the incoming link during the time channel selected for the second network.

29. In a communication system, the combination, according to claim 28, in which the second network includes two circuits and connections from the register means to the second network are to a first of two circuits thereof and the incoming link is between the second of the two circuits and the incoming circuit of the first network, and further comprising means for transferring said last-mentioned signals from said first to said second circuit, and means in said last-mentioned means for delaying the signals during the transfer from a first to a second portion of said selected time channel.

30. In a communication system, a plurality of lines, each having a characteristic designation, an exchange at which said lines terminate and comprising a first network having a plurality of circuits and a second network, means individual for each line for effectively associating the line with an incoming circuit of the first network, said means being operable only when signals characteristic of the particular line are applied to said incoming circuit from the second network, means for establishing time channels on said networks during which lines may use them, means for establishing an outgoing and an incoming link between said networks, means operable upon the initiation of a call on a line for establishing a time channel predetermined for said line on an outgoing circuit of the first network, means for establishing a connection from said outgoing circuit of the first network to said outgoing link during said predetermined time channel, means associated with each line and operable when it initiates a call for applying to the outgoing circuit during the seized predetermined channel signals characterizing itself, said outgoing link including a register means and means responsive during the predetermined time channel to set the register means in accordance with the signals characterizing the calling line, means in the outgoing link for selecting one idle time channel and establishing it on the second network, connections from said register means to the second network, means controlled by the register means for applying to the second network via the last-mentioned connections and during the time channel selected on the second network signals characterizing the calling line in accordance with the setting of the register means, and means for applying the last-mentioned signals to the incoming circuit of said first network from the second network via the incoming link during the time channel established on the second network.

31. In a communication system, the combination, according to claim 30, in which the second network includes a first and a second circuit, said connections from the register means to the second network being in particular to said first circuit and said incoming link from the second to the first network being in particular from a predetermined one of the two circuits, means individual to each line and operable when it makes a call for producing in said predetermined time channel and in the outgoing circuit of the first network signals characterizing the called line, said link including a second register means and means responsive during the predetermined time channel to set the second register means in accordance with the signals characterizing the called line, second connections from the outgoing link to the second network and in particular from said second register means to said second circuit, means controlled by the second register means for applying to the second circuit via the second connections and during the time channel selected as the second network signals characterizing the called line in accordance with the setting of the second register means, means for transferring signals to said predetermined one of the two circuits of the second network from the other, and means in said last-mentioned means for delaying the signals, during the transfer, from a first to a second portion of the time channel established on the second network.

32. In a communication system, a plurality of lines, each having a characteristic designation, an exchange at which said lines terminate and comprising a first network having a plurality of circuits and a second network, means individual for each line for effectively associating the line with an incoming circuit of the first network, said means being operable only when signals characteristic of the particular line are applied to said incoming circuit from the second network, means for producing a plurality of pulse series to establish time channels on said networks during which lines may use them, means for establishing an outgoing and an incoming link between said networks, means operable upon the initiation of a call on a line for seizing a series of pulses predetermined for said line to establish its time channel on an outgoing circuit of the first network, means for establishing a connection from said outgoing circuit of the first network to said link during the established time channel, means associated with each line and operable when it initiates a call for applying to the outgoing circuit during the established channel signals characterizing itself in the form of the transmission of the seized pulse series on a distinctive combination of from one to n different ones of a set of n conductors comprising the outgoing circuit, said outgoing link including a register means and means responsive during the established time channel to set the register means in accordance with the signals characterizing the calling line, means in the outgoing link for seizing an idle pulse series to establish for the call a time channel on the second network, connections from said register means to the second network, means controlled by the register means for applying to the second network via the last-mentioned connections and during the time channel established on the second network signals in the form of the transmission of the latter pulse series over from one to n of n conductors comprising said connections in a unique combination according to the setting of the register means and characterizing the calling line, and means for applying the last mentioned signals to the incoming circuit of said first network from the second network via the incoming link during the time channel established for the call.

33. In a communication system, a plurality of lines, each having a characteristic designation, a central exchange in which said lines terminate and comprising a first and a second network, means individual for each line for effectively associating the line with an incoming circuit of the first network, said means being operable only when signals characteristic of the particular line are applied to the first network from the second network, means for establishing time channels in said networks during which the lines may use them, means operable upon the initiation of a call for establishing in the first network a time channel predetermined for the calling line, means associated with each line for producing signals characterizing a called line, means for establishing an outgoing link and an incoming link between the networks, means operable upon the initiation of a call for connecting the outgoing line with the first network during the predetermined time channel established for the calling line, said outgoing link including register means and means responsive during the established time channel to set the register means in accordance with the signals characterizing the called line, means in the link for selecting an idle channel and establishing it in the second network, connections from said register means to the second network, means for applying to the second network via the last-mentioned connections signals in accordance with the setting of the register means during the selected time channel, and means for transferring the last-mentioned signals from the second to the first network via said incoming link during the time channel selected for the second network.

34. In a communication system, the combination, according to claim 33, in which said first mentioned signals are in the form of sequentially-occuring groups of impulses representing digits of a number assigned to the called line and corresponding to its characteristic designation and said link includes means for accumulating in a plurality of condensers a plurality of voltages each representing one of the groups of impulses, and further comprising means for translating the plurality of voltages into an initial representation of said characteristic designation in the form of from one to n simultaneously-occurring transient voltages on a distinctive combination of from one to n conductors of a set of n thereof, and means for applying the transient voltages to set the register means.

35. In a communication system, the combination, according to claim 33 in which the characteristic signals designating any given line are in the form of the simultaneous occurrence of n voltages on a distinctive combination of n conductors of a set of $n \times 2$ thereof at the point where these signals are received by the individual means of that line, the signals designating the same line have, at the point where they are produced by the register means, the different form of the simultaneous occurrence of from 1 to n voltages individually over a distinctive combination of a set of n outputs for the register means, and said incoming link comprises means for receiving from the second network characteristic signals in the form in which they are produced by the register means and for translating them before their transfer to the first network into the form in which they are to be received at the individual means.

36. In a communication system, a plurality of lines each having a characteristic designation, a central exchange in which said lines terminate and comprising a first and a second network, means individual for each line for effectively associating the line with an incoming circuit of the first network, said means being operable only when signals characteristic of the particular line are applied to said first network from the second network, means for establishing time channels in said networks during which the lines may use them, means operable upon the initiation of a call for establishing in the first network a time channel predetermined for the calling line, means associated with each line operable when it is calling for producing in said time channel and in the first network signals characterizing itself and the called line, means for establishing an outgoing link and an incoming link between the networks, means for connecting the outgoing link with the first network during said established channel, said outgoing link including two register means and means responsive during the established channel to set the two register means in accordance with the signals characterizing the calling and the called line, respectively, means in said line for selecting an idle channel and establishing it in the second network, connections from said register means to the second network, means for applying to the second network via the last mentioned connections signals in accordance with the settings of the two register means during the time channel selected in the second network, and means for transferring the last mentioned signals from the second to the first network via the incoming link during the time channel selected for the second network.

37. In a communication system, the combination, according to claim 36, in which the second network includes two circuits and in which, connections from the two registers means to the second network are respectively to first and second circuits thereof and said incoming link is between the first circuit and said incoming circuit of the first network, and further comprising means for delaying signals transferred from one of the register means to the second circuit with respect to those transferred from the other register means to the first circuit and for thereafter transferring them to the first circuit.

38. In a communication system, the combination, according to claim 36 in which the means for establishing time channels on the first network comprises a source of a number of pulse series assigned individually to different lines, each of the pulse series defining a different time channel and serving as a carrier for transmissions therein, the individual means for each line comprises a means effective when a call is initiated over its associated line for transferring its assigned pulse series from the source to the first network to make it available for carrying transmissions to said outgoing link, said outgoing link comprises a number of pairs of said register means for serving at any one time an equal number of calling lines, and said means for connecting the outgoing link with the first network comprises apparatus for receiving on a single input connected to the first network a plurality of pulse series in different time channels and from different calling lines and for routing the individual pulse series to different utilization outputs feeding the different pairs of register means in the outgoing link to thereby allot a different pair to each calling line.

39. In a telecommunication system, a central exchange, differently designated lines leading to the exchange, a common network at the exchange, means responsive to the initiation of a call for applying a carrier to the common network coded characteristically for the designation of the calling station, sender means controlled by the calling line for applying to the common network a carrier coded characteristically for the designation of the called line, means for modulating with calling-to-called signals the carrier coded to designate the called line, means for modulating with called-to-calling signals the carrier coded to designate the calling line, individual means for each line for receiving carriers from the network and for accepting the one which is coded to designate its line to transfer to its line any modulations carried thereon.

40. In a telecommunication system, a plurality of stations, each having a different designation, a central exchange, lines connecting the stations with the exchange, a common network at the exchange, means for establishing pulse carriers in predetermined time channels on the network for transmitting signals between calling and called lines, means responsive to the initiation of a call for coding the pulse carrier in a channel allotted to the call to designate the calling station, means for coding the pulse carrier in said channel to designate the called station, individual means for each line to connect it with the common network, and means included respectively in the individual means of the calling and called lines for accepting respectively the carriers coded to designate their associated lines to establish between them a two-way carrier transmission path over the common network in the alotted time channel.

41. In a telecommunication system, a plurality of differently designated stations, a central exchange at which the lines terminate, a common network at the exchange, means responsive to the initiation of a call for applying a carrier to the common network coded characteristically for the calling line, variably operable means controlled by the calling line for applying to the common network a carrier coded characteristically for the called line, means for modulating each coded carrier in accordance with intelligence signals, individual means for each line actuated by the carrier coded to designate the line to receive the intelligence signals.

42. In a switching system, a plurality of differently designated lines, a central exchange at which said lines terminate, a common network at the exchange, means for generating over said network a plurality of series of cyclically recurring pulses, each pulse series defining a different time channel and serving as a carrier therein, means responsive to the initiation of a call for alotting one of said time channels to the calling line, means for producing on sets of n conductors of said network and during the allotted time channel two sets of from one to n synchronous pulse series comprising distinctive combinations thereof representing the calling and the called lines, means individual to each line and responsive to the carrier coded to designate it for connecting it to the network, said individual means of a called line being operable only if the line is idle.

[43. In a communication system, a channel, a first input circuit, a resistance connected between said first input circuit and said channel, a second input circuit connected to said channel, means for applying potentials to said input circuits, and uni-directional current-carrying means for permitting current to flow through said resistance only in a direction in which the voltage drop through said resistance will alter the potential on said channel in a predetermined direction.]

[44. In a communication system, the combination, as defined in claim 43, in which the unidirectional current-carrying means is in the second input circuit.]

[45. In a communication system, the combination, as defined in claim 44, in which there are a plurality of second input circuits each with its individual unidirectional current-carrying means.]

[46. In a communication system, the combination, as defined in claim 43, in which the potential applied to the first input channel is invariable.]

47. In a communication system, a plurality of lines terminating in an exchange, means for creating a plurality of recurrent time channels in said exchange available to any of said lines for carrying talking and switching signals, and means for connecting a calling line with a free one of said channels.

48. In a communication system, the combination, as defined in claim 47, in which the means for connecting a calling line with a free recurrent time channel comprises means for setting up code pulses indicative of a called line and applying said code pulses to said time channel for completing the connection to said called line.

49. In a communication system, the combination, as defined in claim 47, in which the means for connecting a calling line with a free recurrent time channel comprises means for setting up code pulses indicative of a called line and applying said code pulses to said time channel for carrying talking signals to said called line.

50. A decoder for accepting a plurality of voltage pulses and responding only when all of said pulses are simultaneously received, comprising an output channel, a first input circuit, a resistance connected between said first input circuit and said channel, a plurality of second input circuits connected to said channel, sources of voltage which produce variations of voltage in pulses between a maximum and a minimum value, means for connecting said sources to said second input circuits, means for maintaining a voltage on said first input circuit which is at least within the range of said voltage values produced by said sources, and uni-directional current-carrying devices in said second input circuits and similarly poled so as to prevent curent flow from flowing therethrough when the voltages applied to said second input circuits are at one of said values and to permit current to flow therethrough when said voltages are at the other of said values.

*51. In a communication system, an output channel, a source of potential, a resistor connected between said output channel and said source of potential, a first input circuit connected to said output channel, means for applying a potential to said first input circuit, a second input circuit connected to said output channel, means for applying a potential to said second input circuit, each of said first and second input circuits comprising oppositely poled unidirectional current carrying means connected to permit current to flow between said first input circuit and said output channel, when said second input and said resistor present a potential at their junction of a predetermined value.*

*52. In a communication system an output channel, a source of potential, a resistor connected between said output channel and said source of potential, a multiple of input circuits connected to said output channel, means for applying a potential to each of said input circuits, each of said circuits comprising unidirectional current carrying means, uniformly poled save one, which is poled opposite to the rest with respect to said output channel, connected to permit the flow of current between said oppositely poled input circuit and said output channel when said uniformly poled circuits save one and said resistor present a potential at their junction of a predetermined value.*

References Cited in the file of this patent or the original patent

UNITED STATES PATENTS

| | | |
|---|---|---|
| 2,064,904 | Green | Dec. 22, 1936 |
| 2,064,905 | Green | Dec. 22, 1936 |
| 2,153,306 | Hensler | Apr. 4, 1939 |
| 2,309,222 | Spencer | Jan. 26, 1943 |
| 2,326,458 | Hall | Aug. 10, 1943 |
| 2,326,478 | Meacham | Aug. 10, 1943 |
| 2,387,018 | Hartley | Oct. 16, 1945 |
| 2,434,989 | Christian | Jan. 27, 1948 |
| 2,453,454 | Norwine | Nov. 9, 1948 |
| 2,469,539 | Abbott | May 10, 1949 |
| 2,475,675 | Peterson | July 12, 1949 |
| 2,505,574 | Rankin | Apr. 25, 1950 |
| 2,506,612 | Ransom | May 9, 1950 |
| 2,506,613 | Ransom | May 9, 1950 |